United States Patent [19]
Mukai et al.

[11] Patent Number: 5,778,006
[45] Date of Patent: Jul. 7, 1998

[54] METHOD OF AND APPARATUS FOR DIAGNOSING A DEVICE

[75] Inventors: Masataka Mukai; Kazuki Ohkuwa, both of Kanagawa, Japan

[73] Assignee: Sony Corporation, Tokyo, Japan

[21] Appl. No.: 624,437

[22] PCT Filed: Jul. 27, 1995

[86] PCT No.: PCT/JP95/01499

§ 371 Date: Oct. 21, 1996

§ 102(e) Date: Oct. 21, 1996

[87] PCT Pub. No.: WO96/03744

PCT Pub. Date: Feb. 8, 1996

[30]     Foreign Application Priority Data

Jul. 27, 1994   [JP]   Japan ................. 6-175660

[51] Int. Cl.$^6$ ............................. G01R 31/28
[52] U.S. Cl. ................. 371/22.5; 395/183.01; 364/580
[58] Field of Search ............. 371/22.5, 22.6, 371/27.5, 22.1, 48; 395/183.01, 183.06, 183.12, 185.01, 183.15, 183.22, 185.04, 182.06; 364/580, 550, 579; 324/500, 512, 261

[56]           References Cited

U.S. PATENT DOCUMENTS

| | | | |
|---|---|---|---|
| 5,467,355 | 11/1995 | Umeda et al. | 364/571.04 |
| 5,469,563 | 11/1995 | Morita | 395/183.01 |
| 5,521,842 | 5/1996 | Yamada | 364/514 |
| 5,522,035 | 5/1996 | Yamanishi | 395/183.06 |
| 5,553,488 | 9/1996 | Ishii et al. | 73/116 |
| 5,557,558 | 9/1996 | Daito | 364/579 |

FOREIGN PATENT DOCUMENTS

| | | |
|---|---|---|
| 4-129376 | 4/1992 | Japan . |
| 4-291428 | 10/1992 | Japan . |
| 4-293133 | 10/1992 | Japan . |

*Primary Examiner*—Robert W. Beausoliel
*Assistant Examiner*—Nadeem Iqbal
*Attorney, Agent, or Firm*—Frommer Lawrence & Haug LLP; William S. Frommer

[57]           ABSTRACT

A method of self-diagnosing a device comprises the steps of selecting a diagnostic item, determining whether there is a diagnostic item being interrupted, and executing the selected diagnostic item if it is determined that there is no diagnostic item being interrupted. If a diagnosis is interrupted, information of the interrupted diagnosis is stored. When next maintenance service is performed, the serviceman can be informed of the interrupted diagnosis. If the interrupted diagnosis is to be carried out, it can be continued based on the stored information thereof.

17 Claims, 62 Drawing Sheets

FIG. 22
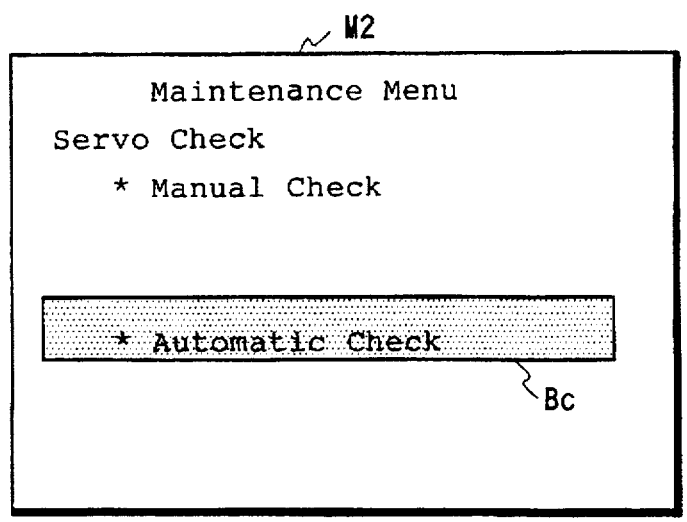
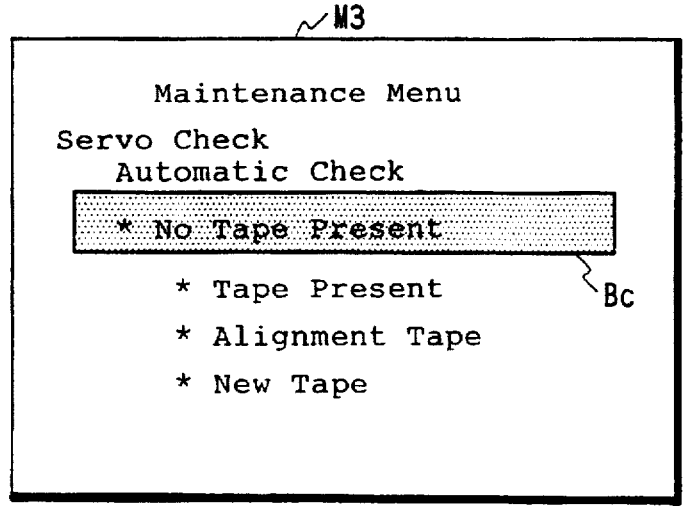

F I G. 38
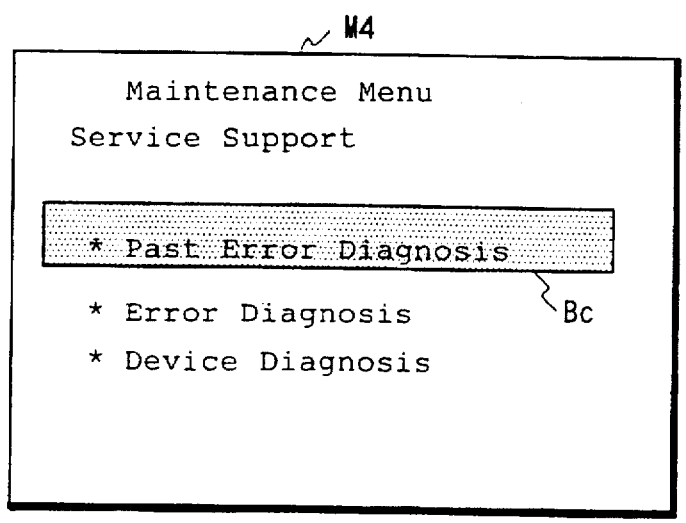

F I G. 40
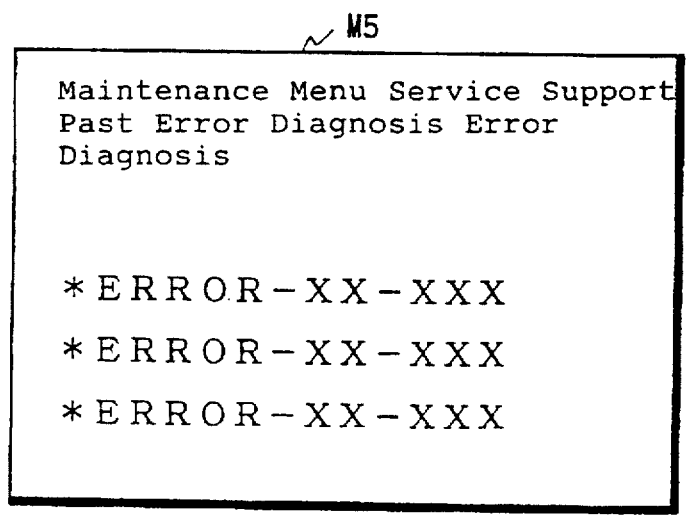

FIG. 42
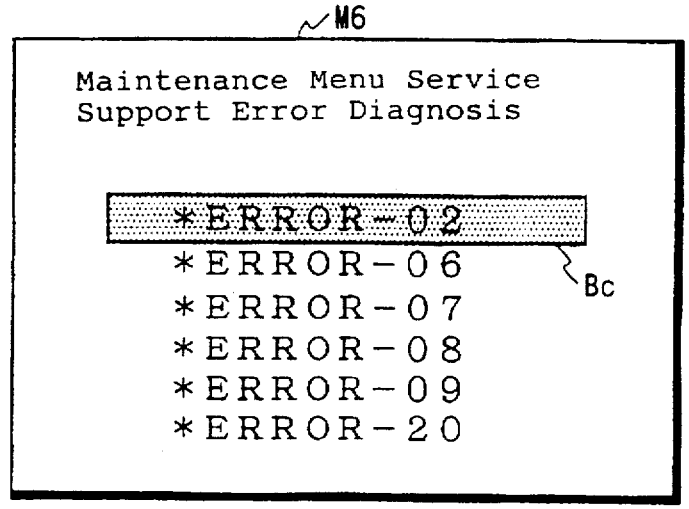
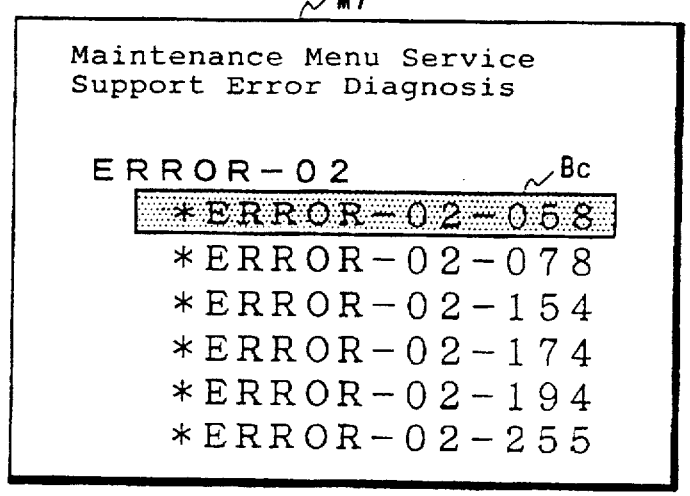

FIG. 49

```
S Reel Brake Diagnosis
S Reel Plunger is Turned ON to
Check Current.
```
~Mg1

```
S Reel Brake Diagnosis
No Current is Detected.
Confirm Whether Brake is Released
or Not.

Released ···Yes Key

Not Released··· No Key
```
~Mg2

```
S Reel Brake Diagnosis
Is Voltage of Connector
CN-300-17B of 3RD Board Correct ?

Correct··· Yes Key

Not Correct···No Key
```
~Mg3

FIG. 50

```
S Reel Brake Diagnosis
Following Locations are Judged
as Malfuctioning:

1. Connection Between 1st and
   2nd Boards 2. 1st Board
```
~Mg4

```
S Reel Brake Diagnosis
Following Locations are Judged
as Malfunctioning:

1. 3rd Board 2. 1st Board 2. 2nd Board
```
~Mg5

```
S Reel Brake Diagnosis
Is Voltage of Connector
CN936-13 Pin of 5th Board
Correct ?

Correct...   Yes Key
Not Correct... No Key
```
~Mg6

FIG. 51

S Reel Brake Diagnosis
Is Voltage of Connector
CN301-27 Pin of 3rd Board
Correct ?

Correct... Yes Key

Not Correct... No Key

~Mg7

S Reel Brake Diagnosis
Following Locations are
Judged as Malfunctioning:

1. Harness Between 3rd and
   4th Boards
1. Harness Between 4th and
   5th Boards
2. 4th Board ~Mg8

S Reel Brake Diagnosis
Following Locations are
Judged as Malfunctioning:

1. 3rd Board
2. Plunger
2. Pinch Plunger
3. 4th Board
4. 5th Board

```
S Reel Brake Diagnosis
Is Voltage of Connector CN936-11
Pin of 5th Board Correct ?

Correct... Yes Key

Not Correct...  No Key
```
~ Mg10

```
S Reel Brake Diagnosis
Following Locations are Judged
as Malfunctioning:

1. Plunger
```
~ Mg11

```
S Reel Brake Diagnosis
Following Locations are Judged
as Malfunctioning:

1. Harness Between 4th and 5th
   Boards 2. 4th Board 3. 5th Board

3. Plunger
```
~ Mg12

FIG. 53

```
S Reel Brake Diagnosis
Is Voltage of Connector CN936-12
Pin of 5th Board Correct ?

Correct... Yes Key
Not Correct... No Key
```
~Mg13

```
S Reel Brake Diagnosis
Following Locations are Judged
as Malfunctioning:

1. Plunger
```
~Mg14

```
S Reel Brake Diagnosis
Following Locations are Judged
as Malfunctioning:

1. Harness Between 4th and 5th
   Boards
2. 4th Board
3. 5th Board
3. Plunger
```
~Mg15

FIG. 54

```
S Reel Brake Diagnosis
Correct Current is Detected.
Confirm Whether Brake is
Released or Not.

Released ... Yes Key

Not Released... No Key
```
— Mg16

```
S Reel Brake Diagnosis
S Reel Brake is Judged as
Normal.
```
— Mg17

```
S Reel Brake Diagnosis
Following Locations are
Judged as Malfunctioning

1. Brake Mechanism
```
— Mg18

METHOD OF AND APPARATUS FOR DIAGNOSING A DEVICE

TECHNICAL FIELD

The present invention relates to a method of and an apparatus for diagnosing a device for recording data on and reproducing data from a recording medium, a device for recording data on a recording medium, or a device for reproducing data from a recording medium, such as a video tape recorder, a disk recording and reproducing device, a digital audio tape recorder, or the like, for example.

BACKGROUND ART

The performance of electronic devices such as VTRs or the like has increased rapidly in recent years in efforts to meet customer's needs, with resultant complexities in the internal structure of the electronic devices. Particularly, electronic devices used in broadcasting stations and for production and postproduction stages have more complex functions and structures than electronic devices for general users. For satisfying strict demands for image quality and sound quality, it is an indispensable task to adjust the electronic devices and check the electronic devices for any malfunctioning in its early stages. Those who repair electronic devices need a considerable level of professional knowledge.

Since there are many types of electronic devices, a considerable number of servicemen depending on those many types of electronic devices are required for servicing, i.e., repairing and adjusting, the electronic devices. However, it is difficult to keep many servicemen who have are professionally knowledgeable enough to handle electronic devices which have complex internal structures and need complex adjustment procedures.

Heretofore, it has been customary for electronic device manufacturers to issue service manuals of adjustment and repair procedures for servicemen to understand procedures to repair and adjust electronic devices and also to locate faults.

When a serviceman adjusts or repairs an electronic device with such a service manual, however, he has to spend a considerable period of time until the adjustment is finished or the fault is located, and the adjusted or repaired condition hinges on the technical knowledge or skill of the serviceman.

Electronic devices such as VTRs which use magnetic tapes are heretofore designed such that when they suffer a fault while the magnetic tape is being transported, their display unit displays a code representative of the fault that has occurred. Specifically, when a VTR suffers a fault while the magnetic tape is being transported, it generates code data corresponding to the fault or its pattern, converts the code data into character data, and displays the character data.

For example, there is known a helical-scan VTR in which a magnetic tape unreeled from a supply (S) reel of a video cassette tape is wound around a tape guide drum with a rotary head by a tape winding means, guided by the tape guide drum, transported by a capstan, guided by various tape guides, and wound around a takeup (T) reel of the video cassette tape. Such a helical-scan VTR displays a code representing a fault on its display unit, as follows:

When the magnetic tape is subjected to a fault while it is being transported, it causes a malfunction with respect to the rotational speed or motor drive current of any of motors for actuating the tape winding means, the tape guide drum, the capstan, the supply reel, and the takeup reel. When such a malfunction is detected, the VTR deenergizes all the motors, and displays a code representing the malfunction on the display code.

The serviceman can recognize the status or pattern of the malfunction represented by the displayed code by referring to a code book. Therefore, the time required for the serviceman to adjust or repair the VTR is shorter than if he used only a service manual, and the adjusted or repaired condition is prevented from varying from serviceman to serviceman.

The process of displaying on the display unit a code representing a malfunction that has occurred to an electronic device, and determining the malfunction represented by the code with the code book referred to by the serviceman, however, is problematic as follows:

First, while the serviceman can understand what kind of malfunction is indicated by the code displayed on the display unit by referring to the code book, the serviceman is still required to determine the cause and location of the malfunction, and then adjust or repair the electronic device based on the determined cause and location. Even though the serviceman can simply understand the nature of the malfunction, the process of analyzing the malfunction and solving the malfunction based on the analysis is as time-consuming for adjustment and repair, and the adjusted or repaired condition depends as much on the skill of the serviceman, as the process of using the repair manual for adjustment and repair.

Secondly, since the adjusted or repaired condition depends on the skill of the serviceman, it is impossible to achieve the same level of an adjusted or repaired condition at all times regardless of which serviceman has adjusted or repaired. Depending on the adjusted or repaired condition of a device that has strict requirements for accuracy, e.g., a VTR, a DAT, or a disk device for professional use, therefore, it may be highly possible for the recording medium used in the device to be damaged, for a broadcasting accident to be caused by damage to the recording medium, or for a broadcasting accident to occur due to a reduction in the accuracy of the device. Furthermore, devices for general users, whose functions have approached those of professional devices through technical advances made by the manufacturers, are also highly likely to depend on the skill of servicemen for adjustments or repairs. Therefore, depending on the adjusted or repaired condition of a device for a general user, as with devices for professional users, it may also be highly possible for the recording medium used in the device to be damaged or for important information for the user to be unduly deteriorated (e.g., for the quality of an image to become lower than a desired quality level owing to an adjustment failure of a video camera).

Thirdly, the mobility of a serviceman tends to be reduced because the serviceman has to carry a code book and adjustment and repair manuals at all times. Inasmuch as the adjustment and repair manuals contain many pages, taking the serviceman a long time to look for a required item, and has a large thickness, they are apt to hinder an adjustment or repair process on site.

Fourthly, even adjustment and repair manuals which have been produced with a large expenditure of time and labor find it almost impossible to cover all causes of faults, repair methods therefor, and adjustment methods because they differ depending on the manner in which devices have been used and aging of devices. In addition, adjustment and repair manuals need to be revised as frequently as device types and model changes are introduced.

For the reasons described above, it can be seen that it is substantially impossible to produce adjustment and repair manuals for adjusting and repairing devices quickly to achieve the same level of adjustment and repair irrespective of the skill of servicemen, and it is also substantially impossible for servicemen to adjust and repair devices quickly to achieve the same level of adjustment and repair after they have recognized a malfunction represented by a code displayed on the display unit of a device by referring to a code book and then adjusted or repaired the device by referring to an adjustment or repair manual. Manufacturers or adjustment and repair companies have been making efforts to improve adjustment and repair techniques in order to solve the above problems.

The present invention has been made in view of the above problems, and proposes a method of and an apparatus for diagnosing a device to adjust or repair the device more accurately and quickly, to make the adjusted or repaired condition of the device independent of the skill of a person who has adjusted or repaired the device, and to allow a person to adjust or repair the device without carrying thick manuals.

DISCLOSURE OF THE INVENTION

According to the present invention, a method of self-diagnosing a device comprises the steps of selecting a diagnostic item, determining whether there is a diagnostic item which is being interrupted, and executing the selected diagnostic item if it is determined that there is no diagnostic item which is being interrupted. When a diagnosis is interrupted, information obtained upon interruption of diagnosis is stored. In a next maintenance procedure, the presence of the interrupted diagnosis can be indicated. If the interrupted diagnosis is to be carried out, it can be continued based on the stored information.

BRIEF DESCRIPTION OF THE DRAWINGS

FIG. 22 is a view showing displayed screen images used in operation of the subroutine (servo check) illustrative of operation of the method of and the apparatus for diagnosing a device according to the present invention;

FIG. 38 is a view showing a displayed screen image used in the subroutine (service support) illustrative of operation of the method of and the apparatus for diagnosing a device according to the present invention;

FIG. 40 is a view showing a displayed screen image used in the subroutine (past error diagnosis) illustrative of operation of the method of and the apparatus for diagnosing a device according to the present invention;

FIG. 42 is a view of displayed screen images of error codes in middle and lower layers outputted based on the error codes in the upper layer indicated by the subroutine (past error diagnosis) illustrative of operation of the method of and the apparatus for diagnosing a device according to the present invention;

FIG. 49 is a view showing displayed screen images illustrative of operation of the device diagnosis of the method of and the apparatus for diagnosing a device according to the present invention;

FIG. 50 is a view showing displayed screen images illustrative of operation of the device diagnosis of the method of and the apparatus for diagnosing a device according to the present invention;

FIG. 51 is a view showing displayed screen images illustrative of operation of the device diagnosis of the method of and the apparatus for diagnosing a device according to the present invention;

FIG. 52 is a view showing displayed screen images illustrative of operation of the device diagnosis of the method of and the apparatus for diagnosing a device according to the present invention;

FIG. 53 is a view showing displayed screen images illustrative of operation of the device diagnosis of the method of and the apparatus for diagnosing a device according to the present invention;

FIG. 54 is a view showing displayed screen images illustrative of operation of the device diagnosis of the method of and the apparatus for diagnosing a device according to the present invention;

BEST MODE FOR CARRYING OUT THE INVENTION

A method of and an apparatus for diagnosing a device according to the present invention will be described in detail below with reference to the drawings. Embodiments of the method of and the apparatus for diagnosing a device according to the present invention will be described with respect to items in a sequence given below which are preceded by their own description.

* First Embodiment

Figure 39:
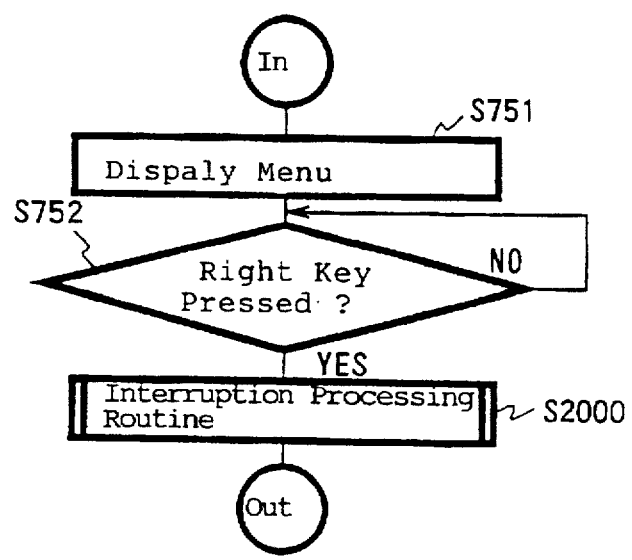
FIG. 39 is a flowchart of a subroutine (past error diagnosis) illustrative of operation of the method of and the apparatus for diagnosing a device according to the present invention.
Figure 41:
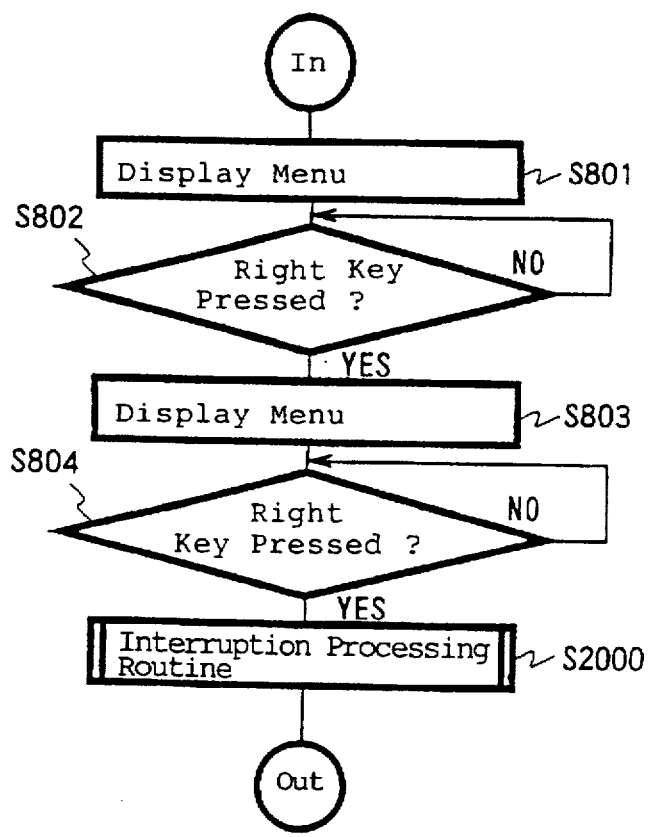
FIG. 41 is a flowchart illustrative of operation based on error codes in an upper layer indicated by the subroutine (past error diagnosis) illustrative of operation of the method of and the apparatus for diagnosing a device according to the present invention.
Figure 43:
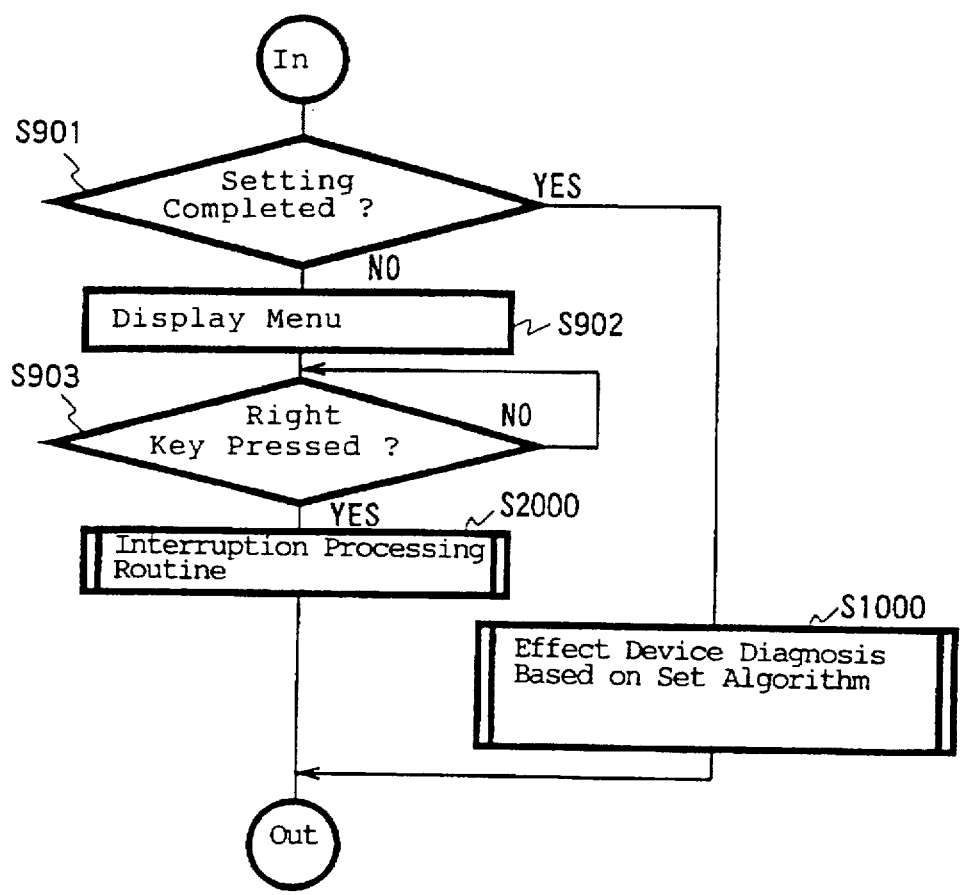
FIG. 43 is a flowchart of a subroutine (device diagnosis) illustrative of operation of the method of and the apparatus for diagnosing a device according to the present invention.
Figure 44:
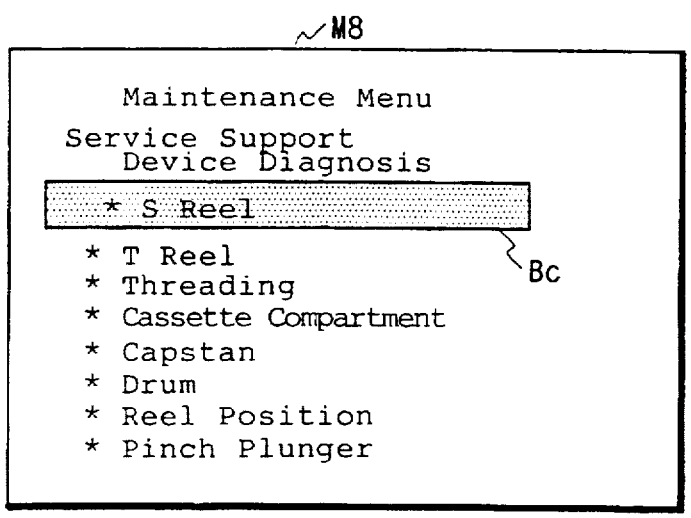
FIG. 44 is a view showing a displayed screen image used in the subroutine (device diagnosis) illustrative of operation of the method of and the apparatus for diagnosing a device according to the present invention.
Figure 45:
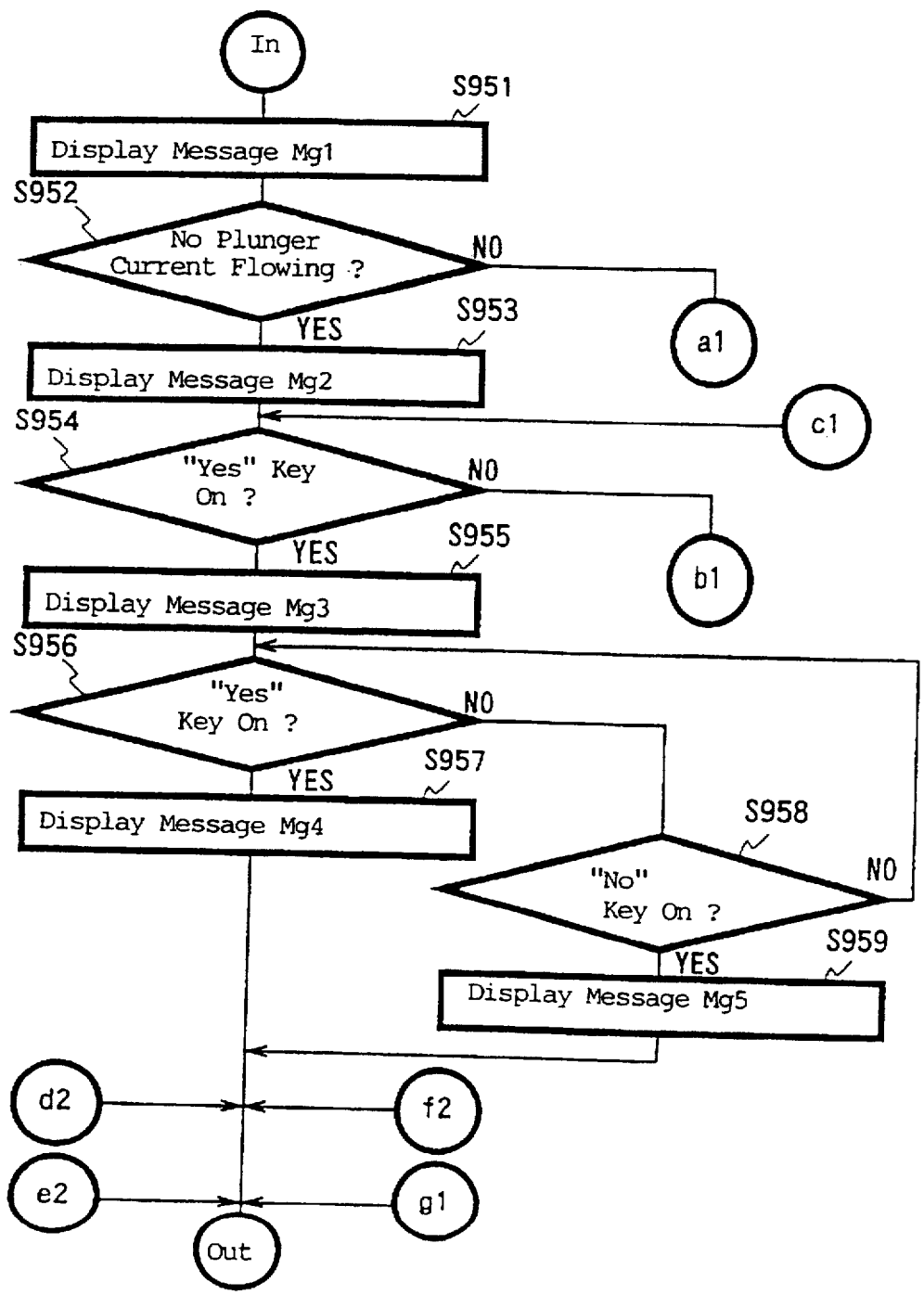
FIG. 45 is a flowchart of a subroutine (selected device diagnosis) illustrative of operation of the method of and the apparatus for diagnosing a device according to the present invention.
Figure 46:
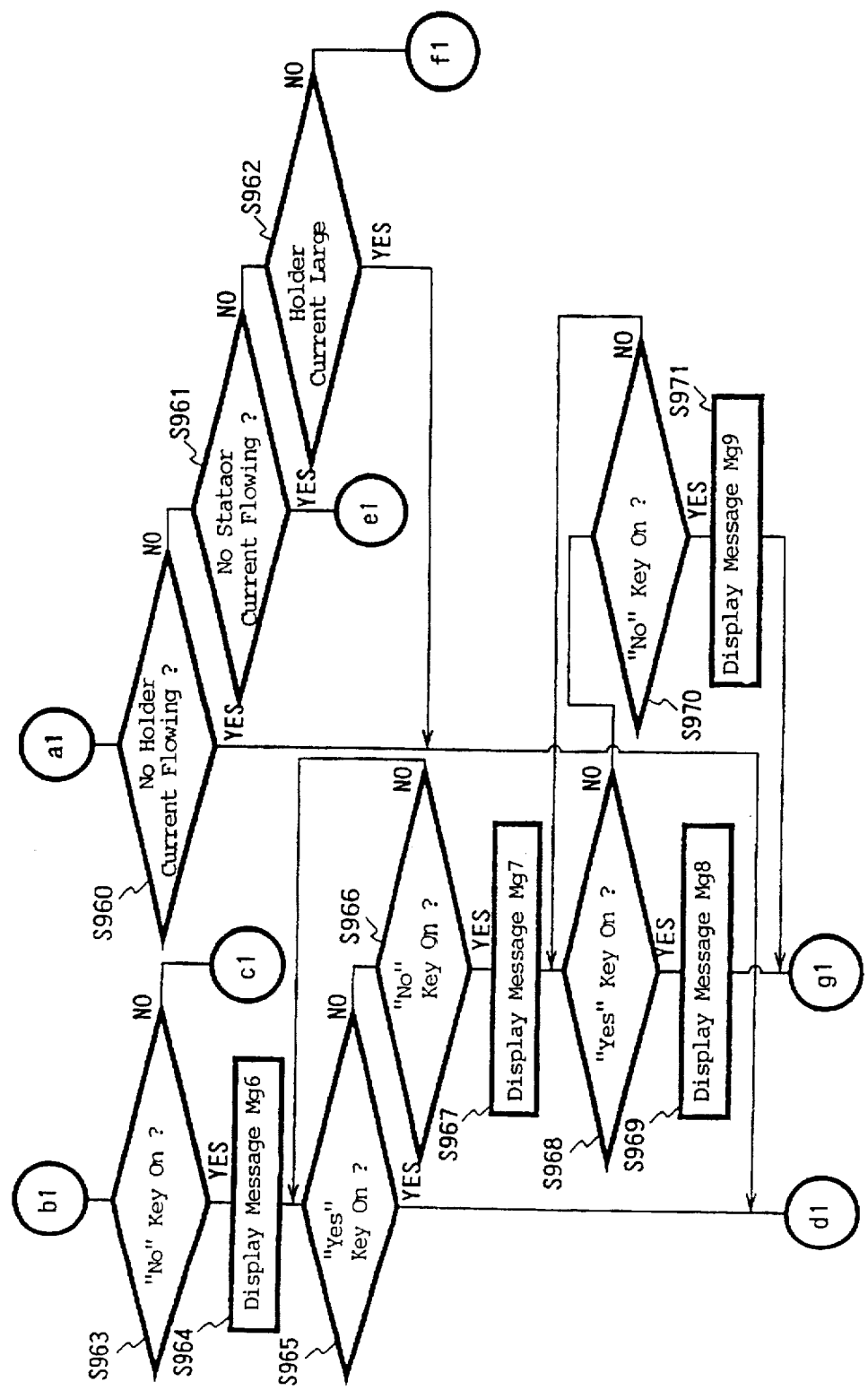
FIG. 46 is a flowchart of the subroutine (selected device diagnosis) illustrative of operation of the method of and the apparatus for diagnosing a device according to the present invention.
Figure 47:
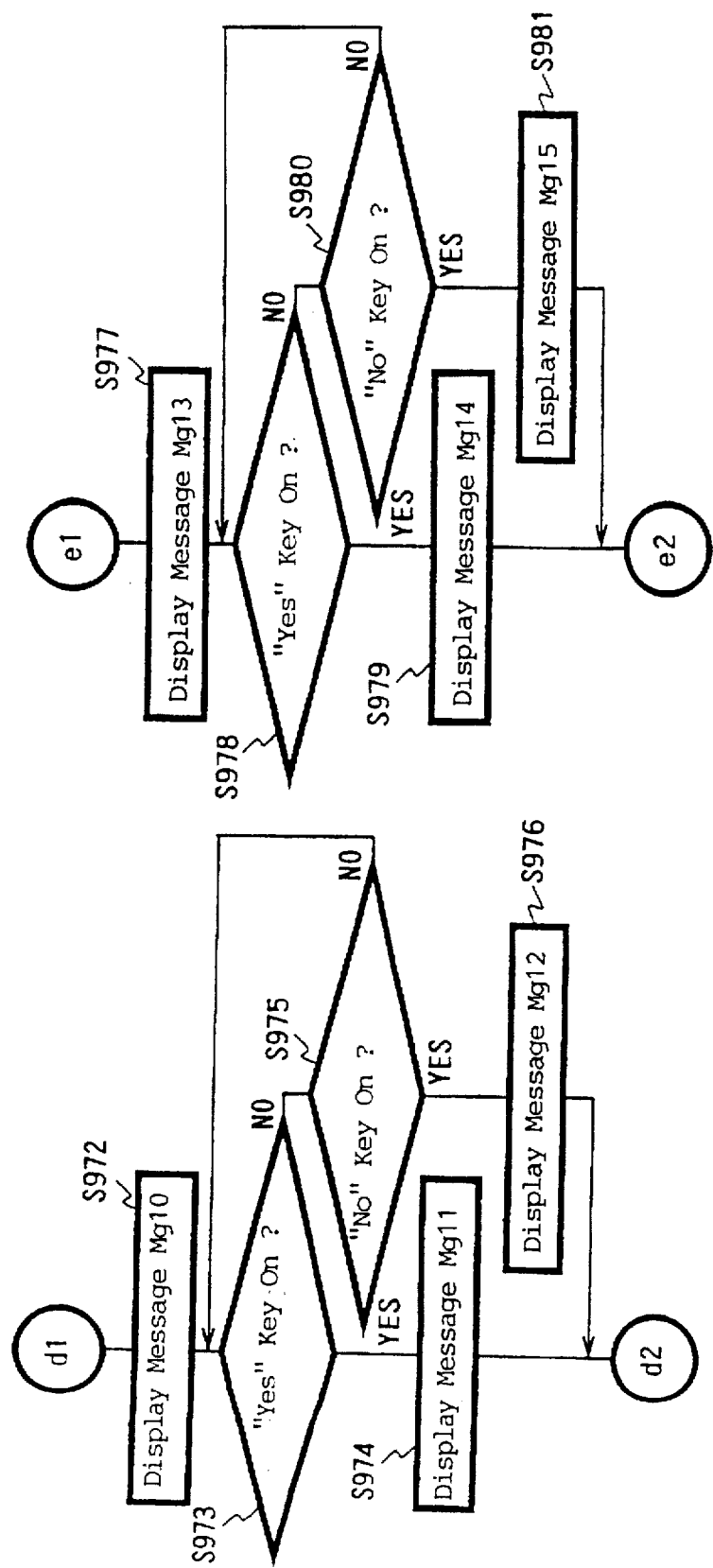
FIG. 47 is a flowchart of the subroutine (selected device diagnosis) illustrative of operation of the method of and the apparatus for diagnosing a device according to the present invention.
Figure 48:
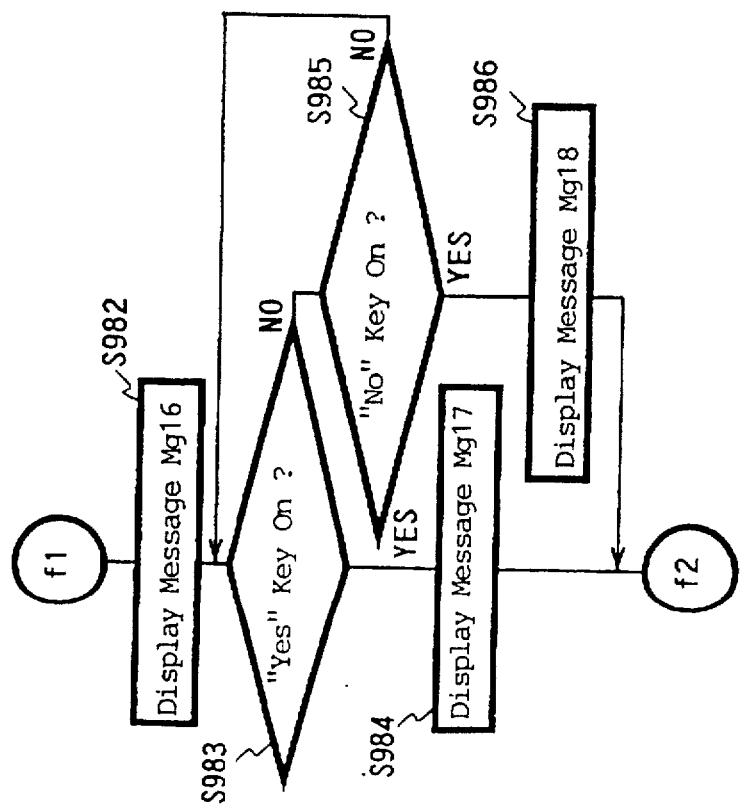
FIG. 48 is a flowchart of the subroutine (selected device diagnosis) illustrative of operation of the method of and the apparatus for diagnosing a device according to the present invention.

A. Description of an arrangement and operation of a VTR to which a method of and an apparatus for diagnosing a device according to the present invention are applied (see FIG. 1);
B. Description of an arrangement and operation of parts shown in FIG. 1;
  B-1. Drum motor detector 7 (see FIG. 2);
  B-2. Threading motor detector 8 (see FIG. 3);
  B-3. Reel position motor detector 11 (see FIG. 4);
  B-4. Tape top detector 14 (see FIG. 5);
  B-5. Tape end detector 15 (see FIG. 6);
  B-6. Cassette compartment motor detector 16 (see FIG. 7);
  B-7. Tension detector 19 (see FIG. 8);
  B-8. S reel motor detector 20 (see FIG. 9);
  B-9. S reel hold/stop detector 21 (see FIG. 10);
  B-10. T reel motor detector 22 (see FIG. 11);
  B-11. T reel hold/stop detector 23 (see FIG. 12);
  B-12. Panel of display/operation unit 24 (see FIG. 13);
  B-13. Capstan motor detector 25 (see FIG. 14);
  B-14. Pinch hold/press detector 26 (see FIG. 15);
C. Description of an arrangement and operation of a mechanism in the VTR shown in FIG. 1 (see FIG. 16);
D. Description of an arrangement and operation of a controller in the VTR shown in FIG. 1 (see FIG. 17);
E. Description of a specific arrangement of the S reel hold-stop detector 21 in the VTR shown in FIG. 1 (see FIG. 18);
F. Description of operation for selecting maintenance items (see FIGS. 19 and 20);
G. Description of operation for selecting servo check items (see FIGS. 21 and 22);
  G-1. Description of operation for a check with no tape being present (see FIGS. 23-26);
  G-2. Description of operation for a check with a tape being present (see FIGS. 27-31);
  G-3. Description of operation for a check with an alignment tape (see FIGS. 32-34);
  G-4. Description of operation for a check with a new tape (see FIGS. 35 and 36);
H. Description of operation for selecting service support items (see FIGS. 37 and 38);
  H-1. Description of operation of a past error diagnosis (FIGS. 39 and 40);
  H-2. Description of operation of an error diagnosis (FIGS. 41 and 42);
  H-3. Description of operation for selecting device diagnosis items (FIGS. 43 and 44);
    H-3-1. Description of operation of a diagnosis of a selected device (FIGS. 45-54);
    H-3-2. Description of operation of a diagnosis of a device based on a set algorithm (see FIGS. 55 and 56);
I. Description of operation for processing a diagnosis which has been interrupted when maintenance is started (see FIG. 57);
  I-1. Description of operation for saving a diagnosis number (see FIG. 58);

* Second Embodiment

J. Description of operation for carrying out a diagnosis which has been interrupted when a power supply is turned on (see FIGS. 59-62).

[First Embodiment]

A. Description of an arrangement and operation of a VTR to which a method of and an apparatus for diagnosing a device according to the present invention are applied (see FIG. 1).

Figure 1:
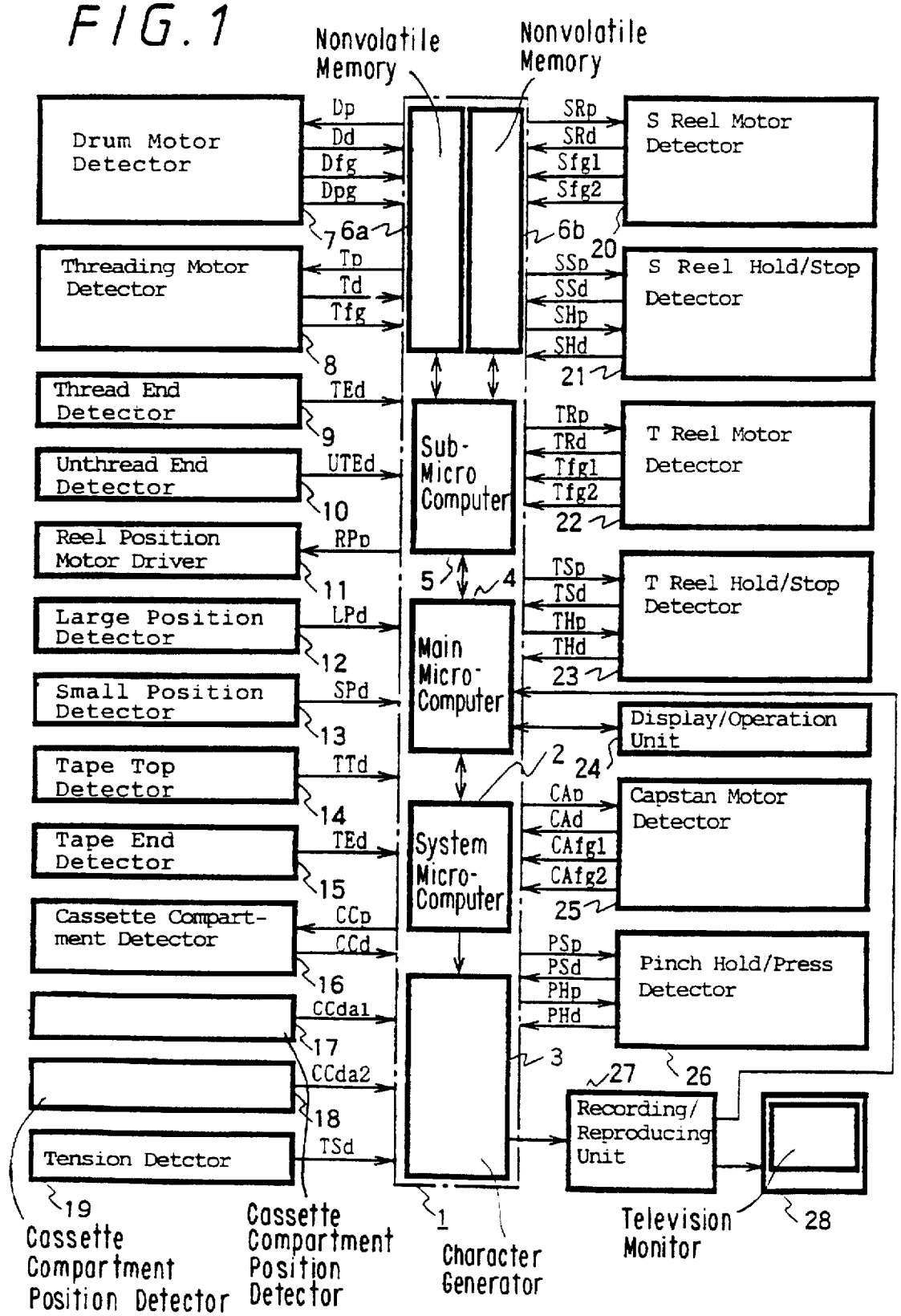
FIG. 1 is a block diagram illustrative of a method of and an apparatus for diagnosing a device according to the present invention.

FIG. 1 is a block diagram of an arrangement of a VTR to which a method of and an apparatus for diagnosing a device according to the present invention are applied.

[Connection and Arrangement]

In FIG. 1, a controller 1 has a system microcomputer 2 for receiving key inputs from a display/operation unit 24 and controlling a main microcomputer 4, a character generator 3, a recording/reproducing unit 27, etc. the character generator 3 for outputting character data based on character generating data such as ASCII code data from the system microcomputer 2, the main microcomputer 4 for actually controlling various parts based on output signals from various detectors to make an error diagnosis, a submicrocomputer 5 controlled by the main microcomputer 4, and nonvolatile memories 6a, 6b for storing diagnostic results, etc. under the control of the submicrocomputer 5.

Each of the system microcomputer 2, the main microcomputer 4, and the submicrocomputer 5 has at least input/output ports, a bus (comprising address, control, and data buses), a CPU, a ROM, and a RAM. The ROM of the main microcomputer 4 stores program data and parameter data for effecting error diagnoses, and message data for outputting messages that are used for diagnostic results and diagnostic processes.

The program data, the parameter data, and the message data may be supplied in the form of IC cards to the main microcomputer 4. In this case, the main microcomputer 4 needs to have an IC card slot. The nonvolatile memories 6a, 6b may comprise a flash memory or a RAM with battery backup.

To the controller 1, there are connected a drum motor detector 7, a threading motor detector 8, a thread end (SE) detector 9, an unthread end (USE) detector 10, a reel position motor (RPM) driver 11, a large position (LP) detector 12, a small position (SP) detector 13, a tape top (TT) detector 14, a tape end (TE) detector 15, a cassette compartment (CC) motor detector 16, a cassette compartment (CC) position detector 17, a cassette compartment (CC) position detector 18, a tension detector 19, an S (supply) reel motor detector 20, an S reel hold/stop detector 21, a T (takeup) reel motor detector 22, a T reel hold/stop detector 23, a display/operation unit 24, a capstan motor detector 25, a pinch hold/press detector 26, and a recording/reproducing unit 27. A television monitor 28 is connected to the recording/reproducing unit 27.

The thread end detector 9, the unthread end detector 10, the large position detector 12, the small position detector 13, and the cassette compartment detectors 16, 17 have respective sensors. The thread end detector 9 serves to detect a position where threading is completed, and the unthread end detector 10 serves to detect a position where unthreading is completed.

The large position detector 12 serves to detect whether a cassette having a large size, i.e., a so-called large cassette (L cassette), has been set in a cassette compartment or not. The small position detector 13 serves to detect whether a cassette having a size smaller than the large cassette, i.e., a so-called small cassette (S cassette), has been set in a mechanism deck (not shown) by the cassette compartment or not.

[Operation]

When a recording or reproducing command is entered through the display/operation unit 24, the system microcomputer 2 and the main microcomputer 4 control various parts to effect recording or reproducing operation of the VTR. When the system microcomputer 2 receives an input signal from the display/operation unit 24 and determines the input signal as indicative of a maintenance mode, the system microcomputer 2 indicates the maintenance mode to the main microcomputer 4. Based on the indication of the maintenance mode from the system microcomputer 2, the main microcomputer 4 starts operation in t he maintenance mode.

Specifically, the main microcomputer 4 and the system microcomputer 2 control the drum motor detector 7, the threading motor detector 8, the thread end detector 9, the unthread end detector 10, the reel position motor driver 11, the large position detector 12, the small position detector 13, the tape top detector 14, the tape end detector 15, the cassette compartment motor detector 16, the cassette compartment position detector 17, the cassette compartment position detector 18, the tension detector 19, the S reel motor detector 20, the S reel hold/stop detector 21, the T reel motor detector 22, the T reel hold/stop detector 23, the capstan motor detector 25, the pinch hold/press detector 26, diagnose an error based on detected output signals from these detectors, and supplies a code based on the diagnosed result through the system microcomputer 2 to the character generator 3.

The character generator 3 generates character data corresponding to a code supplied from the main microcomputer 4 through the system microcomputer 2, and supplies the generated character data to the recording/reproducing unit 27. The character data supplied to the recording/reproducing unit 27 are added to a video signal in the recording/ reproducing unit 27, and then supplied to the television monitor 28, which displays a message image on its screen.

B. Description of an arrangement and operation of parts shown in FIG. 1.

Arrangements of the parts shown in FIG. 1 will successively be described with reference to the drawings.

B-1. Drum motor detector 7 (see FIG. 2).

Figure 2:
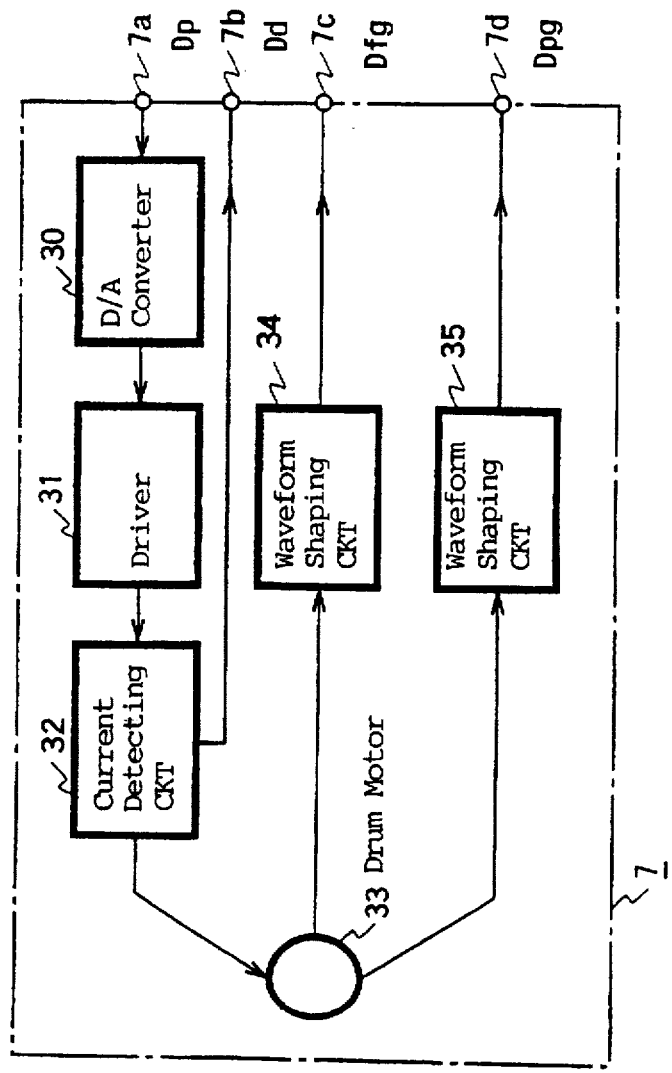
FIG. 2 is a block diagram of an internal structure of a drum motor detector 7 shown in FIG. 1.

FIG. 2 is a block diagram of an internal structure of the drum motor detector 7 shown in FIG. 1.

An input terminal 7a is supplied with a drum drive signal Dp from the main microcomputer 4 of the controller 1 shown in FIG. 1. The input terminal 7a is connected through a D/A converter 30, a driver 31, and a current detecting circuit 32 to a drum motor 33. The current detecting circuit 32 has a current detecting output terminal connected to an output terminal 7b for outputting a drum motor detecting signal Dd. The drum motor 33 has a frequency signal generator (not shown) connected through a waveform shaping circuit 34 to an output terminal 7c for outputting a drum frequency signal Dfg. The drum motor 33 also has a switching pulse generator (not shown) connected through a waveform shaping circuit 35 to an output terminal 7d for outputting a drum pulse signal Dpg. The drum frequency signal Dfg is a signal for detecting the rotational speed of the drum motor 33, and the drum pulse signal Dpg is a signal for detecting the phase of a head mounted on a drum.

The drum drive signal Dp from the main microcomputer 4 shown in FIG. 1 is supplied through the input terminal 7a to the D/C converter 30, which converts the drum drive signal Dp into an analog signal. The analog signal is supplied to the driver 31, which converts the supplied analog signal into a drive current signal that is supplied through the current detecting circuit 32 to the drum motor 33. The drum motor 33 is energized for rotation by the drive current signal that is supplied from the driver 31 through the current detecting circuit 32.

The current detecting circuit 32 detects the drive current signal from the driver 31, and the detected drive current signal is supplied as the drum motor detecting signal Dd through the output terminal 7b to the main microcomputer 4. Depending on the rotation of the drum motor 33, a frequency signal from the non-illustrated frequency signal generator is shaped in waveform by the waveform shaping circuit 34, and supplied as the drum frequency signal Dfg through the output terminal 7c to the main microcomputer 4. Similarly, depending on the rotation of the drum motor 33, switching pulses from the non-illustrated switching pulse generator are shaped in waveform by the waveform shaping circuit 35, and supplied as the drum pulse signal Dpg through the output terminal 7d to the main microcomputer 4.

B-2. Threading motor detector 8 (see FIG. 3).

Figure 3:
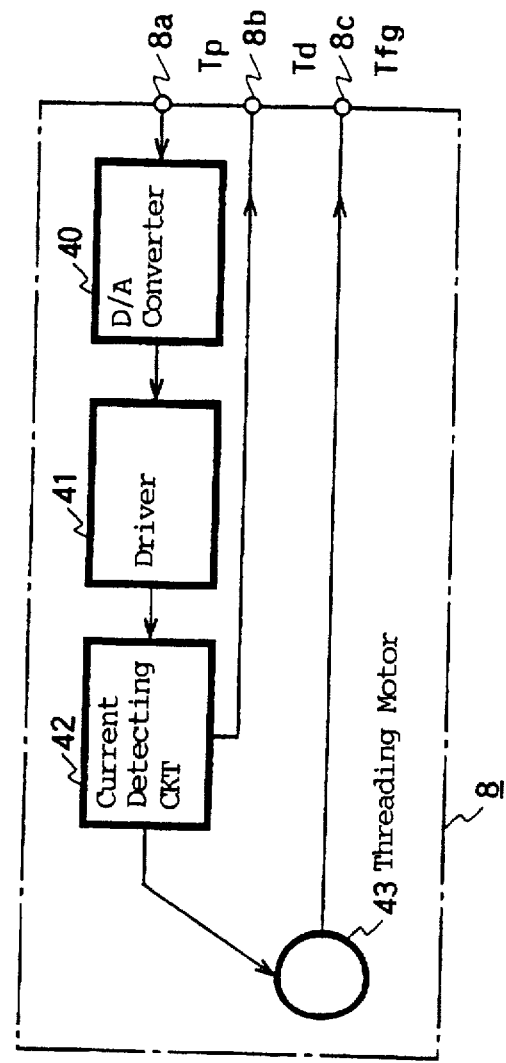
FIG. 3 is a block diagram of an internal structure of a threading motor detector 8 shown in FIG. 1.

FIG. 3 is a block diagram of an internal structure of the threading motor detector 8 shown in FIG. 1.

An input terminal 8a is supplied with a threading drive signal Tp from the main microcomputer 4 shown in FIG. 1. The input terminal 8a is connected through a D/A converter 40, a driver 41, and a current detecting circuit 42 to a threading motor 43. The threading motor 43 serves to rotate a threading ring for drawing a magnetic tape from a cassette and winding the magnetic tape around the drum. The current detecting circuit 42 has a current detecting output terminal connected to an output terminal 8b for outputting a threading detecting signal Td. The threading motor 43 has a frequency signal generator (not shown) connected to an output terminal 8c for outputting a threading frequency signal Tfg.

The threading drive signal Tp from the main microcomputer 4 shown in FIG. 1 is supplied through the input terminal 8a to the D/C converter 40, which converts the threading drive signal Tp into an analog signal. The analog signal is supplied to the driver 41, which converts the supplied analog signal into a drive current signal that is supplied through the current detecting circuit 42 to the threading motor 43. The threading motor 43 is energized for rotation by the supplied drive current signal.

The current detecting circuit 42 detects the drive current signal from the driver 41, and the detected drive current signal is supplied as the threading detecting signal Td through the output terminal 8b to the main microcomputer 4. Depending on the rotation of the threading motor 43, a frequency signal is outputted from the nonillustrated frequency signal generator of the threading motor, and supplied through the output terminal 8c to the main microcomputer 4.

B-3. Reel position motor detector 11 (see FIG. 4).

Figure 4:
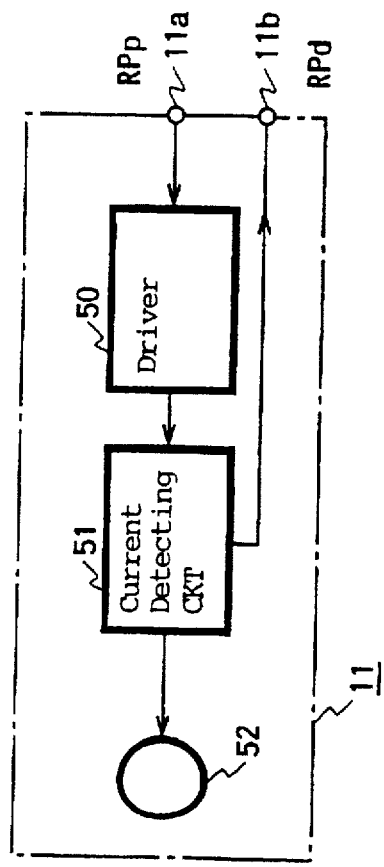
FIG. 4 is a block diagram of an internal structure of a reel position motor driver 11 shown in FIG. 1.

FIG. 4 is a block diagram of an internal structure of the reel position motor driver 11 shown in FIG. 1.

An input terminal 11a is supplied with a reel position motor drive signal RPp from the main microcomputer 4 shown in FIG. 1. The input terminal 11a is connected through a driver 50 and a current detecting circuit 51 to a reel position motor 52. The current detecting circuit 51 has a current detecting output terminal connected to an output terminal 11b for outputting a reel position motor detecting signal RPd.

The reel position motor 52 moves the position of a reel motor depending on the size of a cassette that is set, depending on detected results from the large position detector 12 and the small position detector 13 shown in FIG. 1. This is because the position of reels differs when the L cassette or the S cassette is set in a mechanism.

The reel position drive signal RPp from the main microcomputer 4 shown in FIG. 1 is supplied through the input terminal 11a to the driver 50 and converted into a current drive signal by the driver 50. Thereafter, the current drive signal is supplied through the current detecting circuit 51 to the reel position motor 52, which is energized for rotation. The current detecting circuit 51 detects the drive current signal from the driver 50, and the detected drive current signal is supplied as the reel position motor detecting signal RPd through the output terminal 11b to the main microcomputer 4.

B-4. Tape top detector 14 (see FIG. 5).

Figure 5:
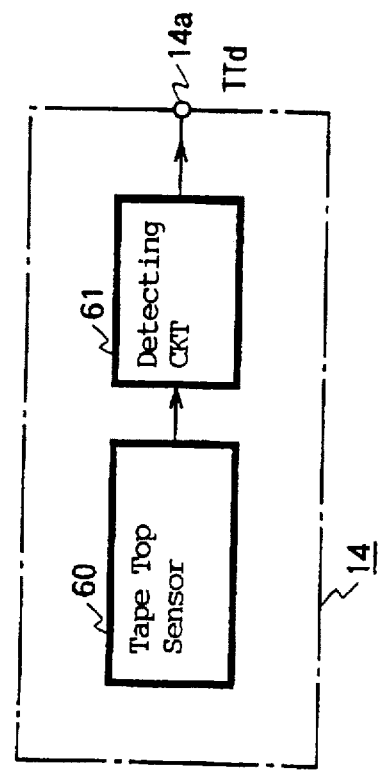
FIG. 5 is a block diagram of an internal structure of a tape top detector 14 shown in FIG. 1.

FIG. 5 is a block diagram of an internal structure of the tape top detector 14 shown in FIG. 1.

A tape top sensor 60 serves to detect a tape top. The tape top sensor 60 has an output terminal connected to an input terminal of a detecting circuit 61, which has an output terminal connected to an output terminal 14a for outputting a tape top detecting signal TTd.

When an output signal from the tape top sensor 60 is supplied to the detecting circuit 61, the detecting circuit 61 detects the level of the output signal from the tape top sensor 60, thus detecting a tape top. The tape top detecting signal TTd thus produced as a result of the detection of the tape top is supplied through the output terminal 14a to the main microcomputer 4.

B-5. Tape end detector 15 (see FIG. 6).

Figure 6:
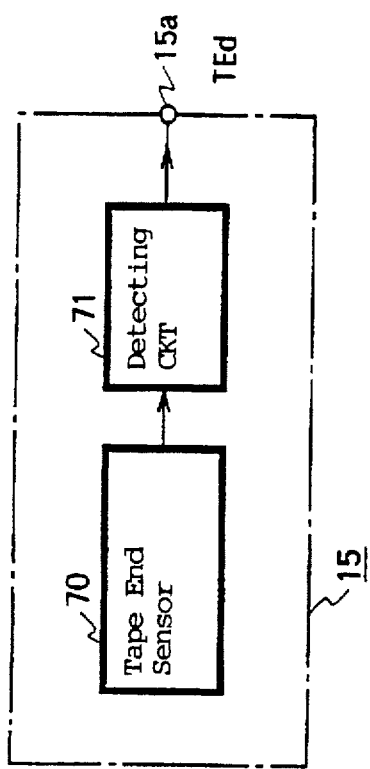
FIG. 6 is a block diagram of an internal structure of a tape end detector 15 shown in FIG. 1.

FIG. 6 is a block diagram of an internal structure of the tape end detector 15 shown in FIG. 1.

The tape end sensor 70 serves to detect a tape end. The tape end sensor 70 has an output terminal connected to an input terminal of a detecting circuit 71, which has an output terminal connected to an output terminal 15a for outputting a tape end detecting signal TEd.

When an output signal from the tape end sensor 70 is supplied to the detecting circuit 71, the detecting circuit 71 detects the level of the output signal from the tape end sensor 70, thus detecting a tape end. The tape end detecting signal TEd thus produced as a result of the detection of the tape end is supplied through the output terminal 15a to the main microcomputer 4.

B-6. Cassette compartment motor detector 16 (see FIG. 7).

Figure 7:
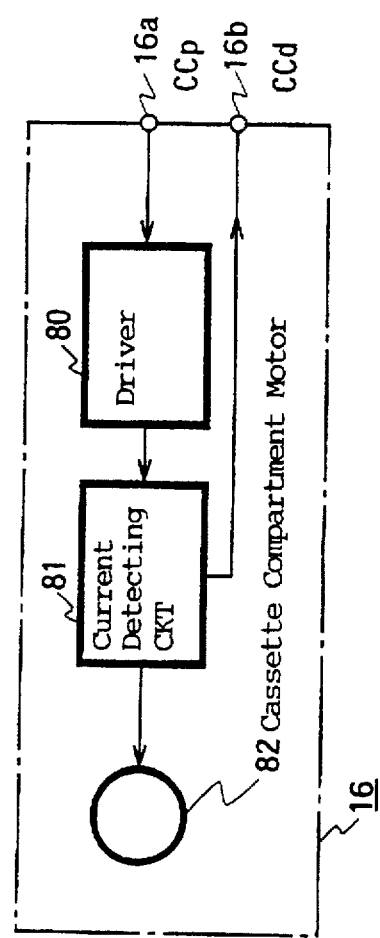
FIG. 7 is a block diagram of an internal structure of a cassette compartment detector 16 shown in FIG. 1.

FIG. 7 is a block diagram of an internal structure of the cassette compartment detector 16 shown in FIG. 1.

An input terminal 16a is supplied with a cassette compartment motor drive signal CCp from the main microcomputer 4 shown in FIG. 1. The input terminal 16a is connected through a driver 80 and a current detecting circuit 81 to a cassette compartment motor 82. The current detecting circuit 81 has a current detecting output terminal connected to an output terminal 16b for outputting a cassette compartment detecting signal CCd. The cassette compartment motor 82 serves to actuate a cassette compartment to insert a video tape cassette into a mechanism (mechanism deck).

The cassette compartment motor drive signal CCp from the main microcomputer 4 shown in FIG. 1 is supplied through the input terminal 16a to the driver 80 and converted into a current drive signal by the driver 80. Thereafter, the current drive signal is supplied through the current detecting circuit 81 to the cassette compartment motor 82, which is energized for rotation thereby to actuate the cassette compartment. The current detecting circuit 81 detects the drive current signal from the driver 80, and the detected drive current signal is supplied as the cassette compartment detecting signal CCd through the output terminal 16b to the main microcomputer 4.

B-7. Tension detector 19 (see FIG. 8).

Figure 8:
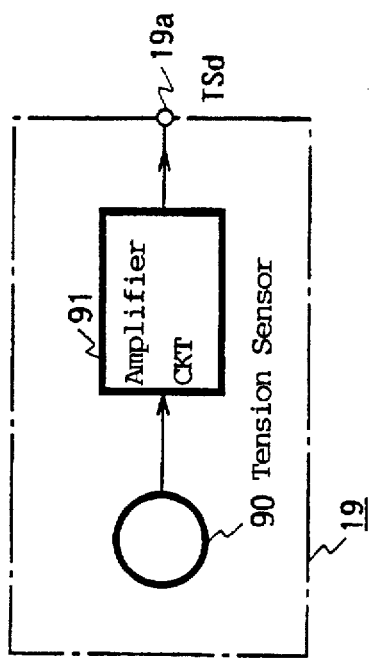
FIG. 8 is a block diagram of an internal structure of a tension detector 19 shown in FIG. 1.

FIG. 8 is a block diagram of an internal structure of the tension detector 19 shown in FIG. 1.

A tension sensor 90 serves to detect the tape tension of a magnetic tape. The tension sensor 90 has an output terminal connected to an input terminal of an amplifier circuit 91, which has an output terminal connected to an output terminal 19a for outputting a tension detecting signal TSd.

When an output signal from the tension sensor 90 is supplied to the amplifier circuit 91, the amplifier circuit 91 amplifies the detected output signal from the tension sensor 90. The tension detecting signal TSd thus produced as a result of the amplification of the detected output signal is supplied through the output terminal 19a to the main microcomputer 4.

B-8. S reel motor detector 20 (see FIG. 9).

Figure 9:
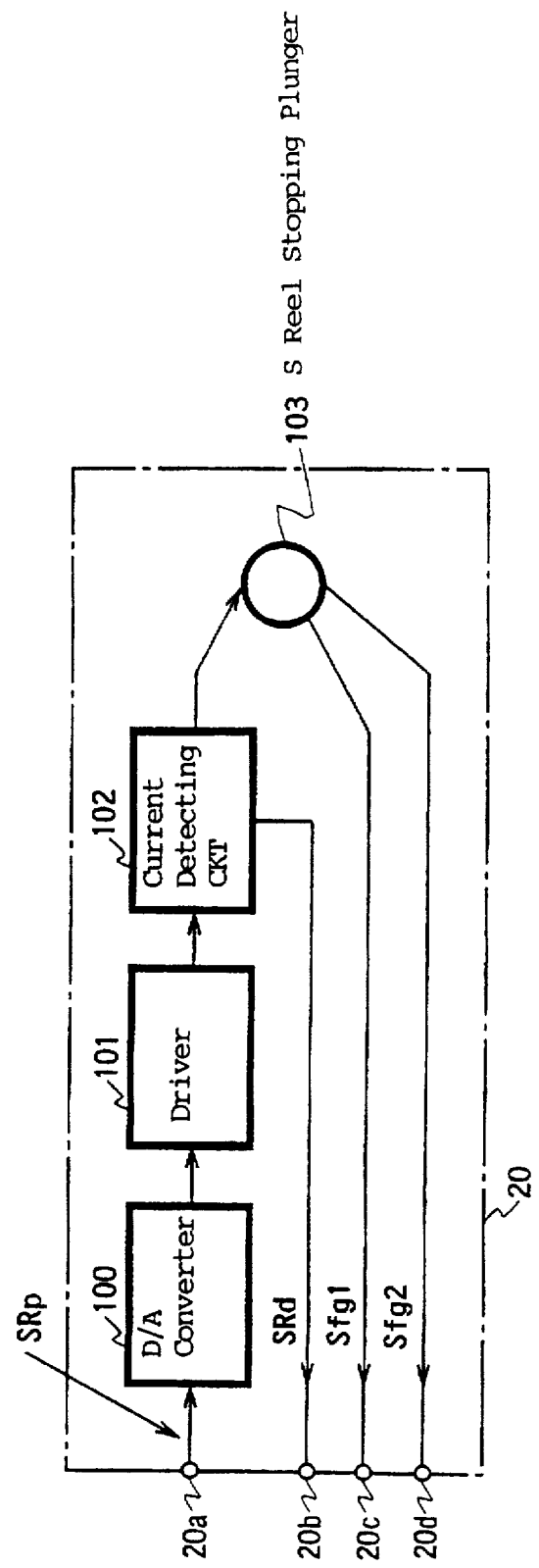
FIG. 9 is a block diagram of an internal structure of an S reel motor detector 20 shown in FIG. 1.

FIG. 9 is a block diagram of an internal structure of the S reel motor detector 20 shown in FIG. 1.

An input terminal 20a is supplied with an S reel motor drive signal SRp from the main microcomputer 4 of the controller 1 shown in FIG. 1. The input terminal 20a is connected through a D/A converter 100, a driver 101, and a current detecting circuit 102 to an S reel motor 103. The current detecting circuit 102 has a current detecting output terminal connected to a control terminal of the driver 101 and an output terminal 20b for outputting an S reel motor detecting signal SRd. The S reel motor 103 has a frequency signal generator (not shown) connected to an output terminal 20c for outputting an S reel motor frequency signal Sfg1 and a frequency signal generator (not shown) connected to an output terminal 20d for outputting an S reel motor frequency signal Sfg2.

The S reel motor 103 is a motor for controlling the rotation of an S reel. The S reel motor frequency signals Sfg1, Sfg2 are 90 degrees out of phase with each other. The rotational speed and direction of the S reel motor 103 are detected based on the reel motor frequency signals Sfg1, Sfg2 which are 90 degrees out of phase with each other.

The S reel motor drive signal SRp from the main microcomputer 4 shown in FIG. 1 is supplied through the input terminal 20a to the D/C converter 100, which converts the S reel drive signal SRp into an analog signal. The analog signal is supplied to the driver 101, which converts the supplied analog signal into a drive current signal that is supplied through the current detecting circuit 102 to the S reel motor 103. The S reel motor 103 is energized for rotation by the drive current signal supplied through the current detecting circuit 102 from the driver 101.

The current detecting circuit 102 detects the drive current signal from the driver 101, and the detected drive current signal is supplied as the S reel motor detecting signal SRd through the driver 101 and the output terminal 20b to the main microcomputer 4. Depending on the rotation of the S reel motor 103, frequency signals are supplied from the non-illustrated frequency signal generators as the S reel motor frequency signal Sfg1 through the output terminal 20c to the main microcomputer 4 and as the S reel motor frequency signal Sfg2 through the output terminal 20d to the main microcomputer 4.

B-9. S reel hold/stop detector 21 (see FIG. 10).

Figure 10:
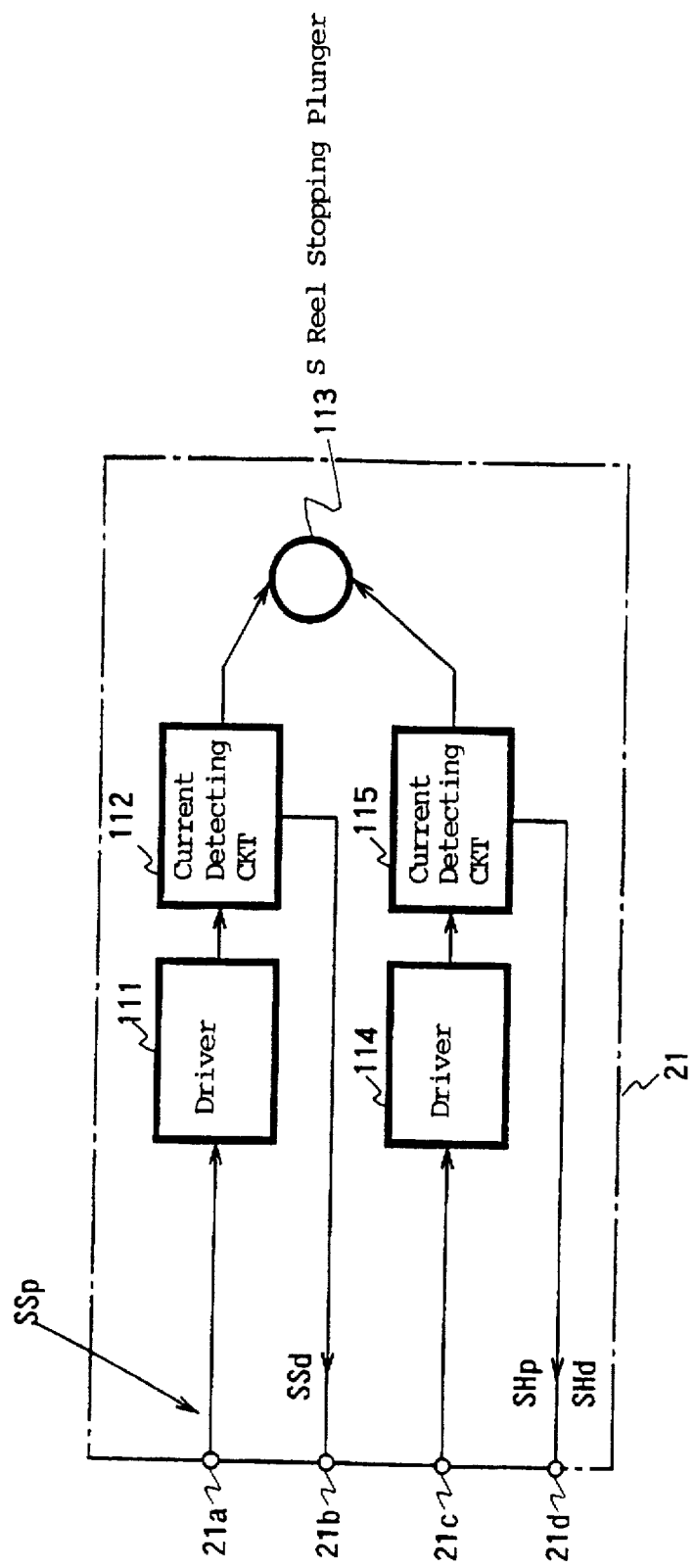
FIG. 10 is a block diagram of an internal structure of an S reel hold/stop detector 21 shown in FIG. 1.

FIG. 10 is a block diagram of an internal structure of the S reel hold/stop detector 21 shown in FIG. 1.

An input terminal 21a is supplied with an S reel stop signal SSp from the main microcomputer 4 of the controller 1 shown in FIG. 1. The input terminal 21a is connected through a driver 111 and a current detecting circuit 112 to an S reel stopping plunger 113. The current detecting circuit 112 has a current detecting output terminal connected to an output terminal 21b for outputting an S reel brake release current detecting signal SSd. An input terminal 21c is supplied with an S reel brake release hold signal SHp from the main microcomputer 4 of the controller 1 shown in FIG. 1. The input terminal 21c is connected through a driver 114 and a current detecting circuit 115 to the S reel stopping plunger 113. The current detecting circuit 115 has a current detecting output terminal connected to an output terminal 21d for outputting an S reel brake release hold current detecting signal SHd.

The S reel stop signal SSp from the main microcomputer 4 shown in FIG. 1 is supplied through the input terminal 21a to the driver 111, which converts the S reel stop signal SSp into a drive current signal. The drive current signal is supplied through the current detecting circuit 112 to the S reel stopping plunger 113. The S reel stopping plunger 113 is energized by the drive current signal supplied through the current detecting circuit 112 from the driver 111, stopping the S reel. The current detecting circuit 112 detects the drive current signal from the driver 111, and the detected drive current signal is supplied as the S reel brake release current detecting signal SSd through the output terminal 21b to the main microcomputer 4.

The S reel brake release hold signal SSp from the main microcomputer 4 shown in FIG. 1 is supplied through the input terminal 21c to the driver 114, which converts the S reel brake release hold signal SSp into a drive current signal. The drive current signal is supplied through the current detecting circuit 115 to the S reel stopping plunger 113. The S reel stopping plunger 113 is energized by the drive current signal supplied through the current detecting circuit 115 from the driver 114, holding the S reel stopped. The current detecting circuit 115 detects the drive current signal from the driver 114, and the detected drive current signal is supplied as the S reel brake release hold current detecting signal SHd through the output terminal 21d to the main microcomputer 4.

B-10. T reel motor detector 22 (see FIG. 11).

Figure 11:
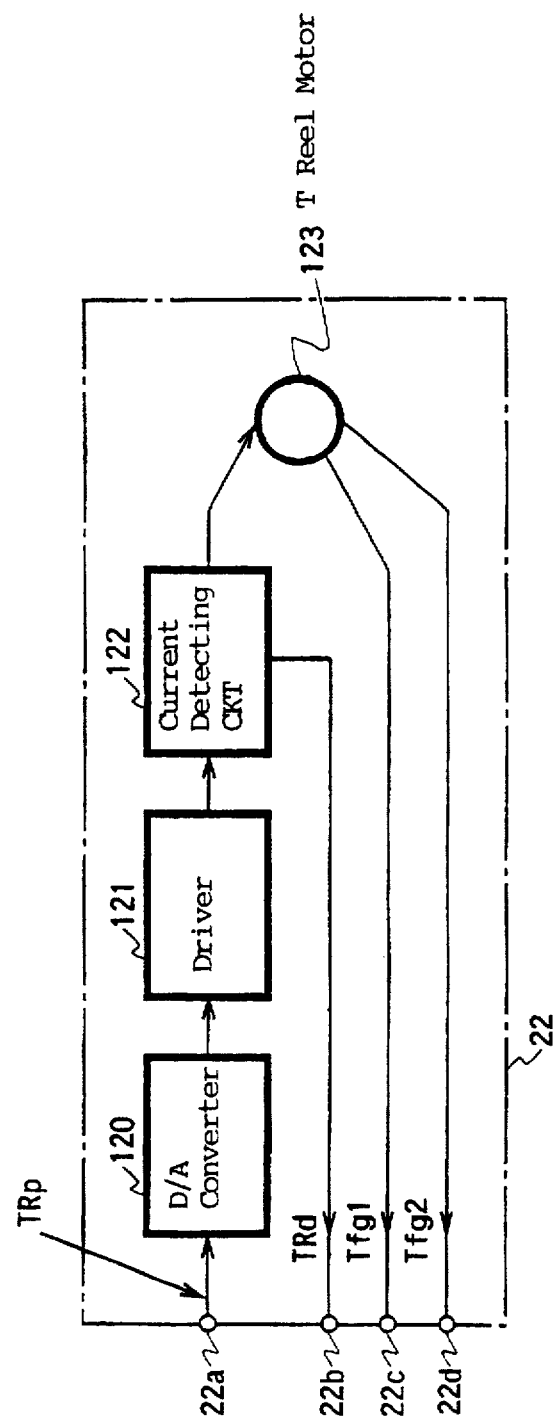
FIG. 11 is a block diagram of an internal structure of a T reel motor detector 22 shown in FIG. 1.
Figure 12:
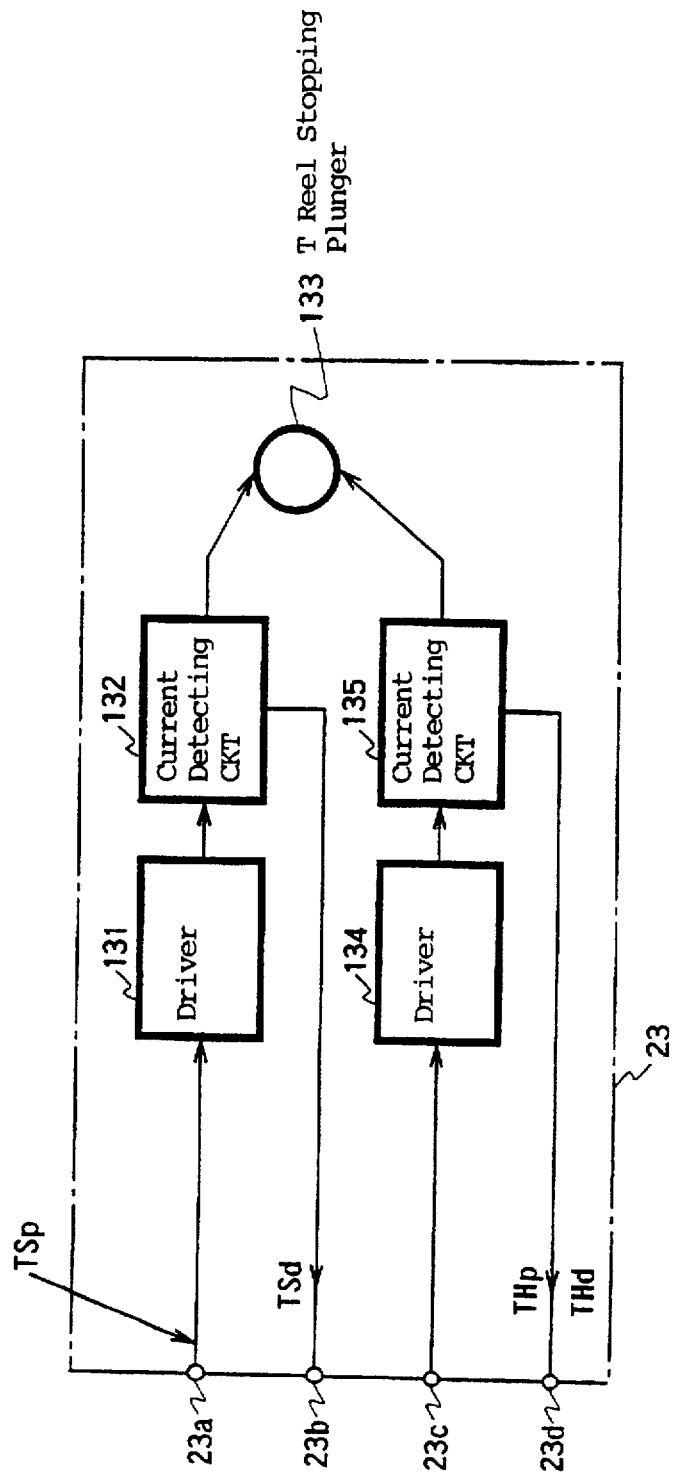
FIG. 12 is a block diagram of an internal structure of a T reel hold/stop detector 23 shown in FIG. 1.

FIG. 11 is a block diagram of an internal structure of the T reel motor detector 22 shown in FIG. 1.

An input terminal 22a is supplied with a T reel motor drive signal TRp from the main microcomputer 4 of the controller 1 shown in FIG. 1. The input terminal 22a is connected through a D/A converter 120, a driver 121, and a current detecting circuit 122 to a T reel motor 123. The current detecting circuit 122 has a current detecting output terminal connected to a control terminal of the driver 121 and an output terminal 22b for outputting a T reel motor detecting signal TRd. The T reel motor 123 has a frequency signal generator (not shown) connected to an output terminal 22c for outputting a T reel motor frequency signal Tfg1 and a frequency signal generator (not shown) connected to an output terminal 22d for outputting a T reel motor frequency signal Tfg2.

The T reel motor 123 is a motor for controlling the rotation of a T reel. The T reel motor frequency signals Tfg1, Tfg2 are 90 degrees out of phase with each other. The rotational speed and direction of the T reel motor 123 are detected based on the reel motor frequency signals Tfg1, Tfg2 which are 90 degrees out of phase with each other.

The T reel motor drive signal TRp from the main microcomputer 4 shown in FIG. 1 is supplied through the input terminal 22a to the D/C converter 120, which converts the T reel motor drive signal SRp into an analog signal. The analog signal is supplied to the driver 121, which converts the supplied analog signal into a drive current signal that is supplied through the current detecting circuit 122 to the T reel motor 123. The T reel motor 123 is energized for rotation by the drive current signal supplied through the current detecting circuit 122 from the driver 121.

The current detecting circuit 122 detects the drive current signal from the driver 121, and the detected drive current signal is supplied as the T reel motor detecting signal TRd through the driver 121 and the output terminal 22b to the main microcomputer 4. Depending on the rotation of the T reel motor 123, frequency signals are supplied from the non-illustrated frequency signal generators as the T reel motor frequency signal Tfg1 through the output terminal 22c to the main microcomputer 4 and as the T reel motor frequency signal Tfg2 through the output terminal 22d to the main microcomputer 4.

B-11. T reel hold/stop detector 23 (see FIG. 12).

FIG. 11 is a block diagram of an internal structure of the T reel motor detector 23 shown in FIG. 1.

An input terminal 23a is supplied with a T reel stop signal TSp from the main microcomputer 4 of the controller 1 shown in FIG. 1. The input terminal 23a is connected through a driver 131 and a current detecting circuit 132 to a T reel stopping plunger 133. The current detecting circuit 132 has a current detecting output terminal connected to an output terminal 23b for outputting a T reel brake release current detecting signal TSd. An input terminal 23c is supplied with a T reel brake release hold signal THp from the main microcomputer 4 of the controller 1 shown in FIG. 1. The input terminal 23c is connected through a driver 134 and a current detecting circuit 135 to the T reel stopping plunger 133. The current detecting circuit 135 has a current detecting output terminal connected to an output terminal 23d for outputting a T reel brake release hold current detecting signal THd.

The T reel stop signal TSp from the main microcomputer 4 shown in FIG. 1 is supplied through the input terminal 23a to the driver 131, which converts the T reel stop signal TSp into a drive current signal. The drive current signal is supplied through the current detecting circuit 132 to the T reel stopping plunger 133. The T reel stopping plunger 133 is energized by the drive current signal supplied through the current detecting circuit 132 from the driver 131, stopping the T reel. The current detecting circuit 132 detects the drive current signal from the driver 131, and the detected drive current signal is supplied as the T reel brake release current detecting signal TSd through the output terminal 23b to the main microcomputer 4.

The T reel brake release hold signal TSp from the main microcomputer 4 shown in FIG. 1 is supplied through the input terminal 23c to the driver 134, which converts the T reel brake release hold signal TSp into a drive current signal. The drive current signal is supplied through the current detecting circuit 135 to the T reel stopping plunger 133. The T reel stopping plunger 133 is energized by the drive current signal supplied through the current detecting circuit 135 from the driver 134, holding the T reel stopped. The current detecting circuit 135 detects the drive current signal from the driver 134, and the detected drive current signal is supplied as the T reel brake release hold current detecting signal THd through the output terminal 23d to the main microcomputer 4.

B-12. Panel of display/operation unit 24 (see FIG. 13).

Figure 13:
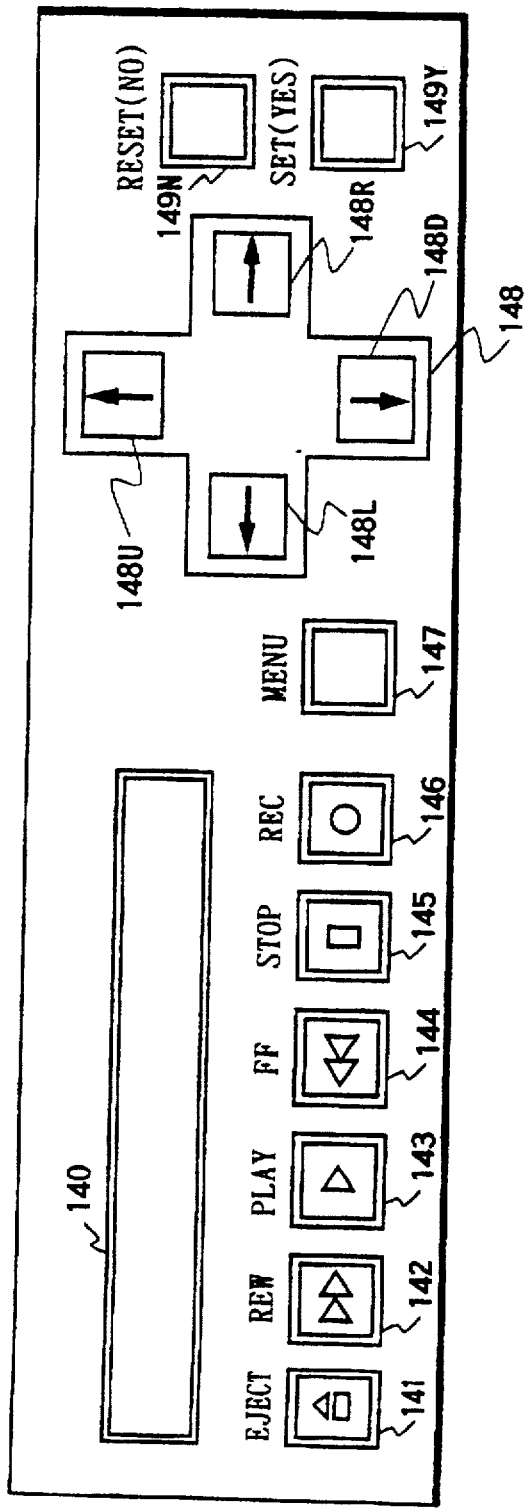
FIG. 13 is a block diagram of a structure of a panel of a display/operation unit 24 shown in FIG. 1.

FIG. 13 is a block diagram of a structure of a panel of the display/operation unit 24 shown in FIG. 1.

A display 140 is capable of displaying time codes and various messages in the maintenance mode. An eject key 141 serves to eject a video tape cassette which has been set in a cassette compartment (described later on). A rewind (REW) key 142 serves to cause the VTR to rewind a tape. A playback (PLAY) key 142 serves to cause the VTR to play back a tape. A fast-forward (FF) key 144 serves to cause the VTR to fast-feed a tape. A stop (STOP) key 145 serves to cause the VTR to stop a tape against transportation. A record (REC) key 146 serves to cause the VTR to record information on a tape. A menu key 147 serves to cause the VTR to enter the maintenance mode and also to shift the VTR from the maintenance mode into a mode for recording information on a tape or playing back a tape. A cursor key 148 is mainly used to select items, etc. in the maintenance mode, and comprises an up key 148U, a down key 148D, a right key 148R, and a left key 148L. A reset (RESET) key 149N functions as a NO key in the maintenance mode. A set (SET) key 149Y functions as a YES key in the maintenance mode.

Input signals from these keys are received by the system microcomputer 2 shown in FIG. 1. In this embodiment, the left key 148L of the cursor key 148 and the menu key 147 are simultaneously pressed (turned on) for shifting the VTR from the recording or playback mode into the maintenance mode for checking the VTR, and only the menu key 147 is pressed (turned on) for shifting the VTR from the maintenance mode into the recording or playback mode.

B-13. Capstan motor detector 25 (see FIG. 14).

Figure 14:
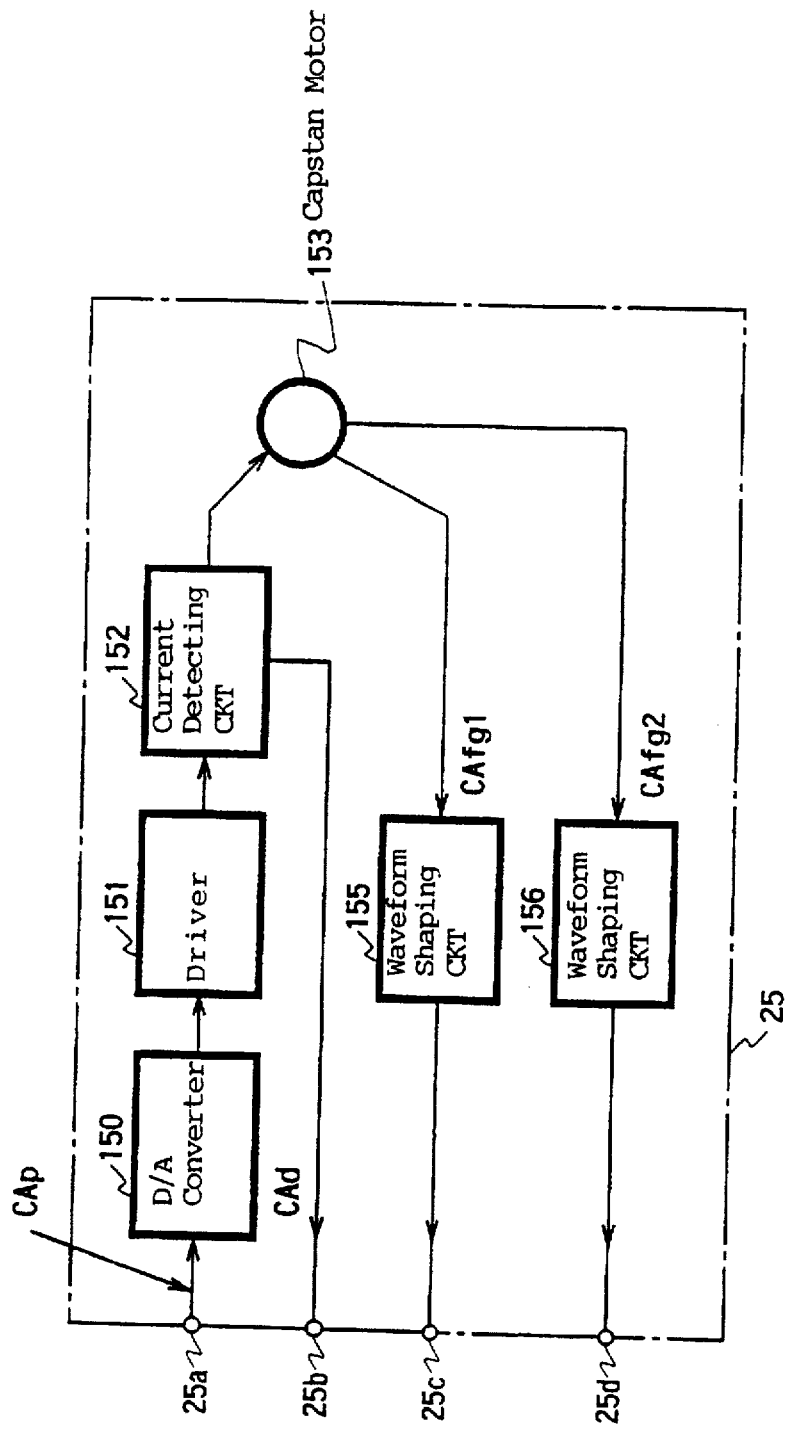
FIG. 14 is a block diagram of an internal structure of a capstan motor detector 25 shown in FIG. 1.

FIG. 14 is a block diagram of an internal structure of the capstan motor detector 25 shown in FIG. 1.

An input terminal 25a is supplied with a capstan motor drive signal DAp from the main microcomputer 4 of the controller 1 shown in FIG. 1. The input terminal 25a is connected through a D/A converter 150, a driver 151, and a current detecting circuit 152 to a capstan motor 153. The current detecting circuit 152 has a current detecting output terminal connected to an output terminal 25b for outputting a capstan motor detecting signal CAd.

The capstan motor 153 has a frequency signal generator (not shown) connected through a waveform shaping circuit 155 to an output terminal 25c for outputting a capstan motor frequency signal CAfg1 and a frequency signal generator (not shown) connected through a waveform shaping circuit 156 to an output terminal 25d for outputting a capstan motor frequency signal CAfg2. The capstan motor frequency signals CAfg1, CAfg2 are 90 degrees out of phase with each other. The rotational speed and direction of the capstan motor 153 are detected based on the capstan motor frequency signals CAfg1, CAfg2 which are 90 degrees out of phase with each other.

The capstan motor drive signal CAp from the main microcomputer 4 shown in FIG. 1 is supplied through the input terminal 25a to the D/C converter 150, which converts the capstan motor drive signal CAp into an analog signal. The analog signal is supplied to the driver 151, which converts the supplied analog signal into a drive current signal that is supplied through the current detecting circuit 152 to the capstan motor 153. The capstan motor 153 is energized for rotation by the drive current signal that is supplied from the driver 151 through the current detecting circuit 152.

The current detecting circuit 152 detects the drive current signal from the driver 151, and the detected drive current signal is supplied as the capstan motor detecting signal CAd through the output terminal 25b to the main microcomputer 4. Depending on the rotation of the capstan motor 153, a frequency signal from the non-illustrated frequency signal generator is shaped in waveform by the waveform shaping circuit 155, and supplied as the capstan motor frequency signal CAfg1 through the output terminal 25c to the main microcomputer 4. Similarly, depending on the rotation of the capstan motor 153, a frequency signal from the non-illustrated frequency signal generator is shaped in waveform by the waveform shaping circuit 156, and supplied as the capstan motor frequency signal CAfg2 through the output terminal 25d to the main microcomputer 4.

B-14. Pinch hold/press detector 26 (see FIG. 15).

Figure 15:
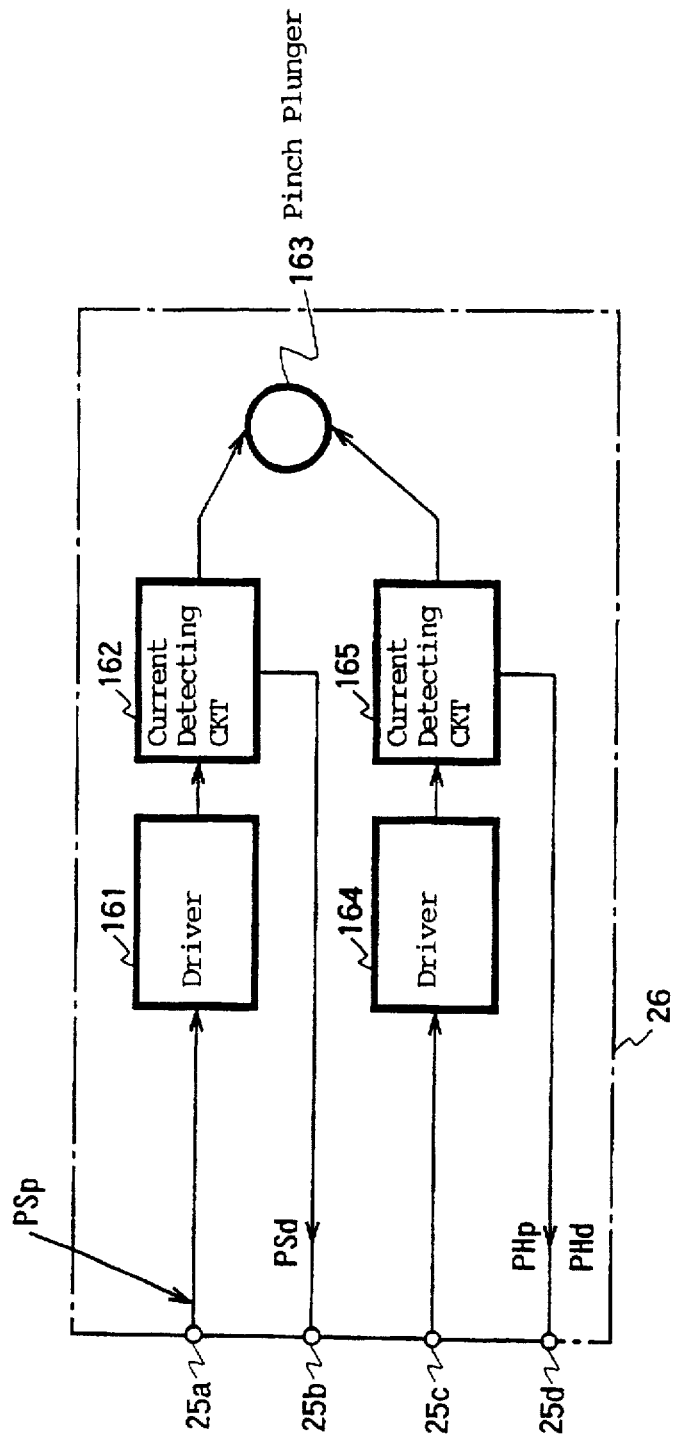
FIG. 15 is a block diagram of an internal structure of a pinch hold/press detector 26 shown in FIG. 1.

FIG. 15 is a block diagram of an internal structure of the pinch hold/press detector 26 shown in FIG. 1.

An input terminal 26a is supplied with a pinch press signal PSp from the main microcomputer 4 of the controller 1 shown in FIG. 1. The input terminal 26a is connected through a driver 161 and a current detecting circuit 162 to a pinch plunger 163. The current detecting circuit 162 has a current detecting output terminal connected to an output terminal 26b for outputting a pinch press current detecting signal PSd. An input terminal 26c is supplied with a pinch press hold signal PHp from the main microcomputer 4 of the controller 1 shown in FIG. 1. The input terminal 26c is connected through a driver 164 and a current detecting circuit 165 to the pinch plunger 163. The current detecting circuit 165 has a current detecting output terminal connected to an output terminal 26d for outputting a pinch press hold current detecting signal PHd.

The pinch press signal PSp from the main microcomputer 4 shown in FIG. 1 is supplied through the input terminal 26a to the driver 161, which converts the pinch press signal PSp into a drive current signal. The drive current signal is supplied through the current detecting circuit 162 to the pinch plunger 163. The pinch plunger 163 is energized by the drive current signal supplied through the current detecting circuit 162 from the driver 161, pressing a pinch roller against the shaft of the capstan motor 153. The current detecting circuit 162 detects the drive current signal from the driver 161, and the detected drive current signal is supplied as the pinch press current detecting signal PSd through the output terminal 26b to the main microcomputer 4.

The pinch press hold signal PHp from the main microcomputer 4 shown in FIG. 1 is supplied through the input terminal 26c to the driver 164, which converts the pinch press hold signal PHp into a drive current signal. The drive current signal is supplied through the current detecting circuit 165 to the pinch plunger 163. The pinch plunger 163 is energized by the drive current signal supplied through the current detecting circuit 165 from the driver 164, holding the pinch roller pressed against the shaft of the capstan motor 153. The current detecting circuit 165 detects the drive current signal from the driver 164, and the detected drive current signal is supplied as the pinch press hold current detecting signal PHd through the output terminal 26d to the main microcomputer 4.

C. Description of an arrangement and operation of a mechanism in the VTR shown in FIG. 1 (see FIG. 16).

Figure 16:
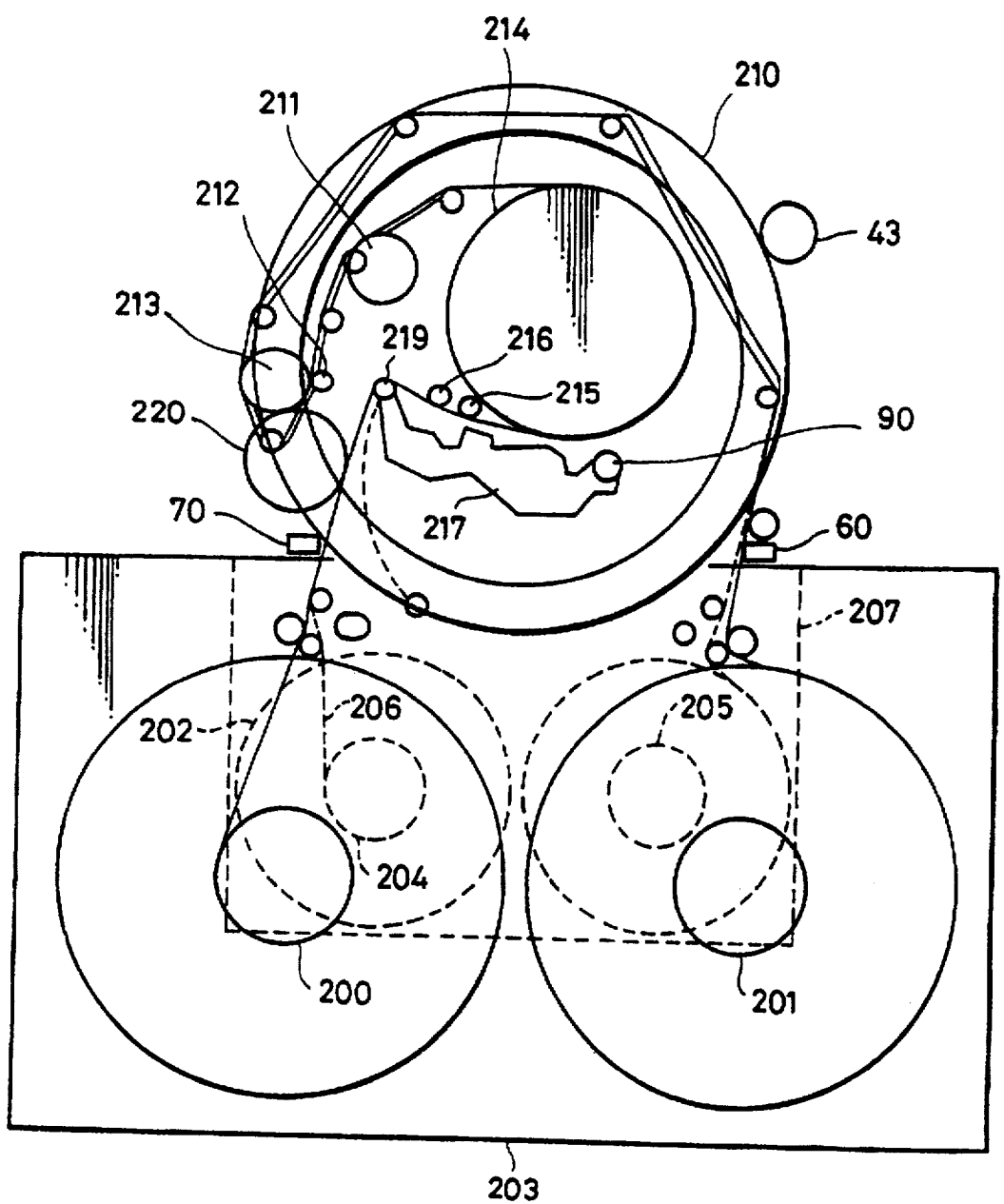
FIG. 16 is a view of a mechanism used in a VTR shown in FIG. 1.

FIG. 16 is a view of a mechanism used in the VTR shown in FIG. 1. Those parts shown in FIG. 16 which correspond to those shown in FIGS. 1–15 are denoted by identical reference numerals, and will not be described in detail below. In FIG. 16, a large cassette (L cassette) set in position is indicated by the solid lines, and a small cassette (S cassette) by the broken lines.

An L cassette 203 supplies or winds a magnetic tape 202 (as indicated by the solid lines) with an S reel 200 and a T reel 201. An S cassette 207 supplies or winds a magnetic tape 206 (as indicated by the broken lines) with an S reel 204 and a T reel 205. For illustrative purpose, the VTR mechanism will be described with the L cassette 203 set in position.

A threading ring 210 serves to draw the magnetic tape 202 from the L cassette 203 and wind the magnetic tape 202 around a drum 214. An audio/time code head 211 serves to record and reproduce audio data and time codes. A capstan 212 and a pinch roller 213 serve to transport the magnetic tape 202. A CTL head 215 serves to record and reproduce control pulses. A fixed head 216 serves to record and reproduce an audio signal. A tension regulator 219 serves to adjust the tape tension of the magnetic tape 202 based on an output signal from the tension sensor 90. The tension regulator 219 is mounted on an end of a tension regulator arm 217. A full erase head 220 serves to erase signals recorded on the magnetic tape 202.

When the L cassette 203 is inserted into the mechanism deck by the cassette compartment, the threading motor 43 is actuated under the control of the main microcomputer 4 shown in FIG. 1. The threading ring 210 is now rotated, drawing the magnetic tape 202 from the L cassette, guiding the magnetic tape 202 successively with tape guides, and winding the magnetic tape 202 around the drum 214. The tension regulator arm 217 is turned as indicated by the broken line until the tension regulator 219 abuts against the magnetic tape 202. The position for the threading motor 43 to stop the rotation of the threading ring 210 is recognized based on a detected output signal from the threading end detector 9 which has already been described above.

When the magnetic tape 202 is transported in a normal direction, the magnetic tape 202 as it is wound on the S reel 200 engages and moves past successively tape guides, the tape end sensor 70, the tension regulator 219, the fixed head 216, the CTL head 215, the drum 214, the audio/time code head 211, the capstan 212, the pinch roller 213, tape guides, and the tape top sensor 60, and is then wound on the T reel 210. When the magnetic tape 202 is transported in a reverse direction, the magnetic tape 20 as it is wound on the T reel 210 is eventually wound on the S reel 200.

D. Description of an arrangement and operation of the controller in the VTR shown in FIG. 1 (see FIG. 17).

Figure 17:
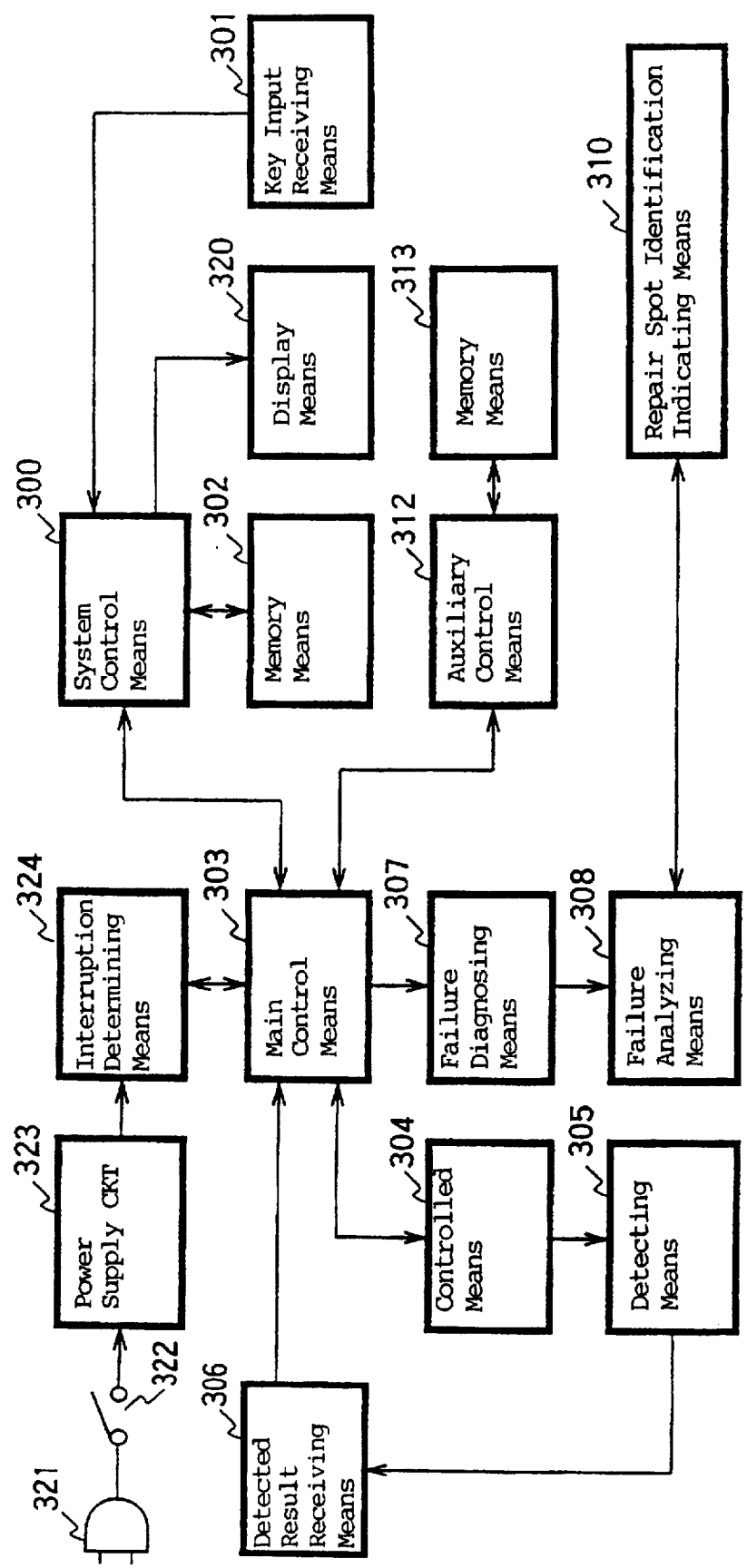
FIG. 17 is a block diagram of functions of a central portion of the method of and the apparatus for diagnosing a device according to the present invention.

FIG. 17 is a block diagram of functions of the controller 1 shown in FIG. 1.

[Connection and Arrangement]

A system control means 300 judges key input data entered by a key input receiving means 301, based on data stored in a memory means 302, and controls a main control means 303 based on its judgment, reads character data stored in the memory means 302 based on corresponding message data (code) from the main control means 303, and displays the read character data on a display means 320.

The key input receiving means 301 receives input signals from the various keys on the panel (see FIG. 13) of the display/operation unit 24 shown in FIG. 1. The memory means 302 stores character data and data for judging key input signals. The system control means 300, the key input receiving means 301, and the memory means 302 correspond to the system microcomputer 2 and the character generator 3 shown in FIG. 1, and the display means 320 corresponds to the display/operation unit 24 and the monitor 23 shown in FIG. 1.

The main control means 303 controls a controlled means 304 and an auxiliary control means 312 according to indications from the system control means 300. The controlled means 304 and a detecting means 305 correspond to the detectors 7, 8, . . . 27 and timer and current detecting functions of the controller 1. A detected result receiving means 306 receives a detected output signal from the detecting means 305, and supplies a detected result thereof to the main control means 303. The main control means 303 indicates the detected result from the detected result receiving means 306 to a failure diagnosing means 307.

Based on the indicated detected result from the main control means 303, the failure diagnosing means 307 diagnoses a failure, e.g., determines whether a detected current is of an abnormal value or not, and indicates a determined result to a failure analyzing means 308. The failure analyzing means 308 analyzes the determined result from the failure diagnosing means 307. A repair spot identification indicating means 310 issues a command for identifying a repair spot based on an analyzed result from the failure analyzing means 308.

Specifically, if the failure diagnosing means 307 detects an abnormal current value or the like, then the failure analyzing means 308 generates a train of data indicative of a diagnosed location for identifying a failure location from a location where the abnormal current value occurs. For example, if the output level of a video signal goes abnormal, it is necessary to individually diagnose circuits and parts which may possibly make the output level of a video signal abnormal in order to finally detect which faulty part has caused the abnormal condition. The sequence in which the circuits and parts are diagnosed needs to be altered depending on the nature of the abnormal condition. The failure diagnosing means 307 gives the sequence in which the circuits and parts are diagnosed to the repair spot identification indicating means 310, and gives data indicative of circuits and parts to be diagnosed, in that diagnostic sequence, to the repair spot identification indicating means 310 for thereby enabling the repair spot identification indicating means 310 to issue a command for identifying a failure location which causes a certain failure. Based on the data indicative of diagnostic locations from the failure analyzing means 308, the repair spot identification indicating means 310 generates message data to be outputted successively to the display means 320 for prompting the operator to identify a failure location.

The main control means 303, the detected result receiving means 306, the failure diagnosing means 307, the failure analyzing means 308, the repair spot identification indicating means 310, and a repair sequence indicating means 311 correspond to the main microcomputer 4 shown in FIG. 4.

The auxiliary control means 312 serves to store a failure diagnosing result and an interrupted diagnosis from the main control means 303 into a memory means 313. The auxiliary control means 312 and the memory means 313 correspond to the submicrocomputer 5 and the nonvolatile memories 6a, 6b shown in FIG. 1.

A switch 322 serves to turn on and off an alternating-current electric energy from a general commercially available power supply 321. A power supply circuit 323 serves to convert the alternating-current electric energy from the general commercially available power supply 321 into an electric energy required to operate circuits and motors. When an indication signal (a signal indicating that the power supply is turned on from its turn-off state) becomes active, an interruption determining means 324 obtains data representative of an interrupted diagnosis stored in the memory means 313, through the main control means 303 and the auxiliary control means 312, and determines whether there has been an interrupted diagnosis or not when the power supply is turned on, based on the obtained data.

When input data indicative of the maintenance mode are supplied to the key input receiving means 301 through the display/operation unit 24 shown in FIG. 1, the system control means 300 decides that the maintenance mode has been indicated from the data stored in the memory means 302, and indicates the indication of the maintenance mode to the main control means 303.

The main control means 303 controls the controlled means 304. When the controlled means 304 is controlled to operate, the detecting means 305 detects the operation of the controlled means 304, and indicates a detected result to the detected result receiving means 306. When the detected result receiving means 306 receives the detected result from the detecting means 305, the main control means 303 indicates the detected result to the failure diagnosing means 307. The failure diagnosing means 307 detects a failure based on the detected result from the main control means 303, and indicates a detected result to the failure analyzing means 308.

Based on the diagnosed result from the failure diagnosing means 307, the failure analyzing means 308 analyzes the failure, generates data indicative of a portion to be diagnosed based on the analyzed result, and supplies the data to the repair spot identification indicating means 310.

Subsequently, the main control means 303 obtains message data for issuing a command to specify a repair spot from the repair spot identification indicating means 310, and supplies the obtained message data to the system control means 300. The system control means 300 converts message data supplied from the main control means 303 into corresponding character data stored in the memory means 302, and outputs the character data. The outputted character data are supplied to the display means 320, and displayed as an image on its display screen.

When the power supply is turned on, the interruption determining means 324 supplies data indicating that the power supply is turned on to the main control means 303, based on an indication signal from the power supply circuit 323. When the data indicating that the power supply is turned is supplied from the interruption determining means 324, the main control means 303 instructs the auxiliary control means 312 to output data indicative of whether there has been an interrupted diagnosis or not and also diagnosis number data indicative of any interrupted diagnosis. Based on the instruction from the main control means 303, the auxiliary control means 312 outputs diagnosis number data from the memory means 313. The diagnosis number data are supplied through the auxiliary control means 312 and the main control means 303 to the interruption determining means 324.

Based on the data indicative of whether there has been an interrupted diagnosis or not, supplied through the auxiliary control means 312 and the main control means 303, the interruption determining means 324 determines whether there has been an interrupted diagnosis or not. If there has been an interrupted diagnosis, then the interruption determining means 324 instructs the main control means 303 to carry out the interrupted diagnosis. The main control means 303 instructs the system control means 300 to output a message. Thereafter, if there is information from the system control means 300 indicating that the user has given an indication to carry out the interrupted diagnosis, then the main control means 303 instructs the auxiliary control means 312 to output diagnostic data. When diagnostic data of the interrupted diagnosis are supplied from the auxiliary control means 312, the main control means 303 start the above diagnostic operation based on the diagnostic data of the interrupted diagnosis.

The diagnostic data comprise algorithm data established when the diagnosis has been interrupted, positional data in the interrupted algorithm, and data indicative of a device. The algorithm is a sequence of diagnostic steps for a device to be diagnosed, and may be referred to as a diagnostic process.

In a second embodiment, when an indication signal is supplied from the power supply circuit 323, the interruption determining means 324 does not determine whether there has been an interrupted diagnosis. Instead, when the power supply is turned on, the main control means 303 unconditionally determines whether there has been an interrupted diagnosis.

E. Description of a specific arrangement of the S reel hold/stop detector 21 in the VTR shown in FIG. 1 (see FIG. 18).

Figure 18:
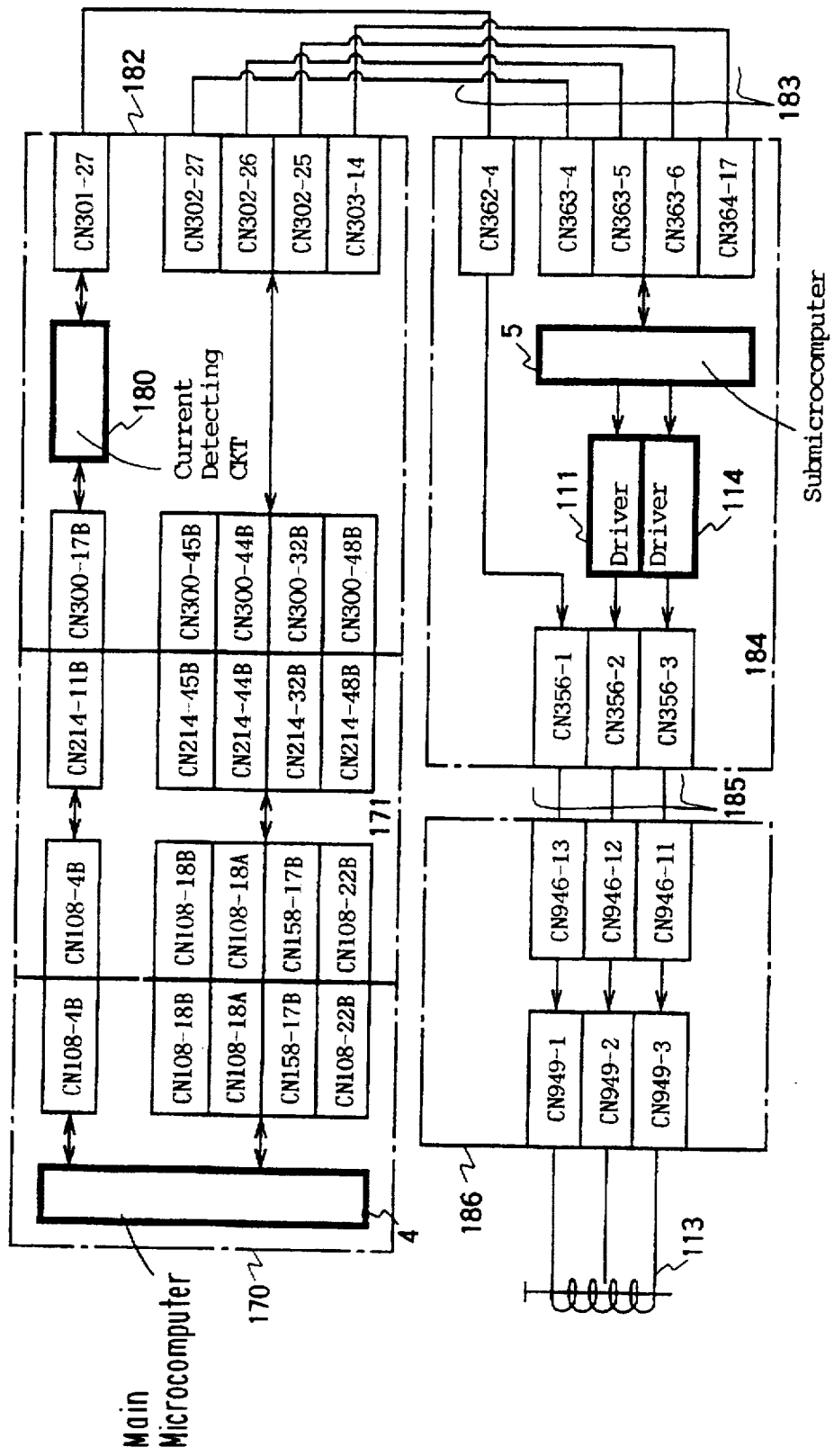
FIG. 18 is a block diagram of a specific arrangement of the S reel hold/stop detector shown in FIG. 10.

FIG. 18 is a block diagram of a specific arrangement of the S reel hold/stop detector 21 shown in FIG. 10. Those parts shown in FIG. 18 which correspond to those when in FIGS. 1~17 are denoted by identical reference numerals, and will not be described in detail below. FIG. 18 is used in a subsequent description which will be given using flowcharts and displayed screen images shown in FIGS. 45~54.

The S reel hold/stop detector 21 shown in specific detail in FIG. 18 comprises a first board 170, a second board 171, a third board 182, a fourth board 184, and a fifth board 186. The main microcomputer 4 is mounted on the first board 170, a current detecting circuit 180 on the third board 182, and the submicrocomputer 5 and the drivers 111, 114 on the fourth board 184.

Connectors CN108-4B, CN108-18B, CN108-18A, CN158-17B, CN108-22B on the first board 170, and connectors CN108-4B, CN108-18B, CN108-18A, CN158-17B, CN108-22B on the second board 171 are connected respectively to each other, thus electrically connecting the first board 170 and the second board 171 to each other.

Connectors CN214-11B, CN214-45B, CN214-44B, CN214-32B, CN214-48B on the second board 171 and connectors CN300-17B, CN300-45B, CN300-44B, CN300-32B, CN300-48B on the third board 182 are connected respectively to each other, thus electrically connecting the second board 181 and the third board 182 to each other. On the second board 171, the connectors CN108-4B, CN108-18B, CN108-18A, CN158-17B, CN108-22B which are connected to the first board 170 are connected respectively to the connectors CN214-11B, CN214-45B, CN214-44B, CN214-32B, CN214-48B which are connected to the third board 182.

Connectors CN301-27, CN302-27, CN302-26, CN302-25, CN303-14 on the third board 182 and connectors CN362-4, CN363-4, CN363-5, CN363-6, CN364-17 on the fourth board 184 are electrically connected respectively to each other by a harness 183. On the third board 182, the connectors CN300-17B, CN300-45B, CN300-44B, CN300-32B, CN300-48B which are connected to the second board 171 are connected respectively to the connectors CN301-27, CN302-27, CN302-26, CN302-25, CN303-14 which are connected to the fourth board 184.

Connectors CN356-1, CN356-2, CN356-3 on the fourth board 184 and connectors CN946-13, CN946-12, CN946-11 on the fifth board 186 are electrically connected respectively to each other by a harness 185. On the fourth board 184, the connector CN362-4 which is connected to the third board 182 is connected to the connector CN356-1 which is connected to the fifth board 186, and the connectors CN363-4, CN363-5, CN363-6, CN364-17 which are connected to the third board 182 are connected through the submicrocomputer 5 and the drivers 111, 114 respectively to the connectors CN356-2, CN356-3 which are connected to the fifth board 186.

Connectors CN949-1, CN949-2, CN949-3 on the fifth board 186 are connected to the plunger 113. On the fifth board 186, the connectors CN946-13, CN946-12, CN946-11 which are connected to the fourth board 184 are connected respectively to the connectors CN949-1, CN949-2, CN949-3 which are connected to the plunger 113.

Therefore, the first board 170, the second board 171, the third board 182, the fourth board 184, the fifth board 186, and the plunger 113 are electrically connected to allow the main microcomputer 4 to control the plunger 113.

F. Description of operation for selecting maintenance items (see FIGS. 19 and 20).

Figure 19:
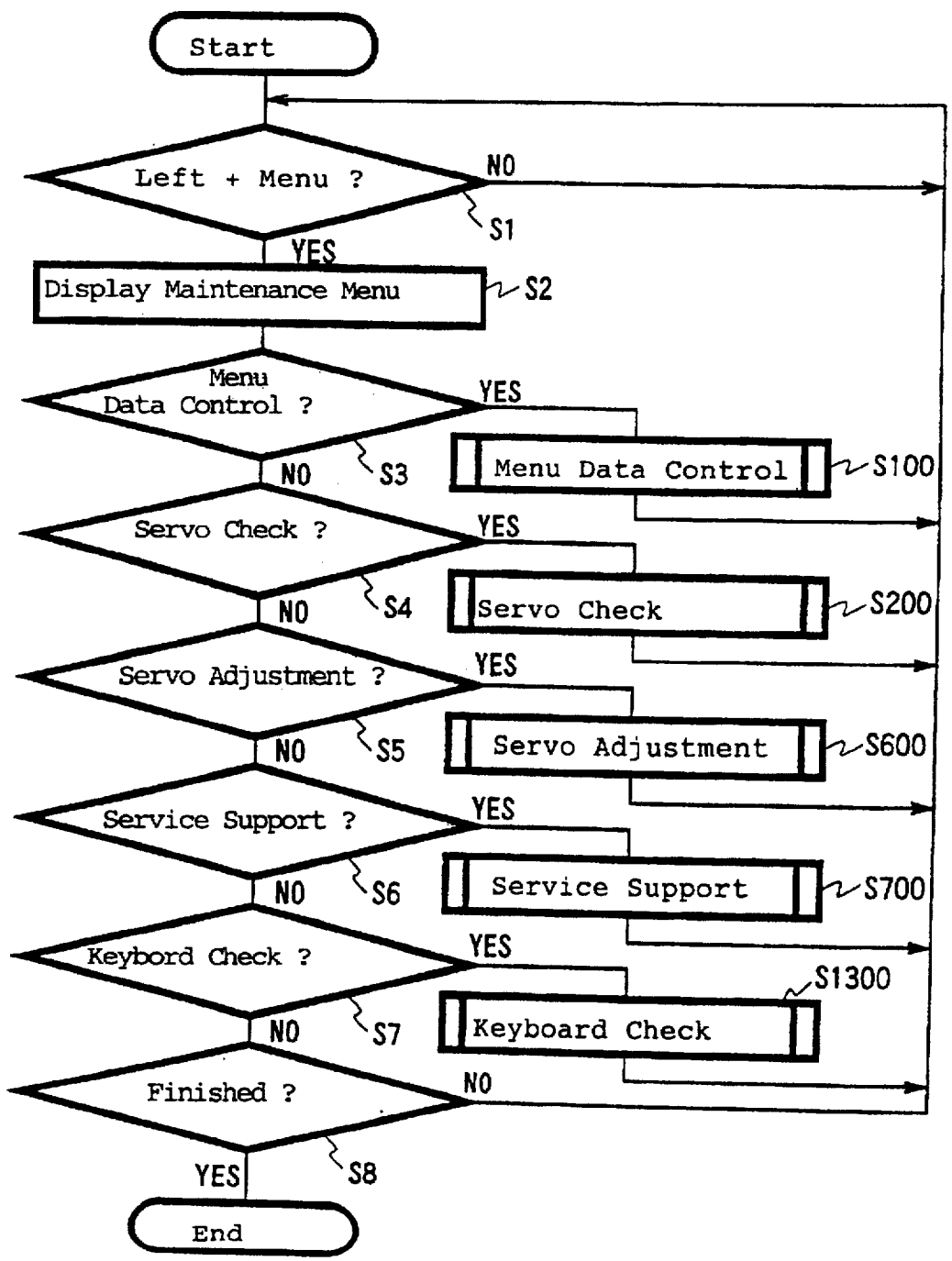
FIG. 19 is a flowchart of a main routine illustrative of operation of the method of and the apparatus for diagnosing a device according to the present invention.

FIG. 19 is a flowchart illustrative of operation for selecting maintenance items.

First, it is determined in a step S1 whether the left key 148L and the menu key 147 shown in FIG. 13 have been pressed or not. If "YES", then control goes to a step S2, entering a maintenance mode.

In the step S2, the system control means 302 shown in FIG. 17 reads character data corresponding to a maintenance menu stored in the memory means 302, supplies the read character data to the display means 320 shown in FIG. 17, and displays the character data as an image representing a maintenance menu on the display means 320.

Figure 20:
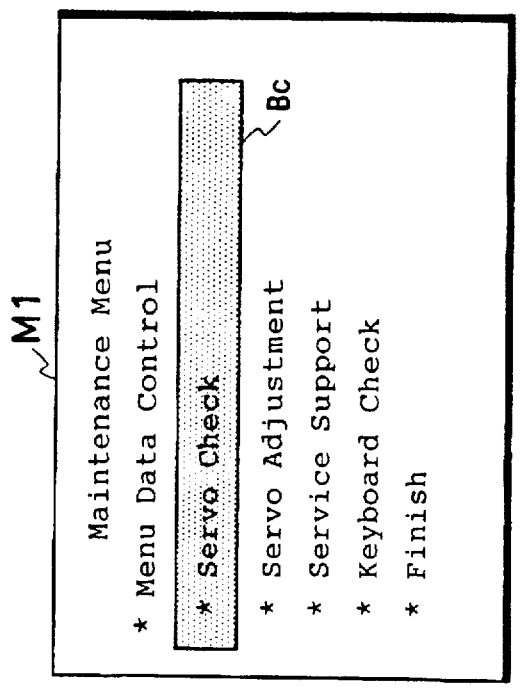
FIG. 20 is a view showing a displayed screen image used in operation of the main routine of the flowchart shown in FIG. 19.

FIG. 20 shows a displayed screen image of a maintenance menu M1. In the maintenance menu M1, a servo check is shown as being selected by a bar cursor Bc. In this embodiment, the up key 148U and the down key 148D of the cursor key 148 shown in FIG. 18 are used to select an item on a selection image, and the YES key 149Y shown in FIG. 13 is used to determine a selected item. The menu key 147 shown in FIG. 13 is pressed alone for returning from the displayed maintenance menu M1 to the recording or playback mode and also for returning from a routine in a layer lower than the routine in which the maintenance menu M1 is displayed, to an upper layer.

It is determined in a step S3 whether a selected item is menu data control or not. If "YES", then control goes to a step S100, and if "NO", then control goes to a step S4.

It is determined in the step S4 whether a selected item is servo check or not. If "YES", then control goes to a step S200, and if "NO", then control goes to a step S5.

It is determined in the step S5 whether a selected item is servo adjustment or not. If "YES", then control goes to a step S600, and if "NO", then control goes to a step S6.

It is determined in the step S6 whether a selected item is service support or not. If "YES", then control goes to a step S700, and if "NO", then control goes to a step S7.

It is determined in the step S7 whether a selected item is keyboard check or not. If "YES", then control goes to a step S1300, and if "NO", then control goes to a step S8.

It is determined in the step S8 whether the selection of maintenance items is finished or not. If "YES", then the selecting process goes to an end. If "NO", then control returns to the step S1. The step S8 is judged "YES" if the menu key 148 is pressed alone.

G. Description of operation for selecting servo check items (see FIGS. 21 and 22).

Figure 21:
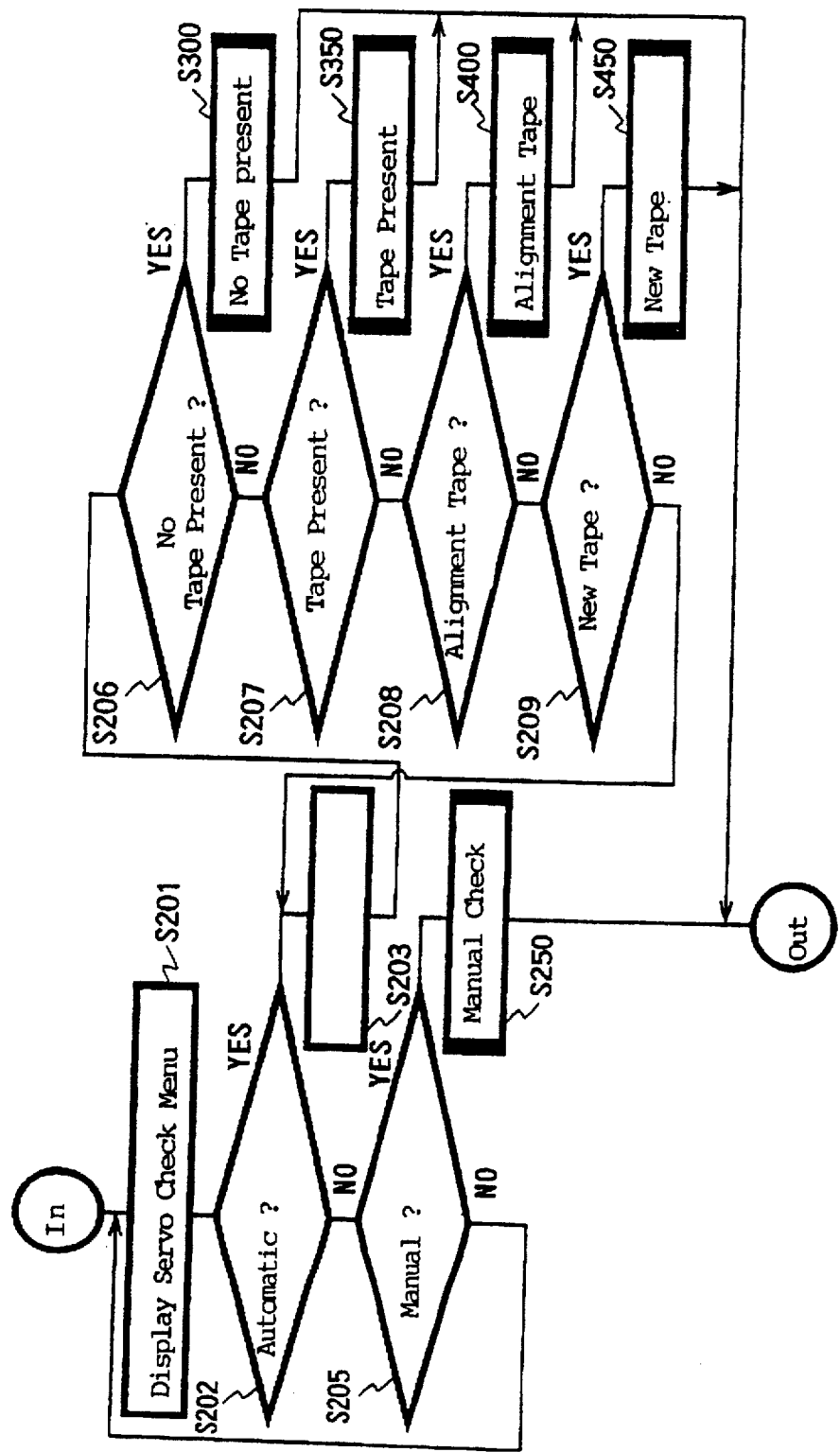
FIG. 21 is a flowchart of a subroutine (servo check) illustrative of operation of the method of and the apparatus for diagnosing a device according to the present invention.

FIG. 21 is a flowchart illustrative of operation when the servo check on the maintenance menu M1 shown in FIG. 20 is selected.

If control goes to the servo check routine 200 shown in FIG. 19, then a servo check menu is displayed in a step S201 shown in FIG. 21, and then control goes to a step S202. In the step S201, the system control means 300 shown in FIG. 17 displays a maintenance menu M2 shown in FIG. 22 on the display means 320.

It is determined in the step S202 whether automatic check is selected or not. If "YES", then control goes to a step S203, and if "NO", then control goes to a step S205.

It is determined in the step S205 whether manual check is selected or not. If "YES", then control goes to a step S250, and if "NO", then control goes back to the step S201.

In the step S203, an automatic check menu is displayed. In this step S203, the system control means 300 shown in FIG. 17 displays an automatic check menu M3 shown in FIG. 22 on the display means 320.

It is determined in a step S206 whether no tape is present or not. If "YES", then control goes to a step S300, and if "NO", then control goes to a step S207.

It is determined in the step S207 whether a tape is present or not. If "YES", then control goes to a step S350, and if "NO", then control goes to a step S208.

It is determined in the step S208 whether the tape is an alignment tape or not. If "YES", then control goes to a step S450, and if "NO", then control goes to a step S209. The alignment tape is a reference tape used to confirm tape transportation and check the locking phase of drum heads, the tape being produced in order to record data thereon out of overlapping relation to each other with two or more recording and playback heads.

It is determined in the step S209 whether the tape is a new tape or not. If "YES", then control goes to a step S500, and if "NO", then control goes back to the step S203.

G-1. Description of operation for a check with no tape being present (see FIGS. 23–26).

FIGS. 23 through 26 are flowcharts illustrative of operation when control goes to the step S300 in the flowchart shown in FIG. 21.

Figure 23:
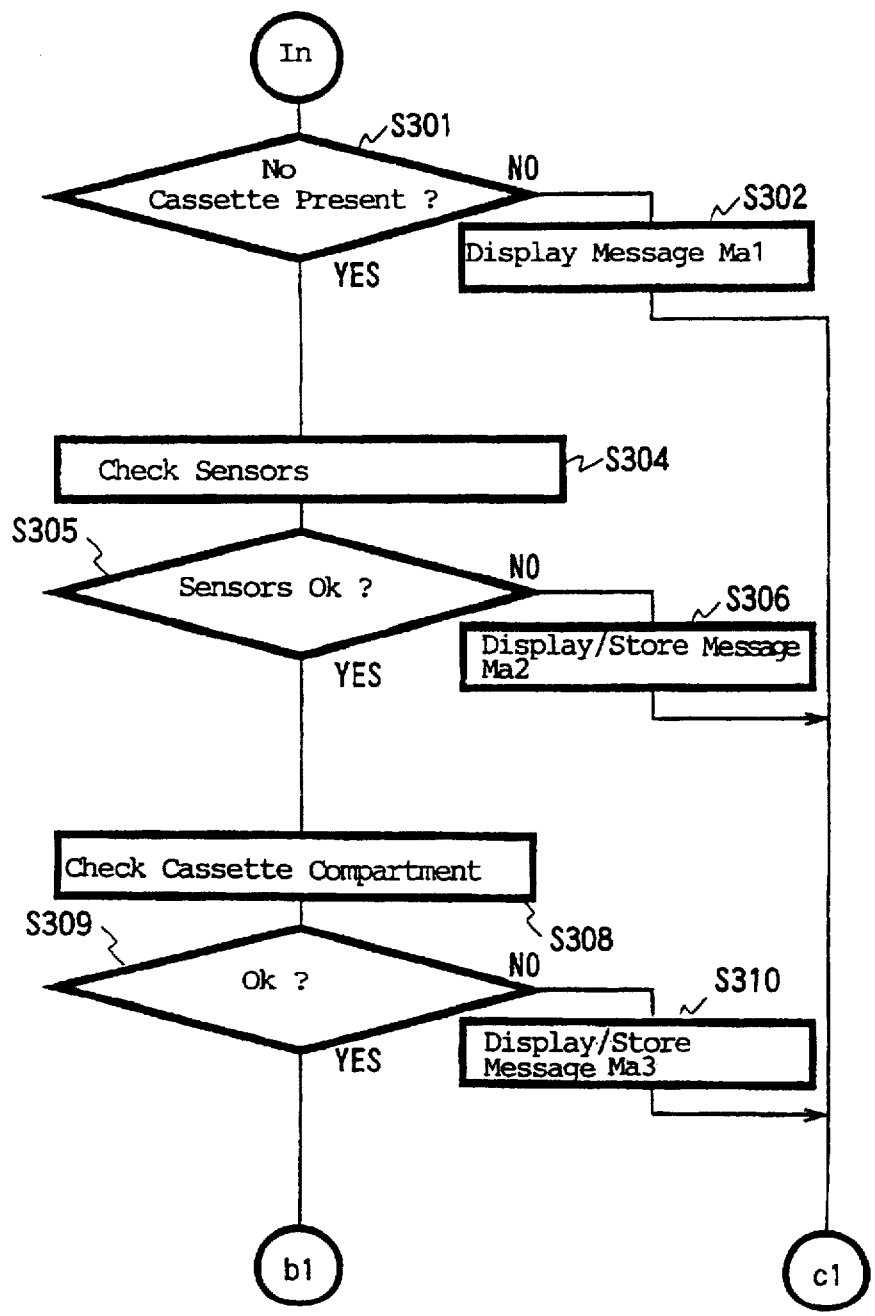
FIG. 23 is a flowchart of a subroutine (check with no tape being present) illustrative of operation of the method of and the apparatus for diagnosing a device according to the present invention.
Figure 24:
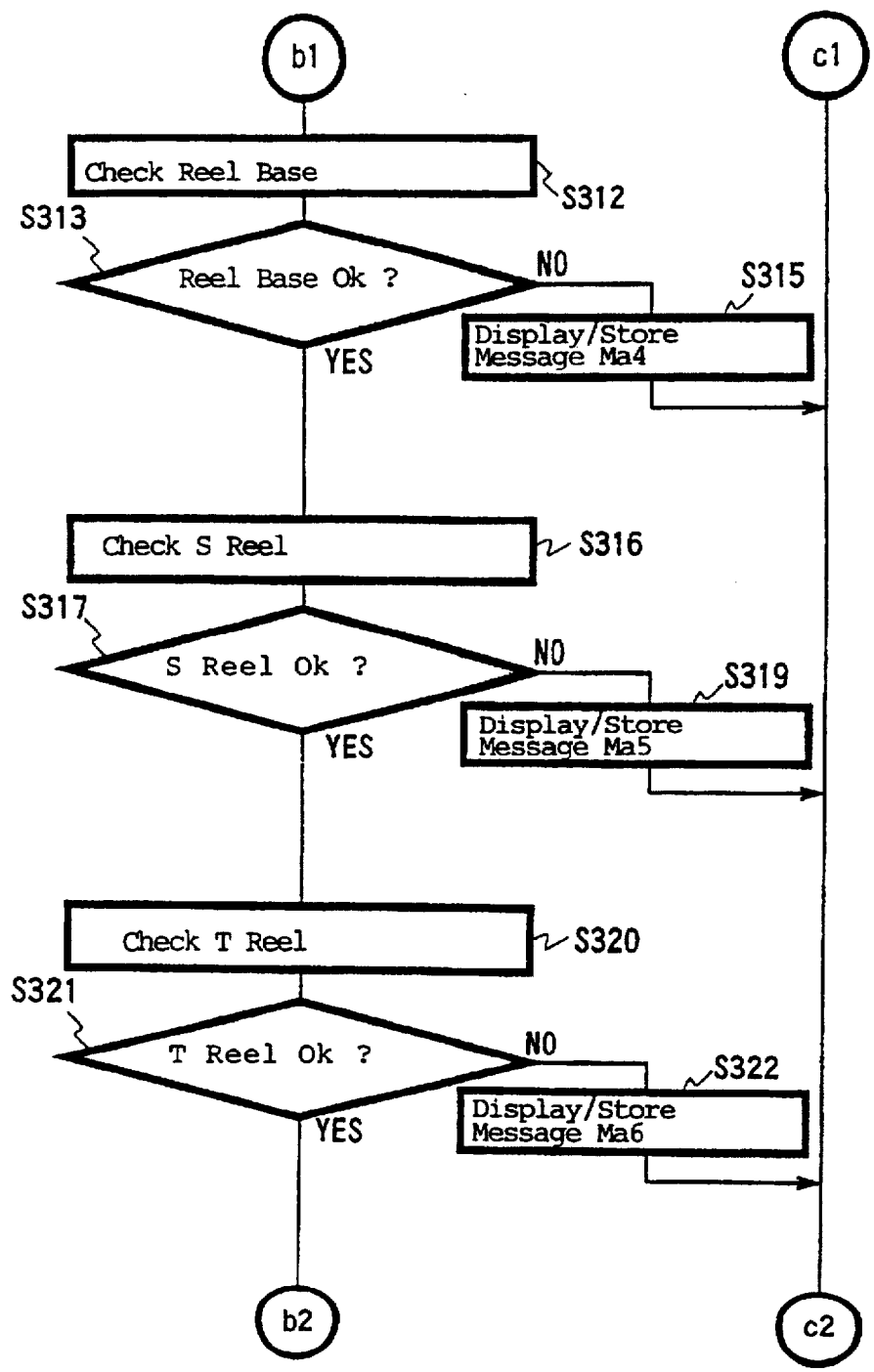
FIG. 24 is a flowchart of the subroutine (check with no tape being present) illustrative of operation of the method of and the apparatus for diagnosing a device according to the present invention.
Figure 25:
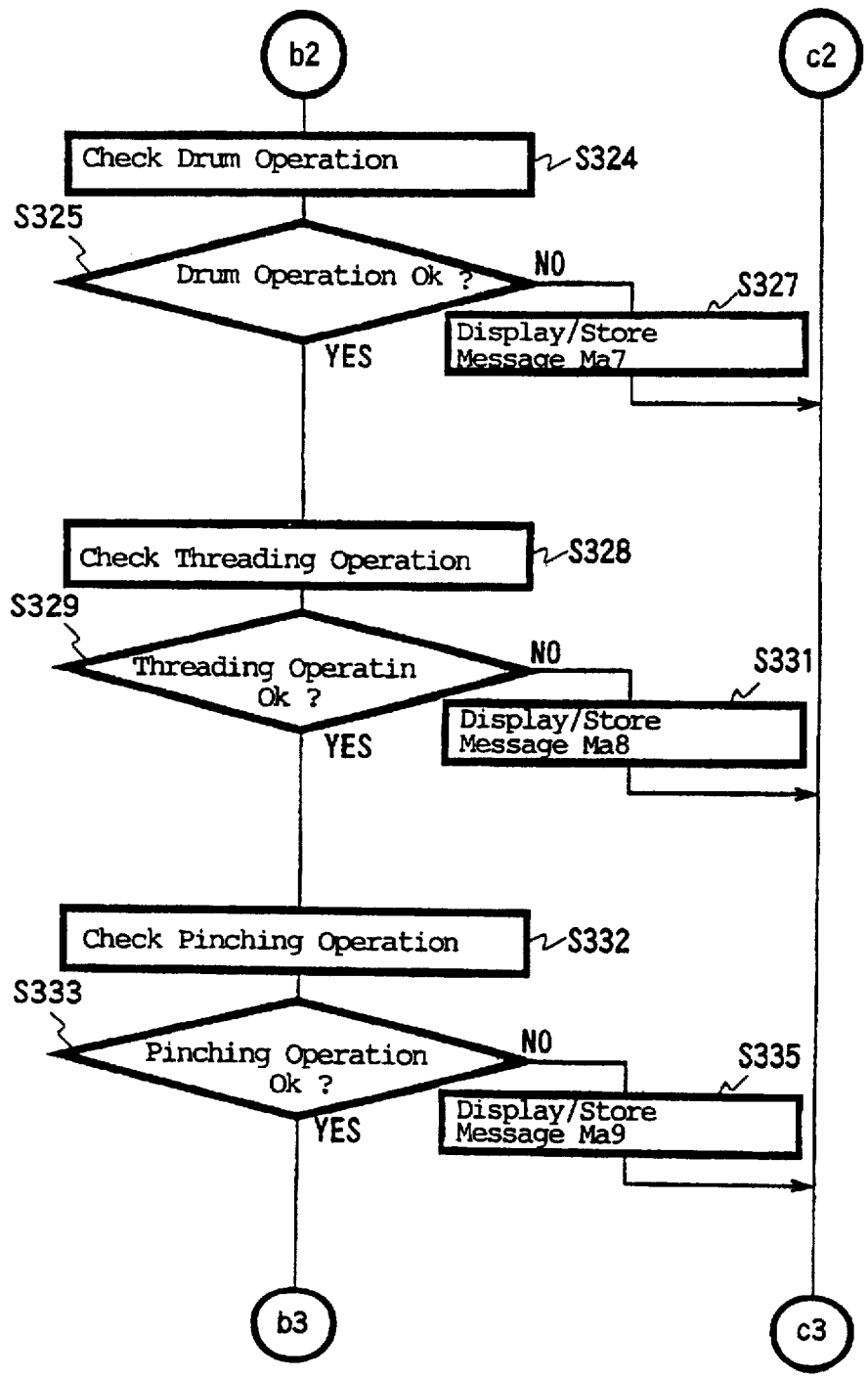
FIG. 25 is a flowchart of the subroutine (check with no tape being present) illustrative of operation of the method of and the apparatus for diagnosing a device according to the present invention.

It is determined in a step S301 shown in FIG. 23 whether there is a video tape cassette or not. If "YES", then control goes to a step S304, and if "NO", then control goes to a step S302.

In the step S302, a message Ma1 is displayed. Thereafter, control leaves this routine. The message Ma1 contains the following statement:

message Ma1 . . . Eject video tape cassette if it is to be checked

In the step S304, sensors are checked. Specifically, output signals from hub sensors and a metal/oxide sensor, output signals from cassette-in sensors (two locations), an output signal from the large position detector 12, an output signal from the small position detector 13, an output signal from the tape top detector 14, an output signal from the tape end detector 15, an output signal from a frost sensor, and an output sensor from a recording inhibit sensor are checked. These sensors are judged as OK if the output signals are normal continuously for 1 second within a sample period of 3 seconds.

It is determined in a step S305 whether each of the sensors is OK or not. If "YES", then control goes to a step S308, and if "NO", then control goes to a step S306.

In the step S306, a message Ma2 is displayed, and the main control means 17 shown in FIG. 1 supplies data representing which sensor is in error to the auxiliary control means 312. Then, control leaves this routine. The auxiliary control means 312 stores the data supplied from the main control means 17 into the memory means 313. It is assumed that the main control means 17 controls the auxiliary control means 312 to store all error data. The message Ma2 contains the following statement:

| |
|---|
| Message Ma2 ... Hub sensors NG |
| ... Metal/oxide sensor NG |
| ... Cassette-in sensors NG |
| ... Large/small position sensors NG |
| ... Tape top/end sensors NG |
| ... Frost sensor NG |
| ... Recording inhibit sensor NG |

In the step S308, the cassette compartment motor detector shown in FIG. 1 is operated to vertically move the cassette compartment, and it is checked whether vertical movement of the cassette compartment is completed in 4 seconds, for example. Furthermore, output signals from the cassette compartment position detectors 17, 18 are checked.

It is determined in a step S309 whether the cassette compartment is OK or not. If "YES", then control goes to a step S312, and if "NO", then control goes to a step S310.

In the step S310, a message Ma3 is displayed, and data indicating that an error has occurred in the checking of the cassette compartment are stored. Then, control leaves this routine. The message Ma3 contains the following statement:

| |
|---|
| Message Ma3 ... Cassette compartment down time over |
| ... Cassette compartment up time over |

It is determined in the step S312 whether reel base movement for each of the S and L cassettes is completed in 4 seconds, for example, or not, using the reel position motor detector 10.

It is determined in a step S313 whether the result of the checking of the reel base is OK or not. If "YES", then control goes to a step S316, and if "NO", then control goes to a step S315.

In the step S315, a message Ma4 is displayed, and data indicating that an error has occurred in the checking of the reel base are stored. Then, control leaves this routine. The message Ma4 contains the following statement:

| |
|---|
| Message Ma4 ... Reel position S → L time over |
| ... Reel position L → S time over |

In the step S316, the following check is carried out using the S reel motor detector 20 and the S reel hold/stop detector 21:

1. The current value of each of the S reel motor stop signal SRp and the S reel hold signal SHp $\leq$ 500 mA.
2. The duty cycle of the S reel motor frequency signals Sfg1, Sfg2.
3. Wind in/wind out
4. Offset/friction
   A readjusted value and a present adjusted value are compared, and it is determined whether the difference is ±5.
5. Torque
   A readjusted value and a present adjusted value are compared, and it is determined whether the difference is ±10.
6. The number of pulses of the S reel motor frequency signals Sfg1, Sfg2 after being stopped by the S reel stop signal SRp (the number of pulses twice the checked set).

It is determined in a step S317 whether the S reel is OK or not. If "YES", then control goes to a step S320, and if "NO", then control goes to a step S319.

In the step S319, a message Ma5 is displayed, and data indicating that an error has occurred in the checking of the S reel are stored. Then, control leaves this routine. The message Ma5 contains the following statement:

| |
|---|
| Message Ma5 ... S reel stop signal current NG |
| ... Duty cycle of the S reel motor frequency signals NG |
| ... Wind in NG |
| ... Wind out NG |
| ... Offset/friction NG |
| ... Offset/friction adjusted value NG |
| ... Torque NG |
| ... Torque adjusted value NG |

In the step S320, the following check is carried out using the T reel motor detector 22 and the T reel hold/stop detector 23:

1. The current value of each of the T reel motor stop signal TRp and the T reel hold signal THp $\leq$ 500 mA.
2. The duty cycle of the T reel motor frequency signals Tfg1, Tfg2.
3. Wind in/wind out
4. Offset/friction
   A readjusted value and a present adjusted value are compared, and it is determined whether the difference is ±5.
5. Torque
   A readjusted value and a present adjusted value are compared, and it is determined whether the difference is ±10.
6. The number of pulses of the T reel motor frequency signals Tfg1, Tfg2 after being stopped by the T reel stop signal TRp (the number of pulses twice the checked set).

It is determined in a step S321 whether the T reel is OK or not. If "YES", then control goes to a step S324, and if "NO", then control goes to a step S322.

In the step S322, a message Ma6 is displayed, and data indicating that an error has occurred in the checking of the T reel are stored. Then, control leaves this routine. The message Ma6 contains the following statement:

| |
|---|
| Message Ma6 ... T reel stop signal current NG |
| ... Duty cycle of the T reel motor frequency signals NG |
| ... Wind in NG |
| ... Wind out NG |
| ... Offset/friction NG |
| ... Offset/friction adjusted value NG |
| ... Torque NG |
| ... Torque adjusted value NG |

In the step S324, drum operation is checked using the drum motor detector 7 shown in FIG. 1. The result of checking of the drum operation is OK if the checking of ½ times speed$\leq$drum speed<$\frac{3}{2}$ times speed, the checking of whether phase lock is produced or not, and the checking of the presence of a drum pulse signal Dpg are completed in 8 seconds, for example.

It is determined in a step S325 whether the drum operation is OK or not. If "YES", then control goes to a step S328, and if "NO", then control goes to a step S327.

In the step S327, a message Ma7 is displayed, and data indicating that an error has occurred in the checking of the drum operation are stored. Then, control leaves this routine. The message Ma7 contains the following statement:

| |
|---|
| Message Ma7 ... Drum speed NG |
| ... Drum phase lock NG |
| ... Drum pulse signal NG |

In the step S328, threading operation is carried out using the threading motor detector 8 and the thread end detector 9 shown in FIG. 1, and it is checked whether the threading operation is completed in 10 seconds, for example, and whether the threading frequency signal Tfg is in the range of ±20% or not.

It is determined in a step S329 whether the threading operation is OK or not. If "YES", then control goes to a step S332, and if "NO", then control goes to a step S331.

In the step S331, a message Ma8 is displayed, and data indicating that an error has occurred in the checking of the threading operation are stored. Then, control leaves this routine. The message Ma8 contains the following statement:

| |
|---|
| Message Ma8 ... Threading time over |
| ... Threading frequency signal NG |

In the step S332, the threading operation is carried out using the threading motor detector 8, the thread end detector 9, and the unthread end detector 10, thereafter the pinch roller is pressed using the pinch hold/press detector 26, and the pinch press current detecting signal PSd and the pinch press hold signal PHp from the pinch hold/press detector 26 are checked.

These signals should be in the following ranges:

The current value of the pinch press current detecting signal PSd ≧500 mA; and

The current value of the pinch press hold signal PHp ≧500 mA.

It is determined in a step S333 whether pinching operation is OK or not. If "YES", then control goes to a step S336, and if "NO", then control goes to a step S335.

In the step S335, a message Ma9 is displayed, and data indicating that an error has occurred in the checking of the pinching operation are stored. Then, control leaves this routine. The message Ma9 contains the following statement:

Message Ma9 ... Plunger current NG

In the step S336, unthreading operation is carried out using the threading motor detector 8 and the unthread end detector 10, and it is checked whether the unthreading operation is completed in 10 seconds, for example, and whether the threading frequency signal Tfg is in the range of ±20% or not.

It is determined in a step S337 whether the unthreading operation is OK or not. If "YES", then control goes to a step S340, and if "NO", then control goes to a step S339.

In the step S339, a message Ma10 is displayed, and data indicating that an error has occurred in the checking of the unthreading operation are stored. Then, control leaves this routine. The message Ma10 contains the following statement:

| |
|---|
| Message Ma10 ... Unthreading time NG |
| ... Unthreading motor frequency signal NG |

In the step S340, using the capstan motor detector 25, the capstan motor frequency signals CAfg1, CAfg2 are readjusted (duty cycle), the readjusted values and present values are compared with each other and it is checked whether their difference is ±5 or not, the rates of the capstan motor frequency signals CAfg1, CAfg2 are readjusted with the pinch roller 213 spaced from the shaft of the capstan motor 153 in a capstan-free condition, the readjusted values and present values are compared with each other and it is checked whether their difference is ±1/128 (0.78%) of the present adjusted value, and it is checked whether the speed of the capstan when the tape is transported in FWD and REV modes is equal to or higher than the normal speed.

It is determined in a step S341 whether the capstan is OK or not. If "YES", then control goes to a step S343, and if "NO", then control goes to a step S342.

In the step S342, a message Ma11 is displayed, and then, control leaves this routine. The message Ma11 contains the following statement:

Message Ma11 ... Complete

In the step S343, a message Ma12 is displayed, and data indicating that an error has occurred in the checking of the capstan are stored. Then, control leaves this routine. The message Ma12 contains the following statement:

| |
|---|
| Message Ma12 ... The adjusted duty cycle of the capstan motor frequency signal NG |
| ... The adjusted value of the capstan-free speed NG |
| ... The adjusted value of the capstan FWD speed NG |
| ... The adjusted value of the capstan REV speed NG |

G-2. Description of operation for a check with a tape being present (see FIGS. 27-31).

FIGS. 27 through 31 are flowcharts illustrative of operation when control goes to the step S350 in the flowchart shown in FIG. 21.

It is determined in a step S350 whether there is no cassette or not. If "YES", then control goes to a step S351, and if "NO", then control goes to a step S352.

In the step S351, it is determined whether the process is to be continued or not. If "YES", then control goes to a step S353, and if "NO", then control goes to the step S352.

In the step S352, a message Mb1 is displayed. Thereafter, control leaves this routine. The message Mb1 contains the following statement:

Message Mb1 ... Eject cassette if it is to be checked

In the step S353, a message Mb2 is displayed. The message Mb2 contains the following statement:

Message Mb2 ... Insert S cassette 30 minutes

It is determined in a step S354 whether an S cassette is set or not. If "YES", then control goes to a step S355, and if "NO", then control goes to the step S356.

In the step S355, it is determined whether the process is to be continued or not. If "YES", then control goes to a step S357, and if "NO", then control leaves this routine.

In the step S356, the cassette is ejected.

In the step S357, the tape is rewound in a REW mode until the tape top is reached.

It is determined in a step S358 whether the tape top has been reached based on the tape top detecting signal TTd from the tape top detector 14 shown in FIG. 1. If "YES", then control goes to a step S362, and if "NO", then control goes to the step S359.

In the step S359, it is determined whether the cassette is ejectable or not. If "YES", then control goes to a step S360, and if "NO", then control goes to a step S361.

In the step S360, the cassette is ejected.

In the step S361, a message Mb3 is displayed, and data indicating that a general operation error has occurred are stored. Then, control leaves this routine. The message Mb3 contains the following statement:

Message Mb3 . . . General operation error

In the step S362, it is determined whether the process is to be continued or not. If "YES", then control goes to a step S363, and if "NO", then control leaves this routine.

In the step S363, then the tape is played back for 10 seconds.

It is determined in a step S364 whether the tape has been played back for 10 seconds or not. If "YES", then control goes to a step S365, and if "NO", then control goes to a step S366.

In the step S365, it is determined whether the process is to be continued or not. If "YES", then control goes to a step S369, and if "NO", then control leaves this routine.

In the step S366, it is determined whether the cassette is ejectable or not. If "YES", then control goes to a step S367, and if "NO", then control goes to a step S368.

In the step S367, the cassette is ejected.

In the step S368, a message Mb4 is displayed, and data indicating that a general operation error has occurred are stored. Then, control leaves this routine. The message Mb4 contains the following statement:

Message Mb4 . . . General operation error

In the step S369, a search FWD mode is carried out. In the search FWD mode, the tape is fed at a 1/30 times speed for 30 seconds, at a 1/2 times speed for 10 seconds, at a normal speed for 10 seconds, and at a 5 times speed for 10 seconds.

It is determined in a step S370 whether the search FWD mode is OK or not. If "YES", then control goes to a step S374, and if "NO", then control goes to a step S371.

In the step S371, it is determined whether the cassette is ejectable or not. If "YES", then control goes to a step S372, and if "NO", then control goes to a step S373.

In the step S372, the cassette is ejected.

In the step S373, a message Mb5 is displayed, and data indicating that a general operation error has occurred are stored. Then, control leaves this routine. The message Mb5 contains the following statement:

Message Mb5 . . . General operation error

In the step S374, it is determined whether the process is to be continued or not. If "YES", then control goes to a step S375, and if "NO", then control leaves this routine.

In the step S375, a search REV mode is carried out. In the search REV mode, the tape is fed at a 1/30 times speed for 30 seconds, at a 1/2 times speed for 10 seconds, at a normal speed for 10 seconds, and at a 5 times speed for 10 seconds.

It is determined in a step S376 whether the search REV mode is OK or not. If "YES", then control goes to a step S377, and if "NO", then control goes to a step S378.

In the step S377, it is determined whether the process is to be continued or not. If "YES", then control goes to a step S381, and if "NO", then control leaves this routine.

In the step S378, it is determined whether the cassette is ejectable or not. If "YES", then control goes to a step S379, and if "NO", then control goes to a step S380.

In the step S379, the cassette is ejected.

In the step S380, a message Mb6 is displayed, and data indicating that a general operation error has occurred are stored. Then, control leaves this routine. The message Mb6 contains the following statement:

Message Mb6 . . . General operation error

In the step S381, using the tape end detector 15, it is checked whether the tape end of an S cassette can be reached from the tape top thereof in an FF mode for 75 seconds (for both NTSC and PAL), whether operation is completed with respect to an L cassette with large hubs for 100 seconds (for both NTSC and PAL), and whether operation is completed with respect to an L cassette with small hubs for 185 seconds (for both NTSC and PAL).

It is determined in a step S382 whether the FF mode is OK or not. If "YES", then control goes to a step S386, and if "NO", then control goes to a step S383.

In the step S383, it is determined whether the cassette is ejectable or not. If "YES", then control goes to a step S384, and if "NO", then control goes to a step S385.

In the step S384, the cassette is ejected.

In the step S385, a message Mb7 is displayed, and data indicating that a general operation error has occurred are stored. Then, control leaves this routine. The message Mb7 contains the following statement:

Message Mb7 . . . General operation error

In the step S386, it is determined whether the process is to be continued or not. If "YES", then control goes to a step S387, and if "NO", then control leaves this routine.

In the step S387, using the tape top detector 14, it is checked whether the tape top of an S cassette can be reached from the tape end thereof in a REW mode for 75 seconds (for both NTSC and PAL), whether operation is completed with respect to an L cassette with large hubs for 100 seconds (for both NTSC and PAL), and whether operation is completed with respect to an L cassette with small hubs for 185 seconds (for both NTSC and PAL).

It is determined in a step S388 whether the REW mode is OK or not. If "YES", then control goes to a step S389, and if "NO", then control goes to a step S390.

In the step S389, it is determined whether the process is to be continued or not. If "YES", then control goes to a step S393, and if "NO", then control leaves this routine.

In the step S390, it is d etermine d whether the cassette is ejectable or not. If "YES", then control goes to a step S391, and if "NO", then control goes to a step S392.

In the step S391, the cassette is ejected.

In the step S392, a message Mb8 is displayed, and data indicating that a general operation error has occurred are stored. Then, control leaves this routine. The message Mb8 contains the following statement:

Message Mb8 General operation error

In the step S393, it is determined whether the cassette is an L cassette or not. If "YES", then control goes to a step S394, and if "NO", then control goes to a step S395.

In the step S394, the cassette is ejected.

In the step S395, a message Mb9 is displayed. The message Mb9 contains the following statement:

Message Mb9 . . . Insert a large cassette 90 minutes

In a step S396, it is determined whether the process is to be continued or not. If "YES", then control goes to a step S397, and if "NO", then control leaves this routine.

In the step S397, it is determined whether an L cassette has been set or not. If "YES", then control goes to a step S398, and if "NO", then control goes back to the step S395.

In a step S398, it is determined whether the process is to be continued or not. If "YES", then control goes back to the step S357, and if "NO", then control leaves this routine.

In a step S399, a message Mb10 is displayed, and then control leaves this routine. The message Mb10 contains the following statement:

Message Mb10 . . . Complete

G-3. Description of operation for a check with an alignment tape (see FIGS. 32~34).

Figure 32:
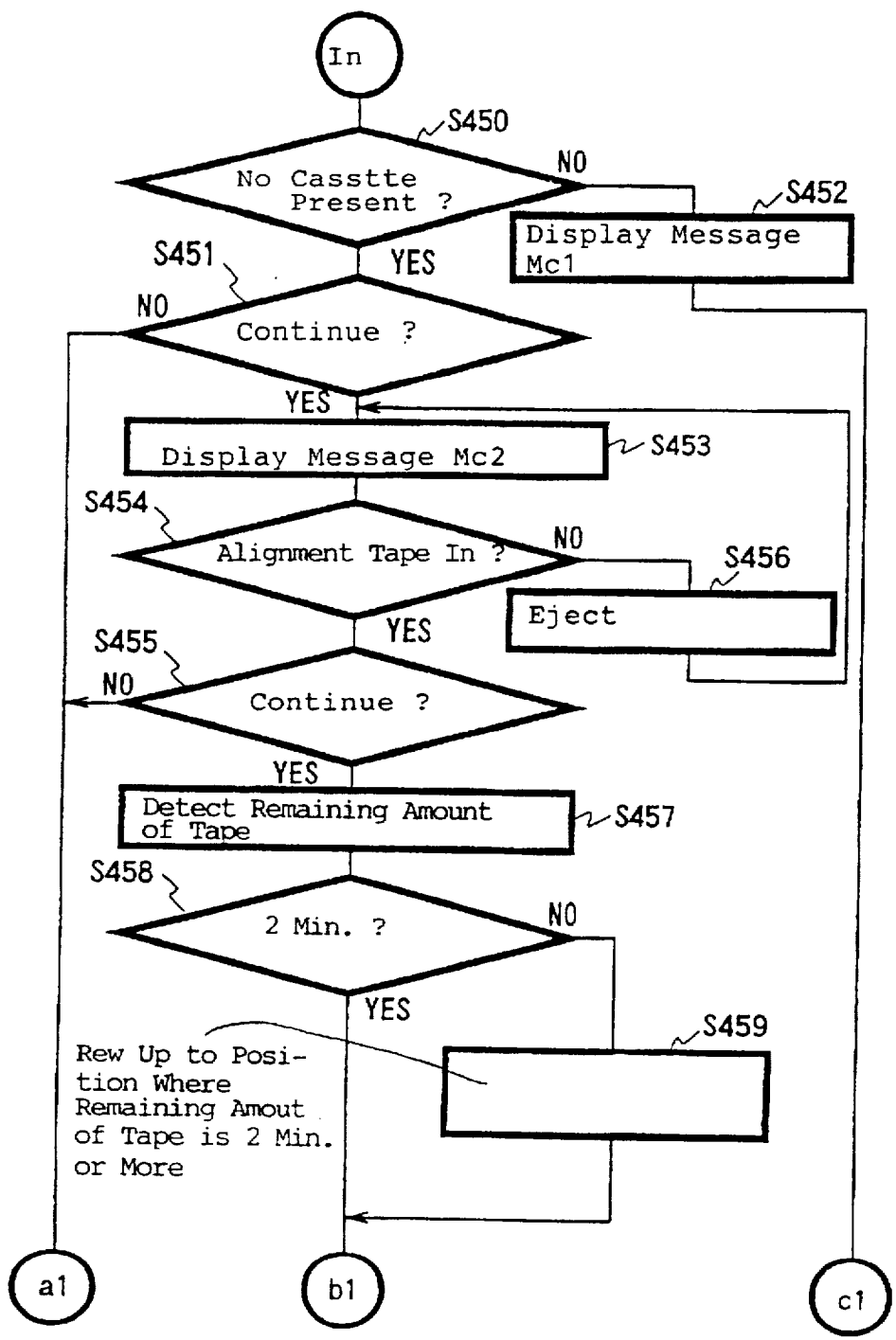
FIG. 32 is a flowchart of a subroutine (check with an alignment tape) illustrative of operation of the method of and the apparatus for diagnosing a device according to the present invention.
Figure 33:
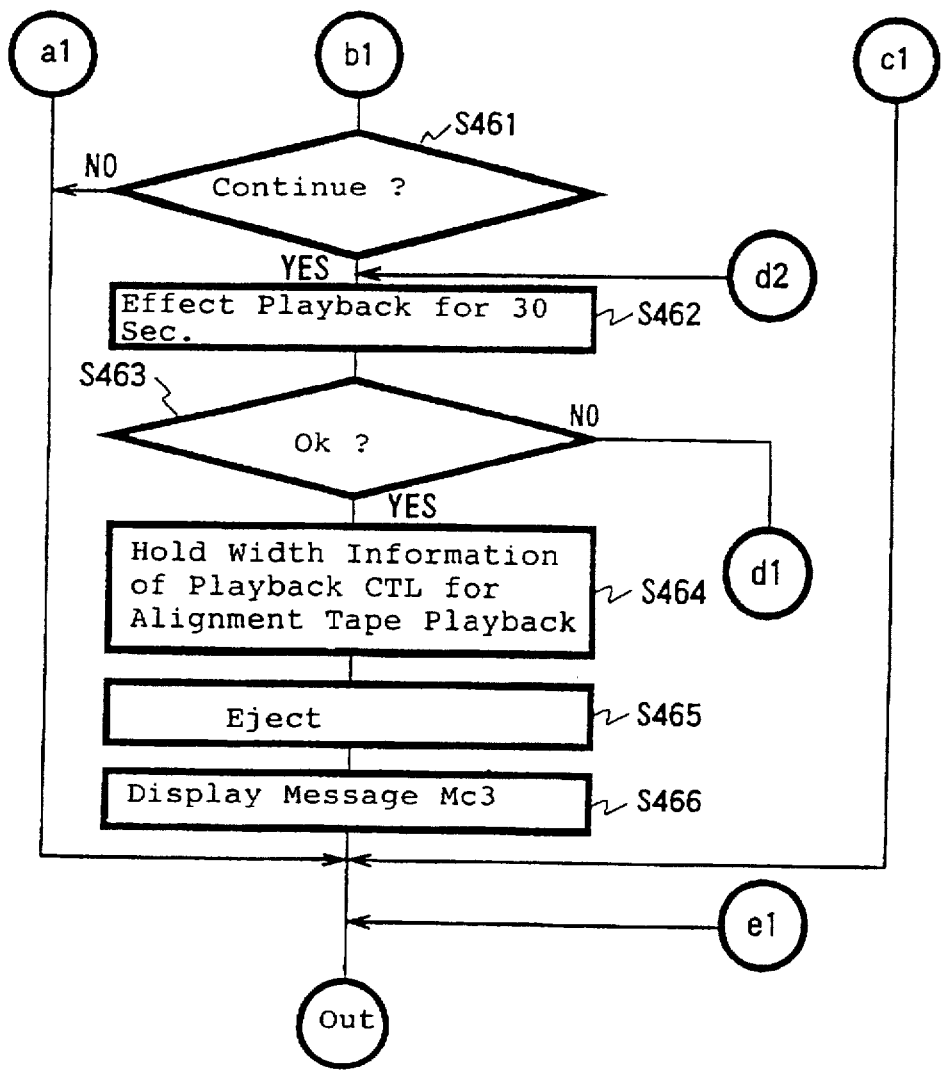
FIG. 33 is a flowchart of the subroutine (check with an alignment tape) illustrative of operation of the method of and the apparatus for diagnosing a device according to the present invention.
Figure 34:
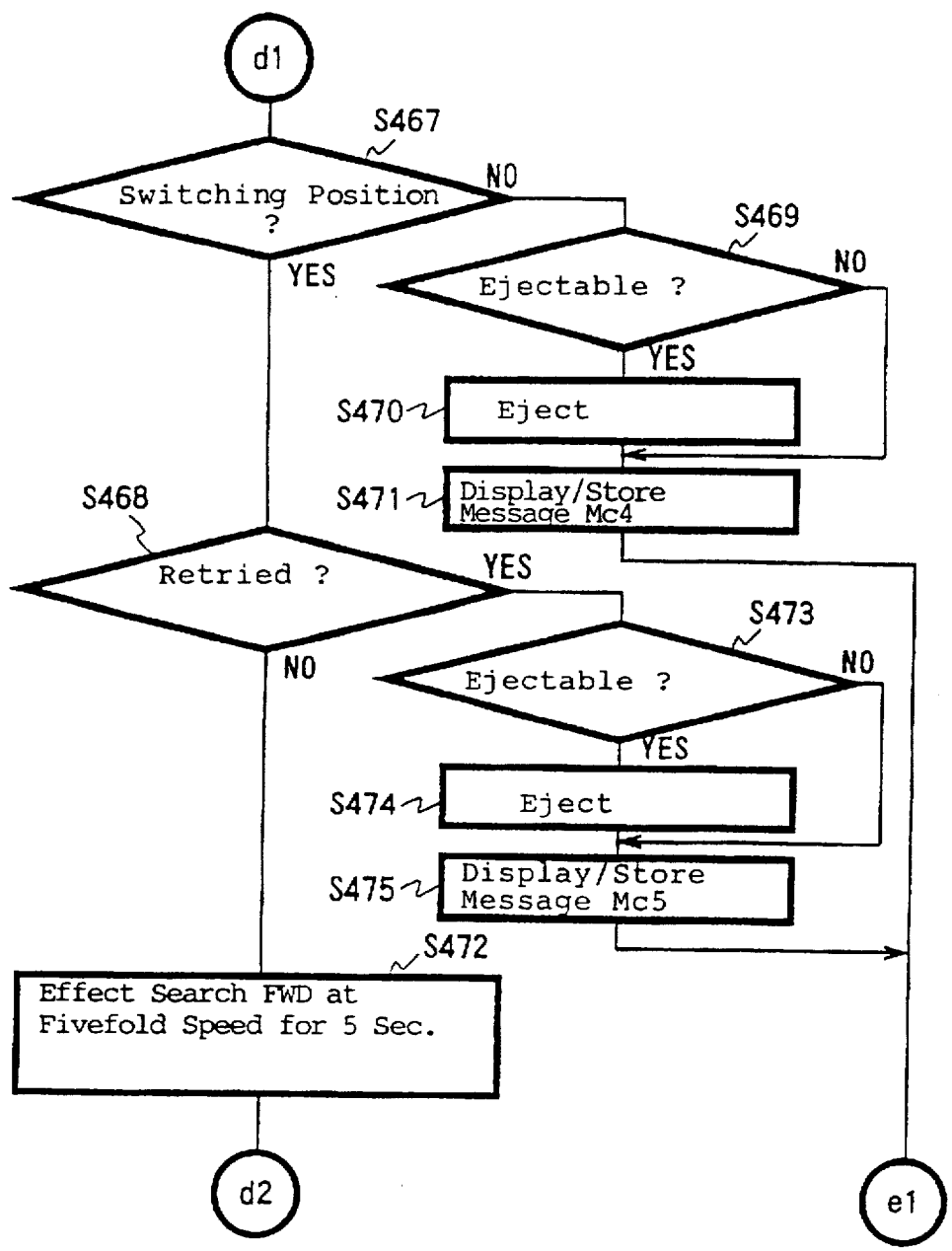
FIG. 34 is a flowchart of the subroutine (check with an alignment tape) illustrative of operation of the method of and the apparatus for diagnosing a device according to the present invention.

FIGS. 32 through 34 are flowcharts illustrative of operation when control goes to the step S450 in the flowchart shown in FIG. 21.

It is determined in a step S450 whether there is no cassette or not. If "YES", then control goes to a step S451, and if "NO", then control goes to a step S452.

In the step S451, it is determined whether the process is to be continued or not. If "YES", then control goes to a step S453, and if "NO", then control leaves this routine.

In the step S452, a message Mc1 is displayed. Thereafter, control leaves this routine. The message Mc1 contains the following statement:

Message Mc1 . . . Eject cassette if it is to be checked

In the step S453, a message Mc2 is displayed. The message Mc2 contains the following statement:

Message Mc2 . . . Insert alignment tape and press playback key

It is determined in a step S454 whether an alignment tape (alignment cassette) has been inserted or not. If "YES", then control goes to a step S455, and if "NO", then control goes to a step S456.

In the step S455, it is determined whether the process is to be continued or not. If "YES", then control goes to a step S457, and if "NO", then control leaves this routine.

In the step S456, the cassette is ejected.

In the step S457, the time code and CTL are counted, and the count is compared with a full recordable time of the set tape as it is converted into a count of the time code and CTL to detect a remaining amount of tape. It is determined in a step S458 whether the remaining amount of tape is equal to 2 minutes or not. If "YES", then control goes to a step S461, and if "NO", then control goes to a step S459.

In the step S459, the tape is rewound in a REW mode until the remaining amount of tape is equal to 2 minutes or more. Then, control goes to the step S461 shown in FIG. 33.

In the step S461, it is determined whether the process is to be continued or not. If "YES", then control goes to a step S462, and if "NO", then control leaves this routine.

In the step S462, then the tape is played back for 30 seconds. At this time, CTL lock is checked, and the capstan speed is also checked.

It is determined in a step S463 whether the playback is OK or not. If "YES", then control goes to a step S464, and if "NO", then control goes to a step S467. In the step S463, the playback is judged as OK, i.e., suffering no failure, if the capstan speed is ±2.0% of a given speed for NTSC, and the playback is judged as OK, i.e., suffering no failure, if the capstan speed is ±1.0% of a given speed for PAL.

In the step S464, the width information of playback control for playing back the alignment tape is held.

In a step S465, the cassette is ejected.

In a step S466, a message Mc3 is displayed, and then control leaves this routine. The message Mc3 contains the following statement:

Message Mc3 . . . Complete

In the step S467, it is determined whether the tape is in a switching position or not. If "YES", then control goes to a step S468, and if "NO", then control goes to a step S469. Here, it is determined whether the lock phase of the head is NG or not.

In the step S468, it is determined whether the tape has been retried or not. If "YES", then control goes to a step S473, and if "NO", then control goes to a step S472. The phase "whether the tape has been retried or not" means whether the processing in the step S472 is executed for the first time or not. Specifically, when the processing according to this routine has started, the tape is played back for 30 seconds in the step S462, and if the playback is OK in the step S463, then control goes to the step S468. In this case, since the processing in the step S472 is executed for the first time, the step S468 is judged as "NO". Then, a search FWD mode is carried out at a 5 times speed for 5 seconds in the step S472, and thereafter control goes back to the steps S461, S462, S463. If the step S463 is judged as "NO", then control goes back to the steps S467, S468. Inasmuch as the processing in the step S472 is executed for the second time, the step S468 is judged as "YES", and control goes to a step S473.

In the step S469, it is determined whether the cassette is ejectable or not. If "YES", then control goes to a step S470, and if "NO", then control goes to a step S471.

In the step S470, the cassette is ejected.

In the step S471, a message Mc4 is displayed, and then, control leaves this routine. The message Mc4 contains the following statement:

Message Mc4 . . . General operation error

In the step S472, a search FWD mode is carried out at a 5 times speed for 5 seconds.

In the step S473, it is determined whether the cassette is ejectable or not. If "YES", then control goes to a step S474, and if "NO", then control goes to a step S475.

In the step S474, the cassette is ejected.

In the step S475, a message Mc5 is displayed, and then, control leaves this routine. The message Mc5 contains the following statement:

Message Mc5 . . . General operation error

G-4. Description of operation for a check with a new tape (see FIGS. 35 and 36).

Figure 35:
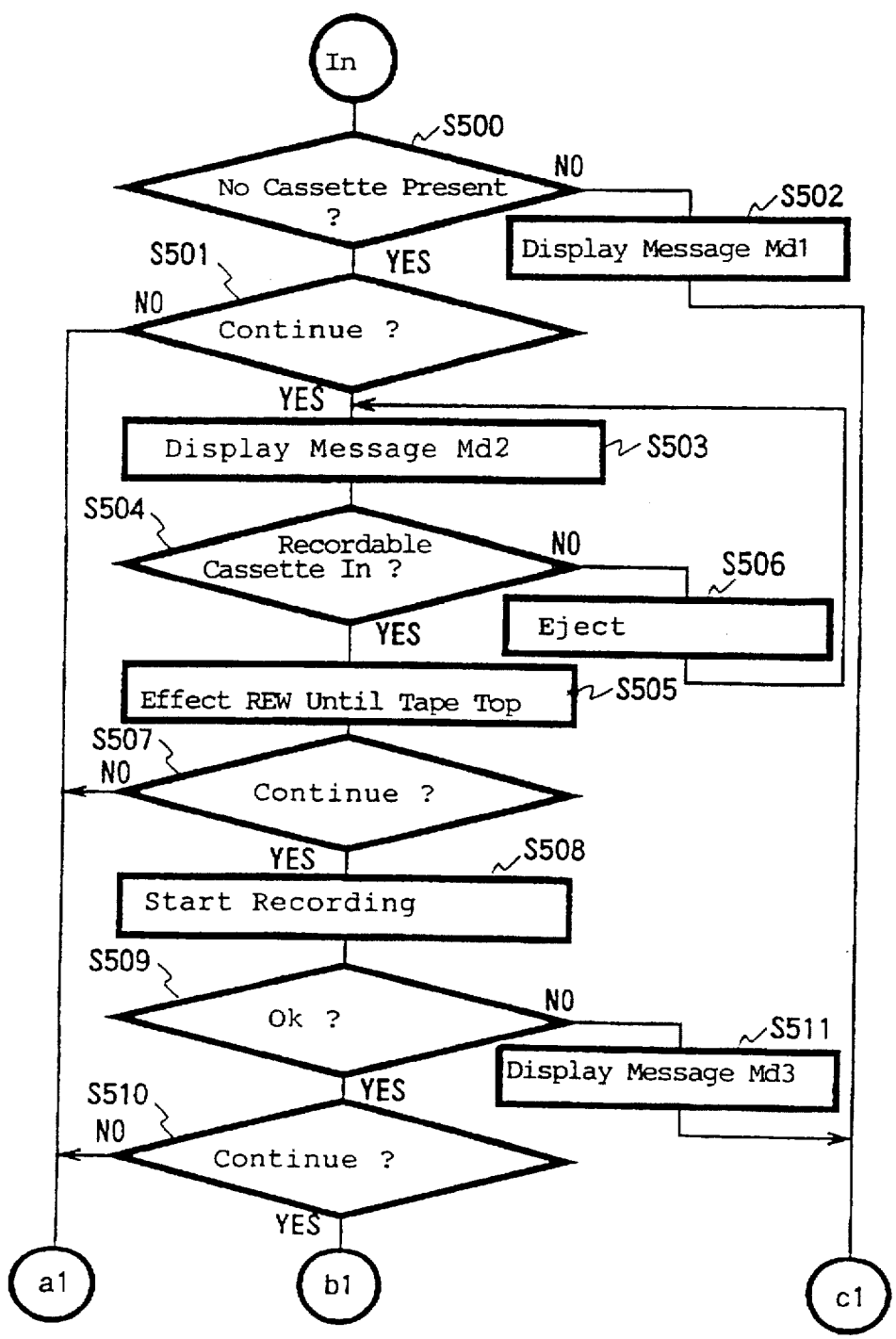
FIG. 35 is a flowchart of a subroutine (check with a new tape) illustrative of operation of the method of and the apparatus for diagnosing a device according to the present invention.
Figure 36:
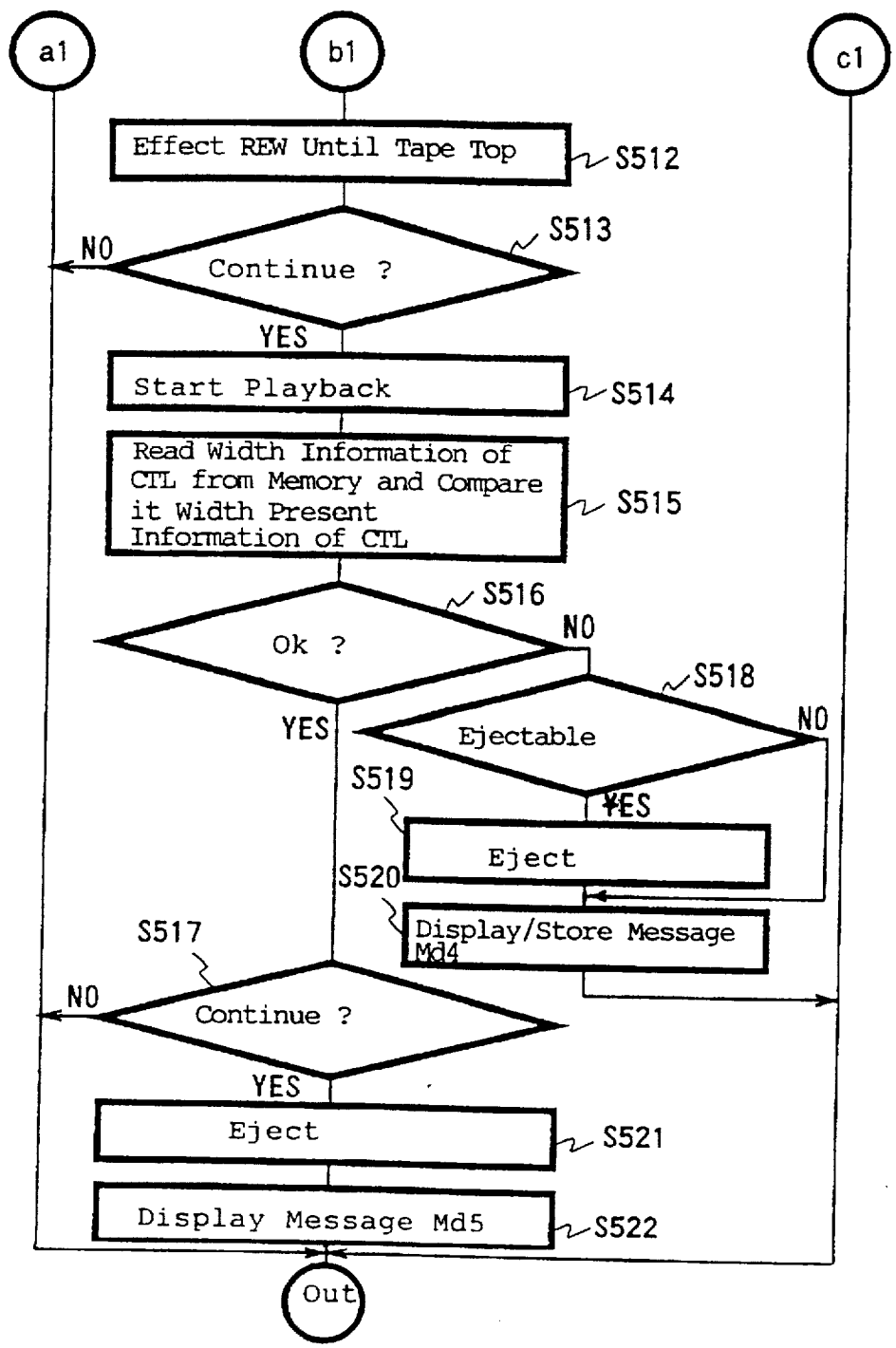
FIG. 36 is a flowchart of the subroutine (check with a new tape) illustrative of operation of the method of and the apparatus for diagnosing a device according to the present invention.

FIGS. 35 and 36 are flowcharts illustrative of operation when control goes to the step S500 in the flowchart shown in FIG. 21.

It is determined in a step S500 whether there is a cassette or not. If "YES", then control goes to a step S501, and if "NO", then control goes to a step S502.

In the step S501, it is determined whether the process is to be continued or not. If "YES", then control goes to a step S503, and if "NO", then control goes to the step S502.

In the step S502, a message Md1 is displayed. Thereafter, control leaves this routine. The message Md1 contains the following statement:

Message Md1 . . . Eject cassette if it is to be checked

In the step S503, a message Md2 is displayed. The message Md2 contains the following statement:

Message Md2 . . . Insert new cassette with recording inhibit tooth stands up

It is determined in a step S504 whether a recordable cassette has been set or not. If "YES", then control goes to a step S505, and if "NO", then control goes to a step S506.

In the step S505, the tape is rewound in a REW mode until the top end is reached, using the tape top detector 14.

In the step S506, the cassette is ejected, and then control leaves this routine.

In a step S507, it is determined whether the process is to be continued or not. If "YES", then control goes to a step S508, and if "NO", then control leaves this routine.

In the step S508, data start being recorded on the tape. The data are recorded for a recording time of 45 seconds, for example. At the same time, a CTL status is checked, and the capstan speed is checked.

It is determined in a step S509 whether the recording is OK or not. If "YES", then control goes to a step S510, and if "NO", then control leaves this routine. The recording is judged as OK if the capstan speed is ±2.0% for NTSC, and the recording is judged as OK if the capstan speed is ±1.0% for PAL.

In the step S510, it is determined whether the process is to be continued or not. If "YES", then control goes to a step S512, and if "NO", then control leaves this routine.

In the step S512, the tape is rewound in a REW mode until the top end is reached, using the tape top detector 14.

In a step S513, it is determined whether the process is to be continued or not. If "YES", then control goes to a step S514, and if "NO", then control leaves this routine.

In the step S514, the tape starts being played back. In this example, the tape is played back for a playback time of 35 seconds. During the 35 seconds, CTL lock is checked, and the capstan speed is checked.

In a step S315, CTL width information is read from a memory, and compared with present CTL width information.

In a step S516, it is determined whether the playback is OK or not. If "YES", then control goes to a step S517, and if "NO", then control goes to a step S518. In the step S516, the playback is judged as OK if the capstan speed is ±2.0% of a given speed for NTSC, and the playback is judged as OK if the capstan speed is ±1.0% of a given speed for PAL. If there is no error as a result of comparison between the CTL width information read from the memory and the present CTL width information, then the playback is judged as OK.

In the step S517, it is determined whether the process is to be continued or not. If "YES", then control goes to a step S521, and if "NO", then control leaves this routine.

In the step S518, it is determined whether the cassette is ejectable or not. If "YES", then control goes to a step S519, and if "NO", then control goes to a step S520.

In the step S519, the cassette is ejected.

In the step S520, a message Md3 is displayed, and data indicating that an error has occurred in the CTL width information. Then, control leaves this routine. The message Md3 contains the following statement:

Message Md3 . . . Recording tape speed error

In the step S521, the cassette is ejected.

In a step S522, a message Md4 is displayed, and then, control leaves this routine. The message Md4 contains the following statement:

Message Md4 . . . Complete

H. Description of operation for selecting service support items (see FIGS. 37 and 38).

Figure 37:
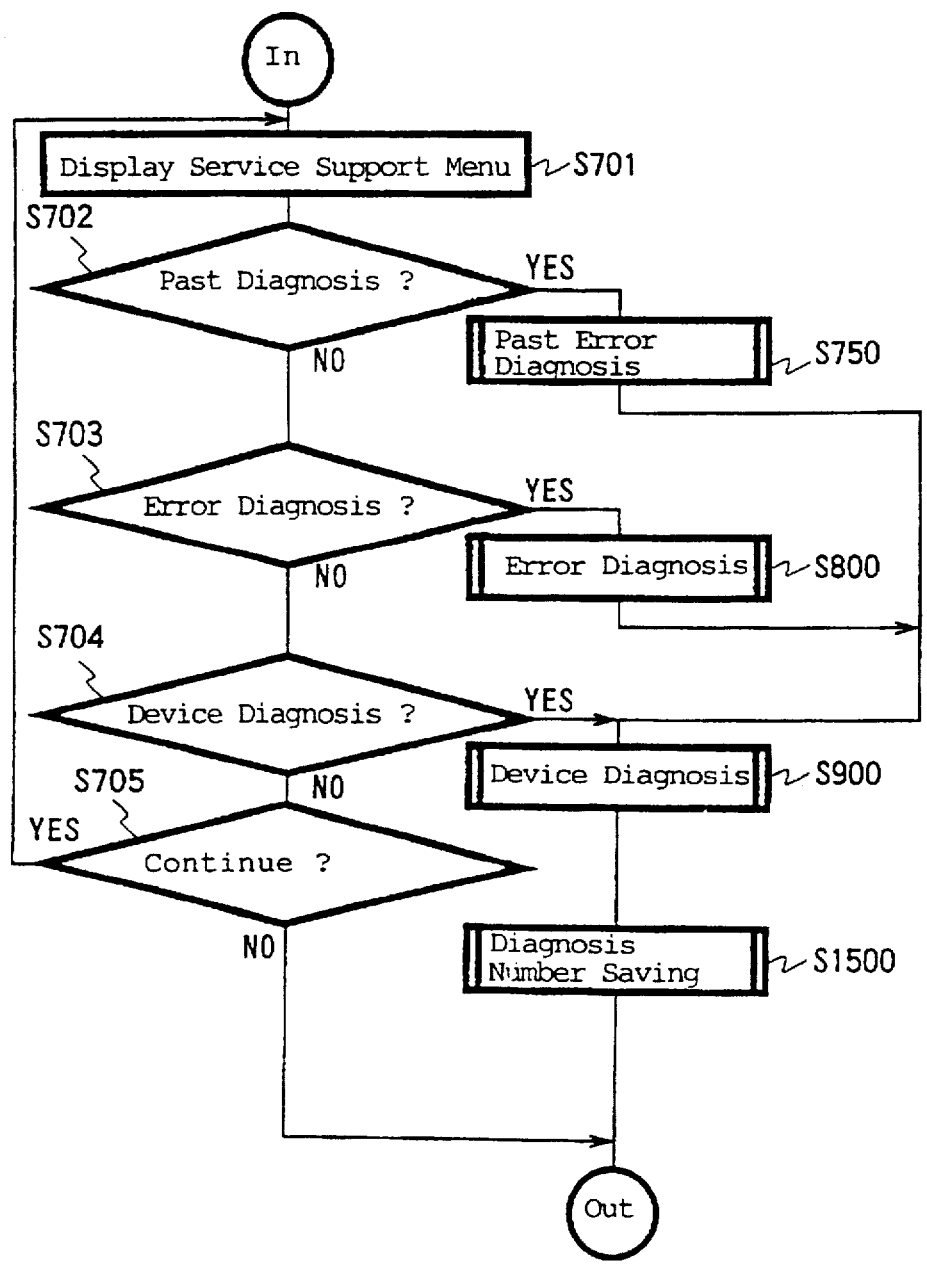
FIG. 37 is a flowchart of a subroutine (service support) illustrative of operation of the method of and the apparatus for diagnosing a device according to the present invention.

FIG. 37 is a flowchart illustrative of operation of a service support menu when control goes to the step S700 in the flowchart with respect to the maintenance menu shown in FIG. 19.

In a step S701, a service support menu is displayed. A displayed screen image of a service support menu M4 is shown in FIG. 38.

In a step S702, it is determined whether a past diagnosis has been selected or not. If "YES", then control goes to a step S750, and if "NO", then control goes to a step S703. The term "past diagnosis" is the result of a diagnosis carried out in the past, and represents an error code depending on the diagnostic result.

In the step S703, it is determined whether an error diagnosis has been selected or not. If "YES", then control goes to a step S800, and if "NO", then control goes to a step S704.

In the step S704, it is determined whether a device diagnosis has been selected or not. If "YES", then control goes to a step S900, and if "NO", then control goes to a step S705.

In the step S705, it is determined whether the process is to be continued or not. If "YES", then control goes back to the step S701, and if "NO", then control leaves this routine.

If an algorithm is established for effecting a past error diagnosis in the step S750, then control goes to the step S900 in which an actual device diagnosis is carried out. If an algorithm is established for effecting a selected error diagnosis in the step S800, then control goes to the step S900 in which an actual device diagnosis is carried out.

If a device diagnosis is carried out in the step S900, then control goes to a step S1500 in which a diagnosis number is saved. Details of the step S1500 will be described under the item I-1 with reference to FIG. 58. The diagnosis number represents data indicative of an interrupted diagnosis. When the diagnosis number data have a value of "0", it shows that there is no interrupted diagnosis, and when the diagnosis number data have another value, it shows that there is an interrupted diagnosis. The diagnosis number data are stored in the memory means 313 by the auxiliary control means 312 controlled by the main control means 303 when a diagnosis is interrupted.

In FIG. 37, "PAST ERROR DIAGNOSIS" is indicated in the block of the step S750, "ERROR DIAGNOSIS" in the block of the step S800, and "DEVICE DIAGNOSIS" in the block of the step S900. These steps are not of the same level. The step S750 is a process of establishing an algorithm for effecting a "PAST ERROR DIAGNOSIS", the step S800 is a process of establishing an algorithm for effecting a selected "ERROR DIAGNOSIS", and the step S900 is a process of effecting a "DEVICE DIAGNOSIS" based on the algorithm established in the step S750 or the step S800. As already described above, establishing an algorithm is generating (or setting) a train of data indicating which part is to be diagnosed.

The term "ERROR DIAGNOSIS" represents a diagnosis effected by the selection of a code corresponding to an error. The term "DEVICE DIAGNOSIS" represents a diagnosis effected by the selection of a device, and indicates a diagnostic item.

H-1. Description of operation of a past error diagnosis (FIGS. 39 and 40).

FIG. 39 is a flowchart illustrative of operation when the step S750 in the flowchart shown in FIG. 37 is selected.

In a step S751, a menu is displayed. A displayed screen image of such a menu M5 is shown in FIG. 40. As shown in FIG. 40, a past error diagnosis is composed of codes indicative of errors that have occurred in the past. The person who makes adjustments and repairs can select an error code to be diagnosed from the error diagnosis menu M5.

In a step S752, it is determined whether the right key 148R has been pressed or not. If "YES", then control goes to a step S2000.

In the step S2000, an interruption process is carried out according to an interruption processing routine. The interruption process according to the interruption processing routine will be described in detail later on with reference to FIG. 57.

H-2. Description of operation of an error diagnosis (FIGS. 41 and 42).

FIG. 41 is a flowchart illustrative of operation when the step S800 in the flowchart shown in FIG. 37 is selected.

In a step S801, a menu is displayed. A displayed screen image of such an error diagnosis menu M6 is shown in FIG. 42. In the error diagnosis menu M6, there are displayed error codes in the uppermost layer among error codes in a hierarchical structure. One of the displayed error codes can be selected by moving a bar cursor Bc with the cursor key 148 as shown in FIG. 42. In this example, "ERROR-02" is selected.

In a step S802, it is determined whether the right key 148R has been pressed or not. If "YES", then control goes to a step S803.

In the step S803, a menu is displayed. A displayed screen image of such an error diagnosis menu M7 is shown in FIG.

42. In the error diagnosis menu M7, there are displayed error codes in a layer lower than those of the error diagnosis menu M6, and the error codes in the error diagnosis menu M7 are a set of error codes each having the same value in a higher figure position selected in the error diagnosis menu M6. In this example, "ERROR-02-058" is selected. This error code is a code for determining an algorithm described above. By selecting this code, the main control means 303 shown in FIG. 17 can determine which devices are to be diagnosed according to which method in which sequence.

In a step S804, it is determined whether the right key 148R has been pressed or not. If "YES", then control goes to the step S2000.

In the step S2000, the interruption process is carried out according to the interruption processing routine. Then, control leaves this routine.

The term "ERROR DIAGNOSIS" represents a diagnosis carried out by the selection of a code corresponding to an error. Each of these diagnoses is a minimum diagnostic item that can be selected.

H-3. Description of operation for selecting device diagnosis items (FIGS. 43 and 44).

FIG. 43 is a flowchart illustrative of operation when the step S900 in the flowchart shown in FIG. 37 is selected.

In a step S901, it is determined whether setting is completed or not. If "YES", then control goes to a step S902, and if "NO", then control goes to a step S1000. In this step, it is determined whether an algorithm has been set or not. Control goes to the step S901 when no algorithm has been set because a diagnosis of a device is manually effected. In the step S1000, a device is diagnosed based on the algorithm that has been set. Specific details of the step S1000 will be described under the item H-3-1 with reference to FIGS. 45–54, and under the item H-3-2 with reference to FIG. 55.

In a step S902, a menu is displayed. A displayed screen image of such a device diagnosis menu M8 is shown in FIG. 44. As can be seen from the device diagnosis menu M8, a device to be diagnosed is selected with the cursor key 148.

In a step S903, it is determined whether the right key 148R has been pressed or not. If "YES", then control goes to the step S2000.

In the step S2000, the interruption process is carried out according to the interruption processing routine. The interruption process is carried out according to the interruption processing routine will be described in detail later on with reference to FIG. 57.

H-3-1. Description of operation of a diagnosis of a selected device (FIGS. 45–54).

FIGS. 45–54 are flowcharts illustrative of operation when control goes to the step S1000 in the flowchart shown in FIG. 43. The operation in the item H-3-1 shows an example of a diagnosis of one device. If it is necessary to diagnose a plurality of devices, such as for an error diagnosis, diagnoses according to this example will be carried out one after another according to an algorithm.

The S reel hold/stop detector described with reference to FIG. 18 will be described by way of example below.

In a step S951, a message Mg1 is displayed. Then, control goes to a step S952. A displayed screen image of such a message Mg1 is shown in FIG. 49. The displayed message Mg1 indicates that the main control means 303 shown in FIG. 17 turns on the plunger 113 shown in FIG. 18 for diagnosing a detected current from the current detecting circuit 180.

In a step S952, it is determined whether no current is flowing through the plunger 113 or not. If "YES", then control goes to a step S953, and if "NO", then control goes to a step S960.

In the step S953, a message Mg2 is displayed. A displayed screen image of such a message Mg2 is shown in FIG. 49. The displayed message Mg2 indicates that the main control means 303 shown in FIG. 17 cannot obtain a detected current from the current detecting circuit 180 shown in FIG. 18. It can be understood from the displayed screen image, the person who is operating for a diagnosis (hereinafter referred to as a "serviceman") is asked to confirm whether the brake is released or not, and prompted to enter the result with the YES key 149Y or the NO key 149N.

In a step S954, it is determined whether the YES key 149Y is turned on or not. If "YES", then control goes to a step S955, and if "NO", then control goes to a step S963.

In the step S955, a message Mg3 is displayed. A displayed screen image of such a message Mg3 is shown in FIG. 49. The displayed message Mg3 asks the serviceman to confirm whether the voltage of the connector CN-300-17B on the third board 182 shown in FIG. 18 is correct or not, and prompts the serviceman to enter the result with the YES key 149Y or the NO key 149N.

In a step S956, it is determined whether the YES key 149Y is turned on or not. If "YES", then control goes to a step S957, and if "NO", then control goes to the step S958.

In the step S957, a message Mg4 is displayed. Then, control leaves this routine. A displayed screen image of such a message Mg4 is shown in FIG. 50. The displayed screen image indicates that faulty locations are determined as a result of the above process.

In the step S958, it is determined whether the NO key 149N is turned on or not. If "YES", then control goes to a step S959, and if "NO", then control goes back to the step S956.

In the step S959, a message Mg5 is displayed. Then, control leaves this routine. A displayed screen image of such a message Mg5 is shown in FIG. 50. The displayed screen image indicates that faulty locations are determined as a result of the above process.

In the step S960, it is determined whether a no holder current is flowing or not. If "YES", then control goes to a step S972, and if "NO", then control goes back to the step S961.

In the step S961, it is determined whether no stator current is flowing or not. If "YES", then control goes to a step S977, and if "NO", then control goes to a step S962.

In the step S962, it is determined whether the holder current is large or not. If "YES", then control goes to the step S972, and if "NO", then control goes to a step S982.

In the step S963, it is determined whether the NO key 149N is turned on or not. If "YES", then control goes to a step S964, and if "NO", then control goes back to the step S954.

In the step S964, a message Mg6 is displayed. A displayed screen image of such a message Mg6 is shown in FIG. 50. The displayed screen image asks the serviceman to confirm whether the voltage of the connector CN946-13 pin on the fifth board is correct or not, and prompts the serviceman to enter the result with the YES key 149Y or the NO key 149N.

It is determined in a step S965 whether the YES key 149Y is turned on or not. If "YES", then control goes to the step S972, and if "NO", then control goes to a step S966.

In the step S966, it is determined whether the NO key 149N is turned on or not. If "YES", then control goes to a step S967, and if "NO", then control goes back to the step S965.

In the step S967, a message Mg7 is displayed. A displayed screen image of such a message Mg7 is shown in FIG. 51. The displayed screen image asks the serviceman to confirm whether the voltage of the connector CN301-27 pin on the third board is correct or not, and prompts the serviceman to enter the result with the YES key 149Y or the NO key 149N.

In a step S968, it is determined whether the YES key 149Y is turned on or not. If "YES", then control goes to the step S969, and if "NO", then control goes to a step S970.

In the step S969, a message Mg8 is displayed. Then, control leaves this routine. A displayed screen image of such a message Mg8 is shown in FIG. 51. The displayed screen image indicates that faulty locations are determined as a result of the fault processing process.

In the step S970, it is determined whether the NO key 149N is turned on or not. If "YES", then control goes to a step S971, and if "NO", then control goes back to the step S968.

In the step S971, a message Mg9 is displayed. Then, control leaves this routine. A displayed screen image of such a message Mg9 is shown in FIG. 51. The displayed screen image indicates that faulty locations are determined as a result of the fault processing process.

In a step S972, a message Mg10 is displayed. A displayed screen image of such a message Mg10 is shown in FIG. 52. The displayed screen image asks the serviceman to confirm whether the voltage of the connector CN936-11 pin on the fifth board is correct or not, and prompts the serviceman to enter the result with the YES key 149Y or the NO key 149N.

In a step S973, it is determined whether the YES key 149Y is turned on or not. If "YES", then control goes to a step S974, and if "NO", then control goes back to the step S975.

In the step S974, a message Mg11 is displayed. Then, control leaves this routine. A displayed screen image of such a message Mg11 is shown in FIG. 52. The displayed screen image indicates that a faulty location is determined as a result of the fault processing process.

In the step S975, it is determined whether the NO key 149N is turned on or not. If "YES", then control goes to a step S976, and if "NO", then control goes back to the step S973.

In the step S976, a message Mg12 is displayed. Then, control leaves this routine. A displayed screen image of such a message Mg12 is shown in FIG. 52. The displayed screen image indicates that faulty locations are determined as a result of the fault processing process.

In the step S977, a message Mg13 is displayed. A displayed screen image of such a message Mg13 is shown in FIG. 53. The displayed screen image asks the serviceman to confirm whether the voltage of the connector CN936-12 pin on the fifth board is correct or not, and prompts the serviceman to enter the result with the YES key 149Y or the NO key 149N.

In a step S978, it is determined whether the YES key 149Y is turned on or not. If "YES", then control goes to a step S979, and if "NO", then control goes to a step S980.

In the step S979, a message Mg14 is displayed. Then, control leaves this routine. A displayed screen image of such a message Mg14 is shown in FIG. 53. The displayed screen image indicates that a faulty location is determined as a result of the fault processing process.

In the step S980, it is determined whether the NO key 149N is turned on or not. If "YES", then control goes to a step S981, and if "NO", then control goes back to the step S978.

In the step S981, a message Mg15 is displayed. Then, control leaves this routine. A displayed screen image of such a message Mg15 is shown in FIG. 53. The displayed screen image indicates that faulty locations are determined as a result of the fault processing process.

In a step S982, a message Mg16 is displayed. A displayed screen image of such a message Mg16 is shown in FIG. 54. The displayed screen image indicates to the serviceman that a current has been detected properly, asks the serviceman to confirm whether the brake is released or not, and prompts the serviceman to enter the result with the YES key 149Y or the NO key 149N.

In a step S983, it is determined whether the YES key 149Y is turned on or not. If "YES", then control goes to a step S984, and if "NO", then control goes to a step S985.

In the step S984, a message Mg17 is displayed. Then, control leaves this routine. A displayed screen image of such a message Mg17 is shown in FIG. 54. The displayed screen image indicates that the S reel brake is judged as normal as a result of the above process.

In the step S985, it is determined whether the NO key 149N is turned on or not. If "YES", then control goes to a step S986, and if "NO", then control goes back to the step S983.

In the step S983, a message Mg18 is displayed. Then, control leaves this routine. A displayed screen image of such a message Mg18 is shown in FIG. 54. The displayed screen image indicates that the brake mechanism is judged as malfunctioning as a result of the above process.

H-3-2. Description of operation of a diagnosis of a device based on a set algorithm (see FIGS. 55 and 56).

Figure 55:
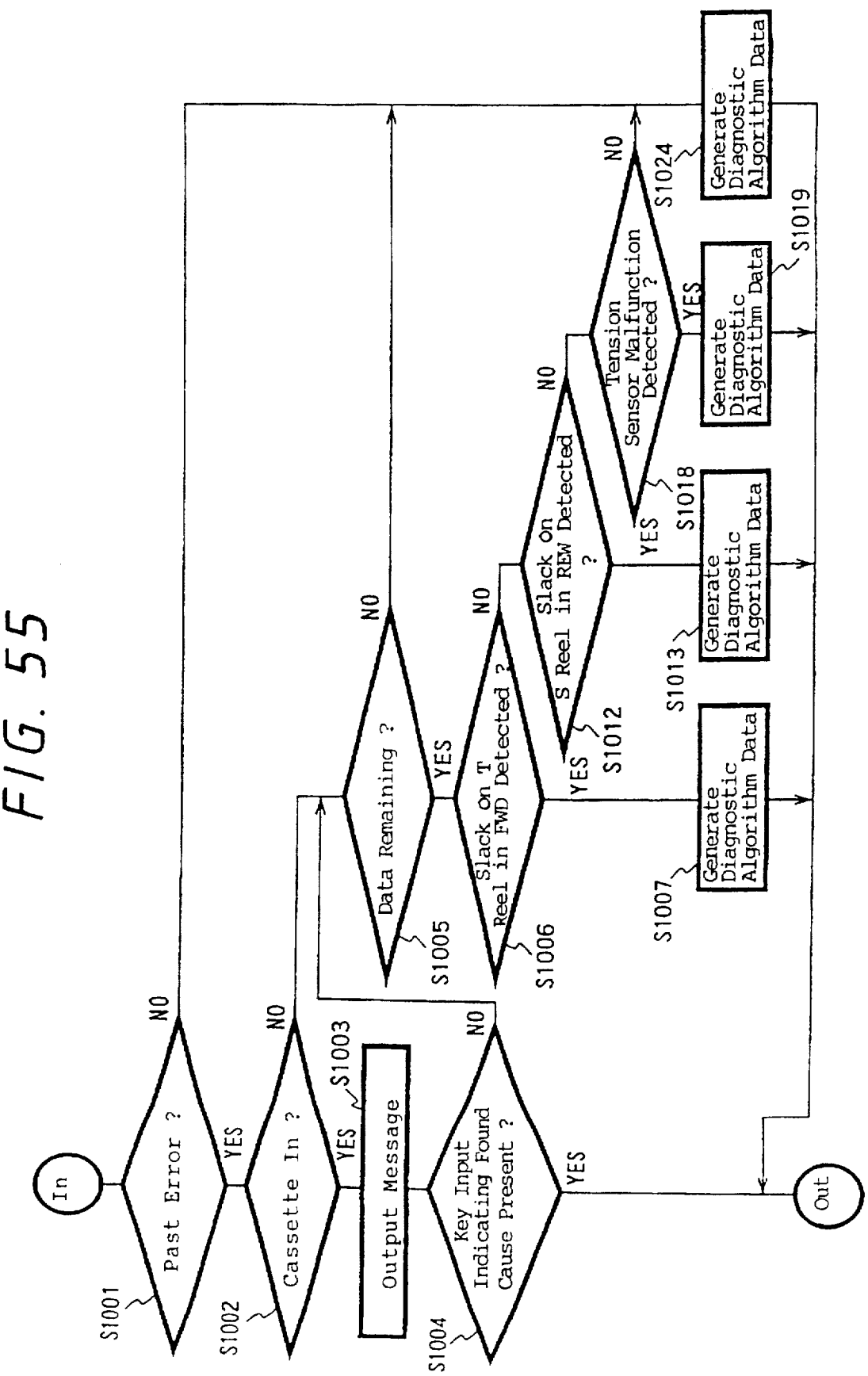
FIG. 55 is a flowchart of a subroutine (device diagnosis based on a set algorithm) illustrative of operation of the method of and the apparatus for diagnosing a device according to the present invention.
Figure 56:
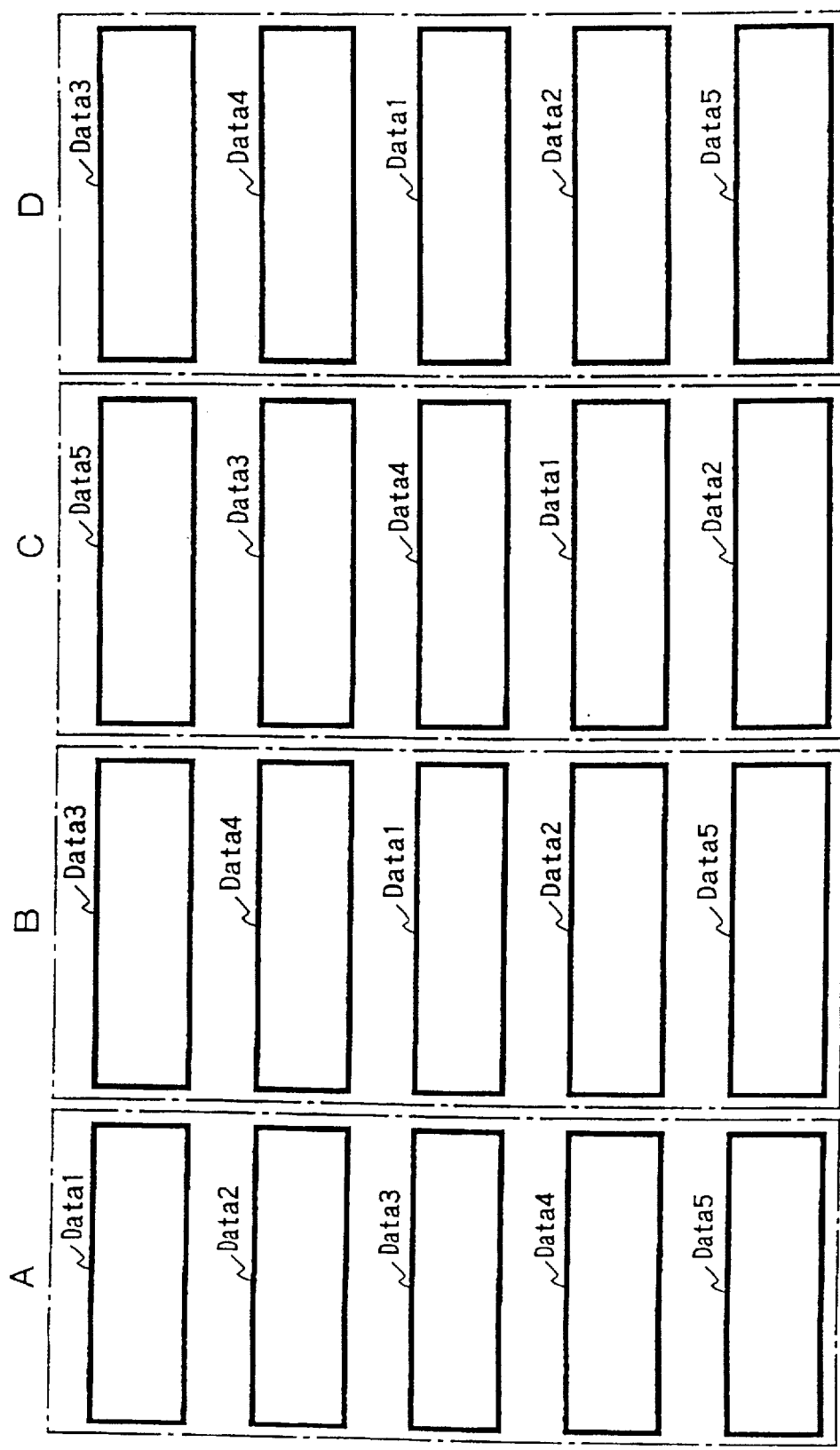
FIG. 56 is a diagram of diagnostic algorithm data illustrative of operation of the method of and the apparatus for diagnosing a device according to the present invention.

FIG. 55 is a flowchart illustrative of operation when control goes to the step S1000 in the flowchart shown in FIG. 43, and FIG. 56 is a diagram of diagnostic algorithm data.

In a step S1001, it is determined whether a selected error code has occurred in the past or not. If "YES", then control goes to a step S1002, and if "NO", then control goes to a step S1024.

In the step S1002, it is determined whether a cassette is set or not. If "YES", then control goes to a step S1003, and if "NO", then control goes to a step S1005.

In the step S1003, a message is outputted. The message contains the following statement:

| YES | ... Enter key |
|-----|---------------|
| NO  | .... Set key  |

In a step S1004, it is determined whether there is a key input indicating whether a cause has already been found or not. If "YES", control leaves this routine, and if "NO", then control goes to a step S1005.

In the step S1005, it is determined whether data remain in the memory means 320. If "YES", then control goes to a step S1006, and if "NO", then control goes to the step S1024. The data referred herein are error data which have been produced in normal operation, e.g., data indicative of a location where an error has occurred and data indicative of the type of the error. These data are stored in the memory means 302 by the system control means 300 shown in FIG. 17.

In a step S1006, it is determined whether the error data read from the memory means 302 are data indicating that a slack is detected in the tape on the T reel while the tape is being transported in the FWD mode or not. If "YES", control goes to a step S1007, and if "NO", then control goes to a step S1012.

In the step S1007, diagnostic algorithm data shown in FIG. 56A are generated. Then, control leaves this routine.

In the step S1012, it is determined whether the error data read from the memory means 302 are data indicating that a slack is detected in the tape on the S reel while the tape is being transported in the REV mode or not. If "YES", control goes to a step S1013, and if "NO", then control goes to a step S1018.

In the step S1013, diagnostic algorithm data shown in FIG. 56B are generated. Then, control leaves this routine.

In the step S1018, it is determined whether the error data read from the memory means 302 are data indicating a malfunction of the tension sensor or not. If "YES", control goes to a step S1019, and if "NO", then control goes to the step S1024.

In the step S1019, diagnostic algorithm data shown in FIG. 56C are generated. Then, control leaves this routine.

In the step S1024, diagnostic algorithm data shown in FIG. 56D are generated. Then, control leaves this routine.

Figure 26:
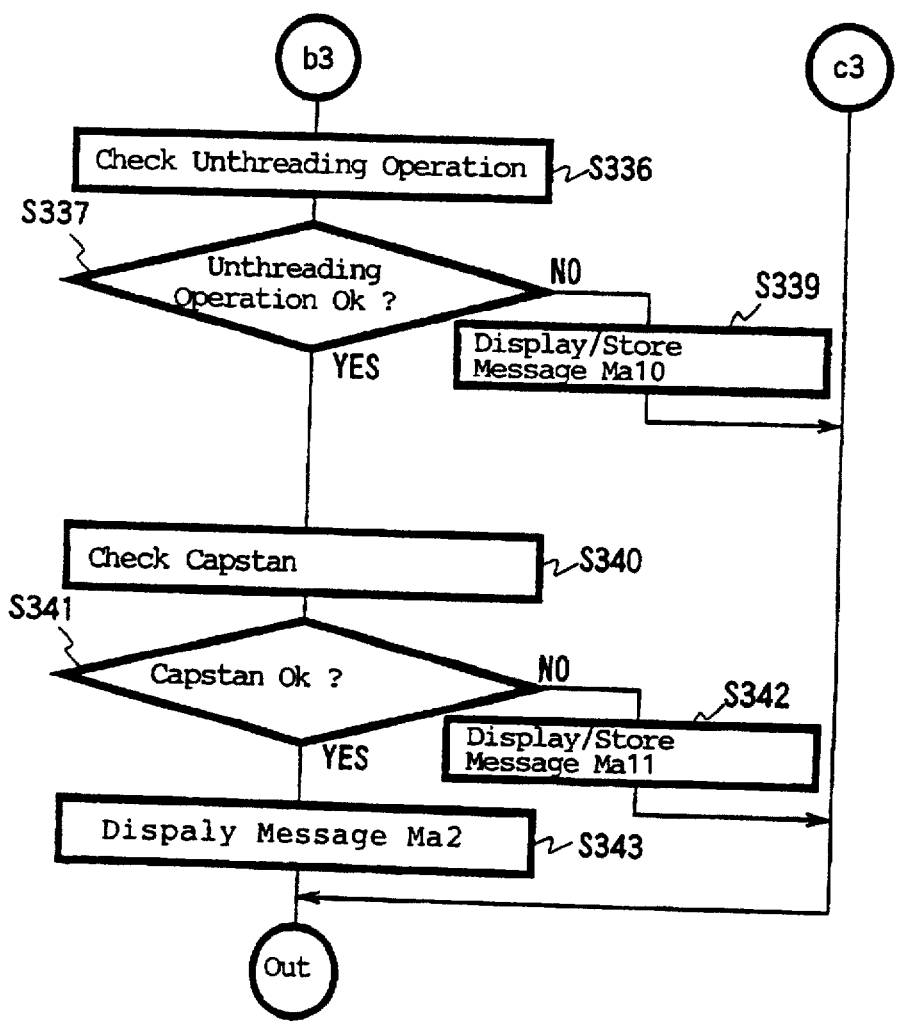
FIG. 26 is a flowchart of the subroutine (check with no tape being present) illustrative of operation of the method of and the apparatus for diagnosing a device according to the present invention.
Figure 27:
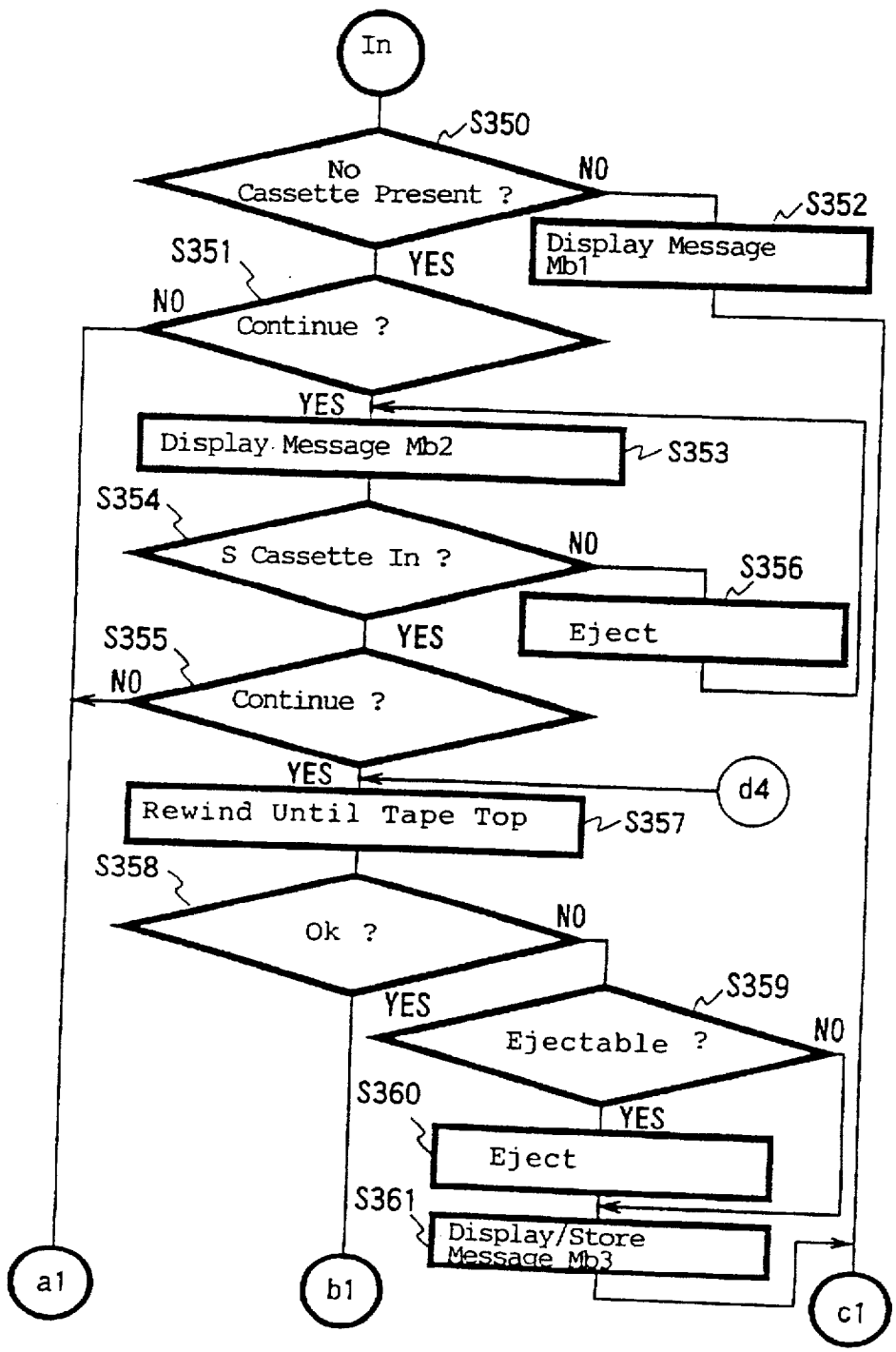
FIG. 27 is a flowchart of a subroutine (check with a tape being present) illustrative of operation of the method of and the apparatus for diagnosing a device according to the present invention.
Figure 28:
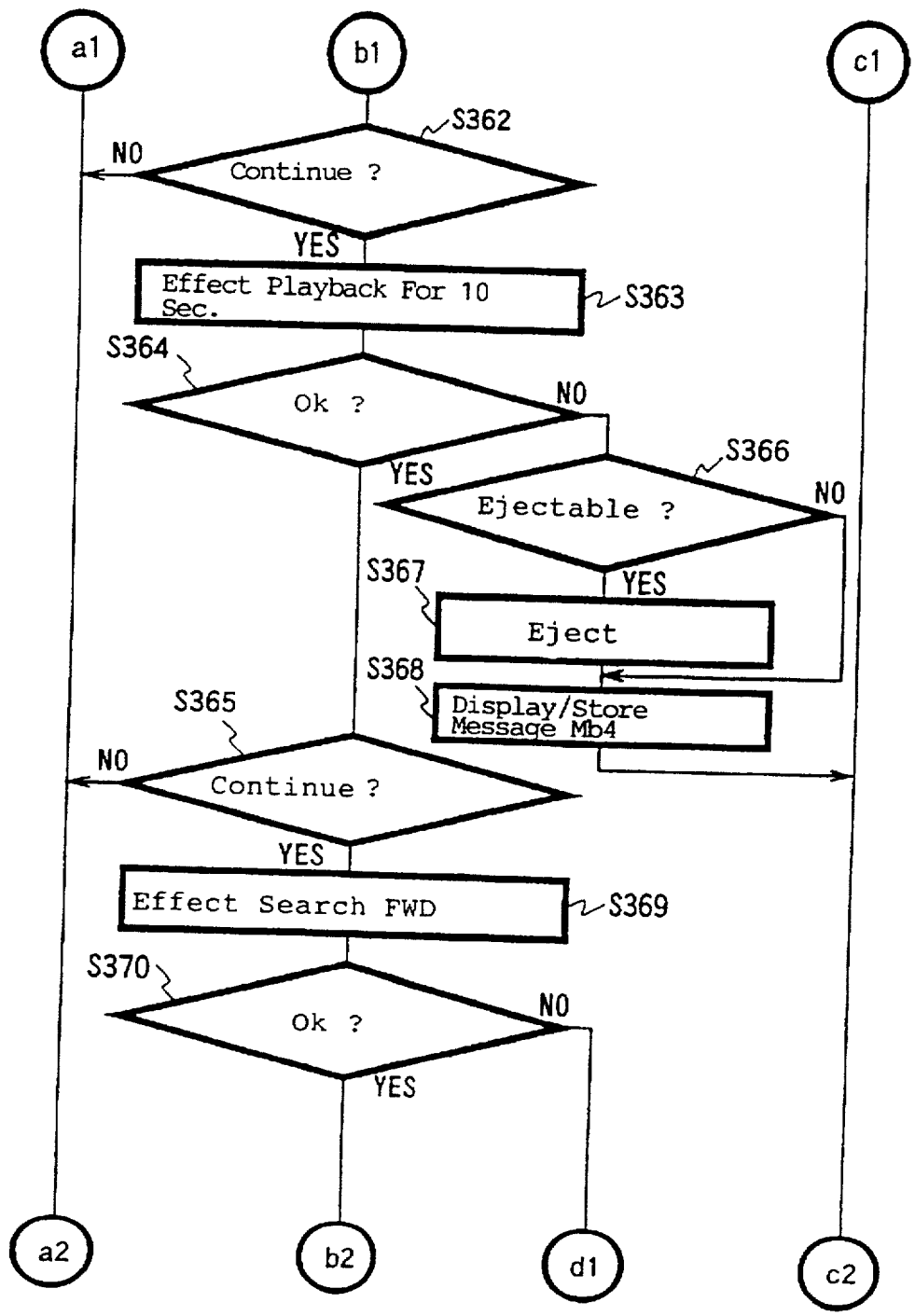
FIG. 28 is a flowchart of the subroutine (check with a tape being present) illustrative of operation of the method of and the apparatus for diagnosing a device according to the present invention.
Figure 29:
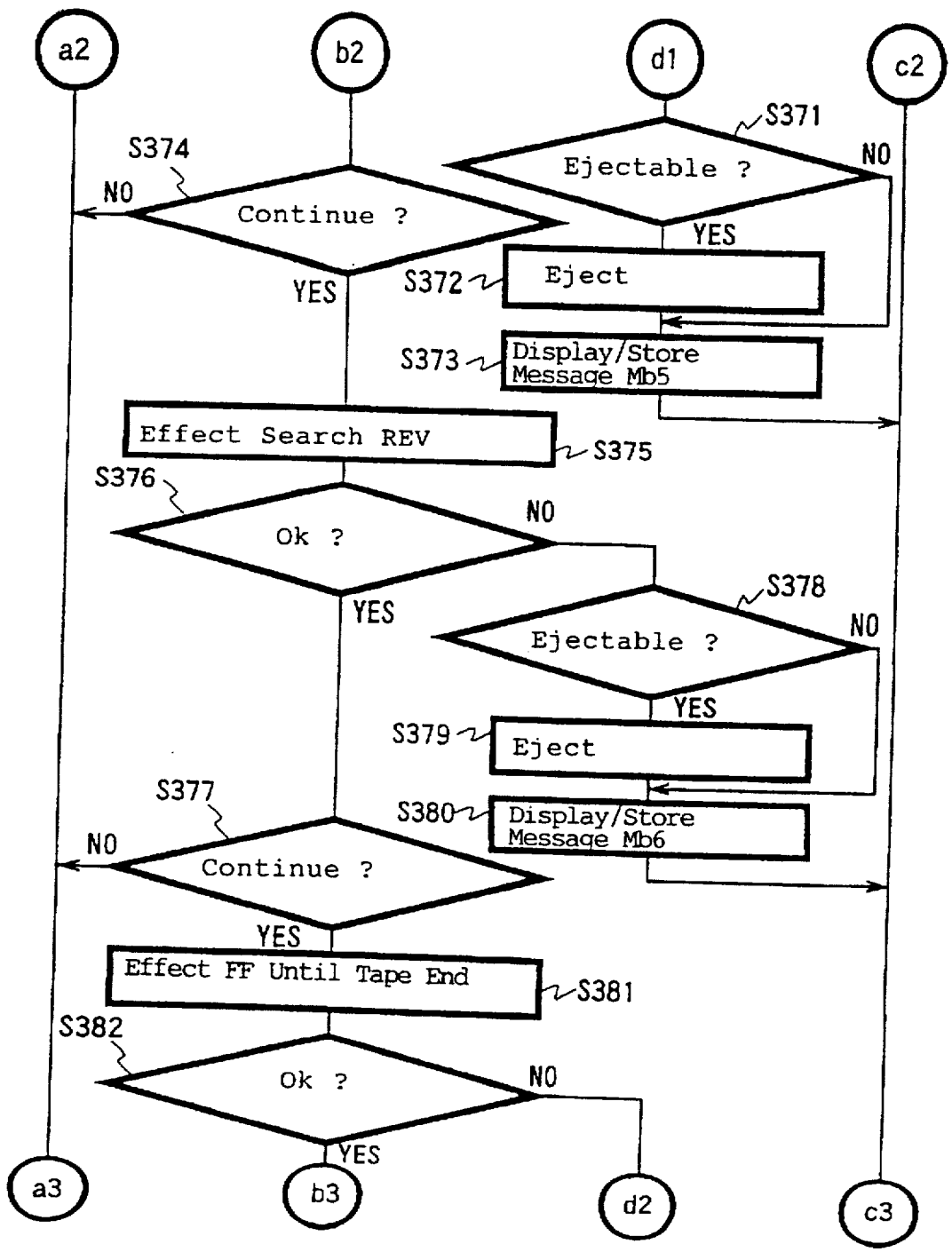
FIG. 29 is a flowchart of the subroutine (check with a tape being present) illustrative of operation of the method of and the apparatus for diagnosing a device according to the present invention.
Figure 30:
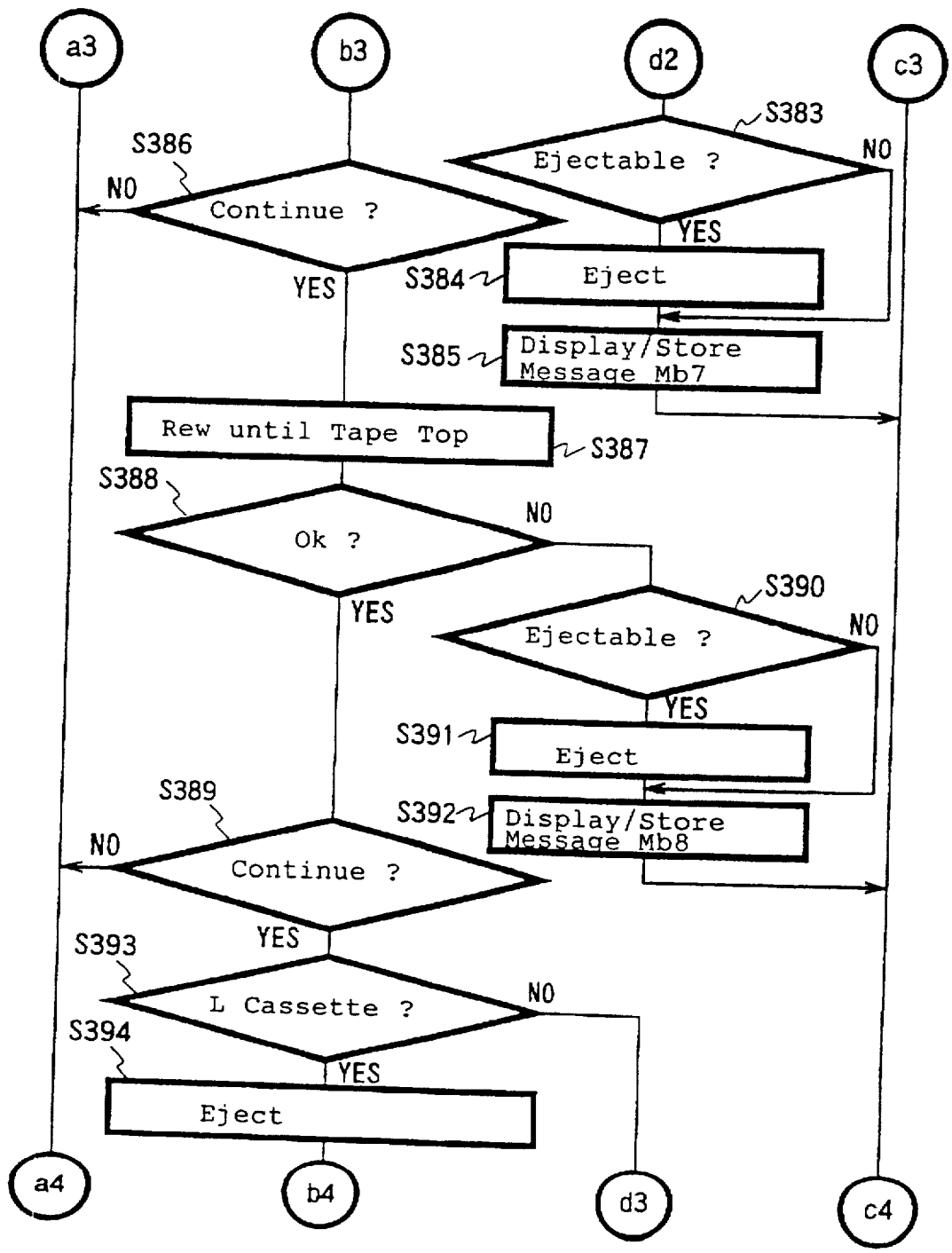
FIG. 30 is a flowchart of the subroutine (check with a tape being present) illustrative of operation of the method of and the apparatus for diagnosing a device according to the present invention.
Figure 31:
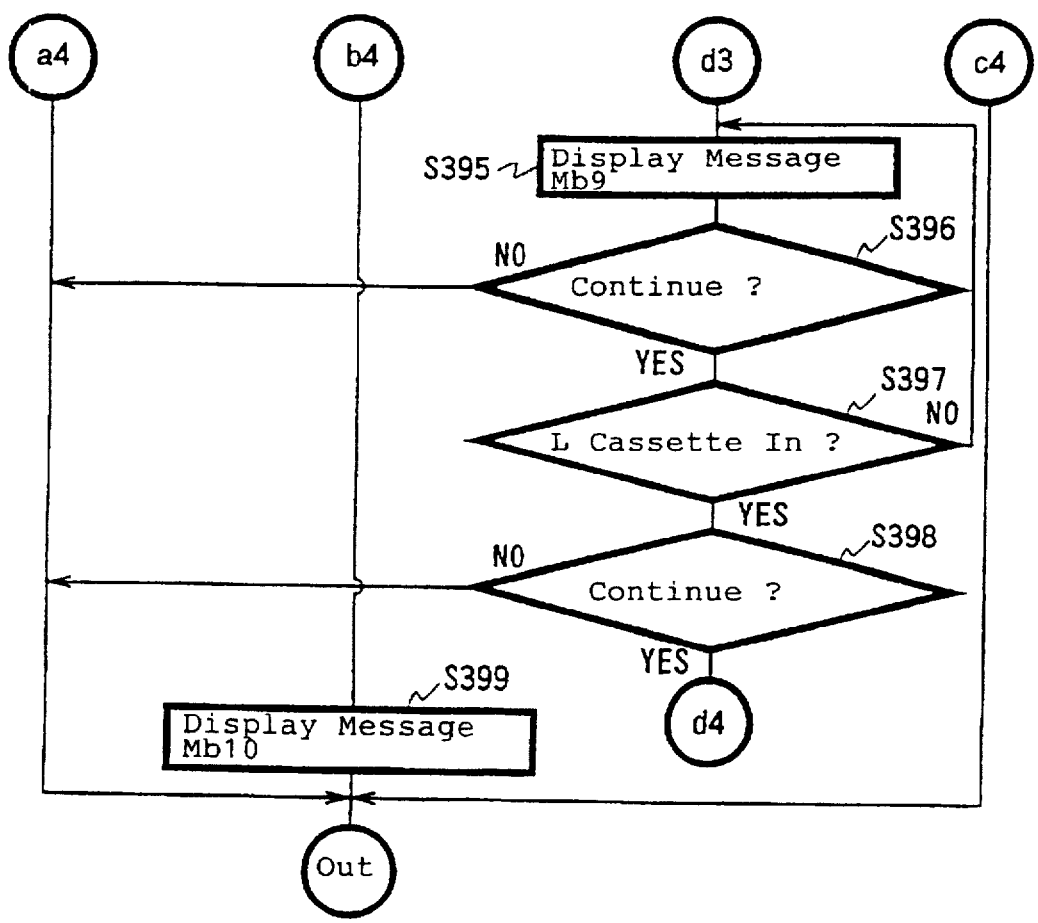
FIG. 31 is a flowchart of the subroutine (check with a tape being present) illustrative of operation of the method of and the apparatus for diagnosing a device according to the present invention.

As shown in FIG. 26, each of the diagnostic algorithm data comprises Data1~Data5. In FIGS. 56A~56D, these data Data1~Data5 are arranged in different patterns which represent diagnostic sequences. In this example, a diagnosis is carried out in a downward sequence.

The term "DEVICE DIAGNOSIS" represents a diagnosis carried out by the selection of a device. Each of these diagnoses is a minimum diagnostic item that can be selected.

I. Description of operation for processing a diagnosis which has been interrupted when maintenance is started (see FIG. 57).

Figure 57:
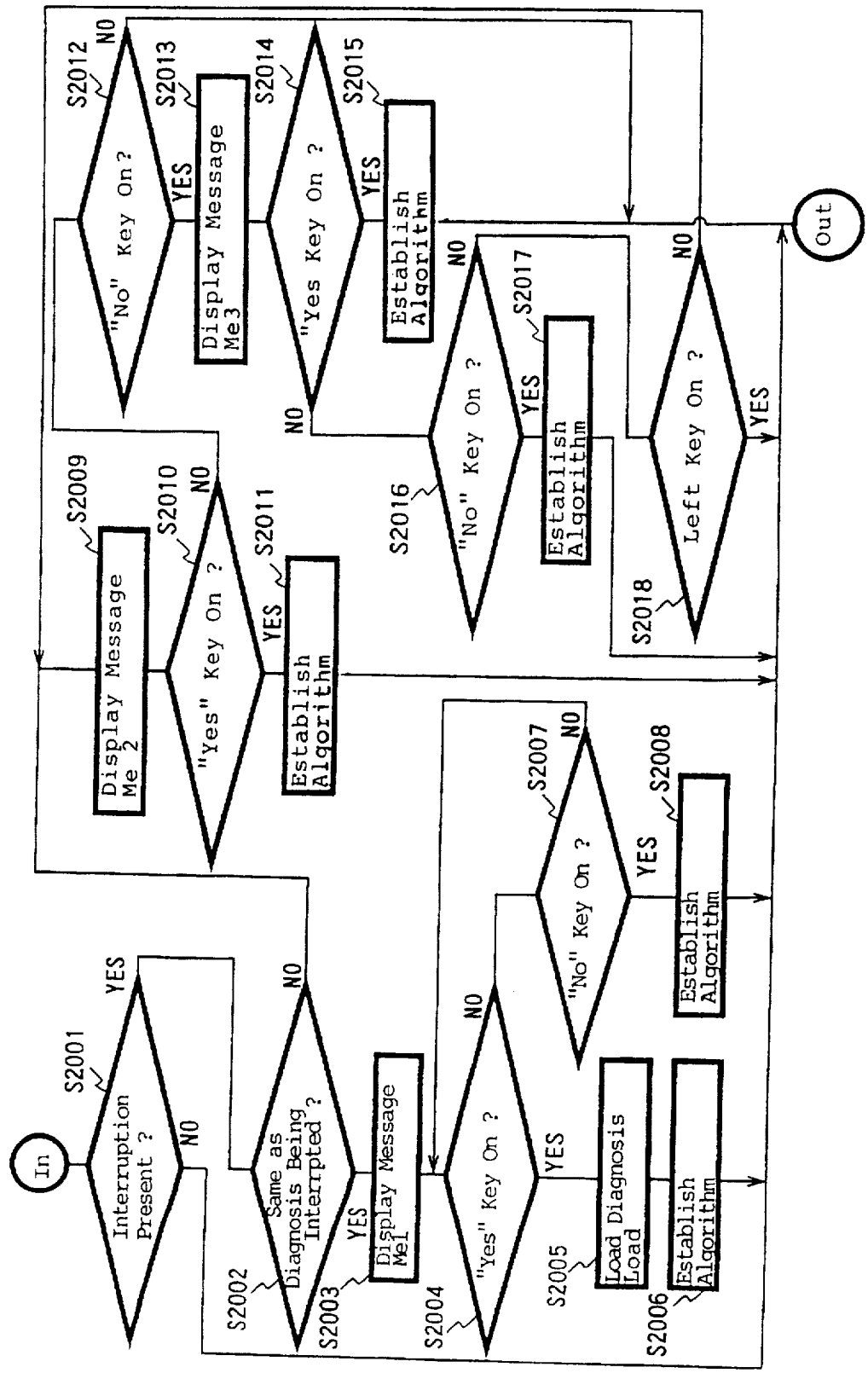
FIG. 57 is a flowchart of a subroutine (interruption processing routine) illustrative of operation of the method of and the apparatus for diagnosing a device according to the present invention.

FIG. 57 is a flowchart of a interruption processing routine, which represents the processing in the step S2000 in each of the flowcharts shown in FIGS. 39, 41, and 43.

In a step S2001, it is determined whether there is a diagnosis being interrupted or not. If "YES", control goes to a step S2002, and if "NO", then control leaves the routine. The diagnosis being interrupted is a diagnosis which has been interrupted in the past when the menu key 147 has been pressed, with the diagnostic data stored in the memory means 202.

In the step S2002, it is determined whether a selected diagnosis is the same as the diagnosis being interrupted. If "YES", control goes to a step S2003, and if "NO", then control goes to a step S2009.

In the step S2003, a message Me1 is displayed. The message Me1 has the following statement:

| Message Me1 | ... The same as the previous diagnosis. Do you wish to continue ? |
|---|---|
| | YES ... YES key |
| | NO ... NO key |
| | CANCEL ... MENU key |

In a step S2004, it is determined whether the YES key 149Y is turned on or not. If "YES", then control goes to a step S2005, and if "NO", then control goes to a step S2007.

In the step S2005, the diagnostic data of the diagnosis being interrupted are loaded. Loading the diagnostic data of the diagnosis being interrupted means reading the diagnostic data of the diagnosis which has been interrupted in the past from the memory means 302. The diagnostic data comprises data indicative of the contents of the diagnosis, i.e., algorithm data established when the diagnosis has been interrupted, positional data in the interrupted diagnosis, and data indicative of a device.

In the step S2006, an algorithm is established based on the diagnostic data read from the memory means 302 in the step S2002.

In the step S2007, it is determined whether the NO key 149N is turned on or not. If "YES", then control goes to a step S2008, and if "NO", then control goes back to the step S2004.

In the step S2008, an algorithm is established based on the selected error code. Then, control leaves this routine.

In the step S2009, a message Me2 is displayed. The message Me2 has the following statement:

| Message Me2 | ... The diagnosis of ERROR-XX-XXX is being interrupted. Do you wish to newly effect this diagnosis ? |
|---|---|
| | YES ... YES key |
| | NO ... NO key |
| | CANCEL ... MENU key |

In a step S2010, it is determined whether the YES key 149Y is turned on or not. If "YES", then control goes to a step S2011, and if "NO", then control goes back to the step S2012.

In the step S2011, an algorithm is established based on the selected error code.

In the step S2012, it is determined whether the NO key 149N is turned on or not. If "YES", then control goes to a step S2013, and if "NO", then control leaves this routine.

In the step S2013, a message Me3 is displayed. The message Me3 has the following statement:

| Message Me3 | ... Do you wish to continue the diagnosis previously effected ? |
|---|---|
| | YES ... YES key |
| | NO ... NO key |
| | Previous diagnosis ... ← key |
| | CANCEL ... MENU key |

In a step S2014, it is determined whether the YES key 149Y is turned on or not. If "YES", then control goes to a step S2015, and if "NO", then control goes back to the step S2016.

In the step S2015, an algorithm is established based on the selected error code.

In the step S2016, it is determined whether the NO key 149N is turned on or not. If "YES", then control goes to a step S2017, and if "NO", then control goes to a step S2108.

In the step S2017, an algorithm is established based on the interrupted diagnosis.

In the step S2018, it is determined whether the left key 148L is turned on or not. If "YES", then control leaves this routine, and if "NO", then control goes back to the step S2009.

I-1. Description of operation for saving a diagnosis number (see FIG. 58).

Figure 58:
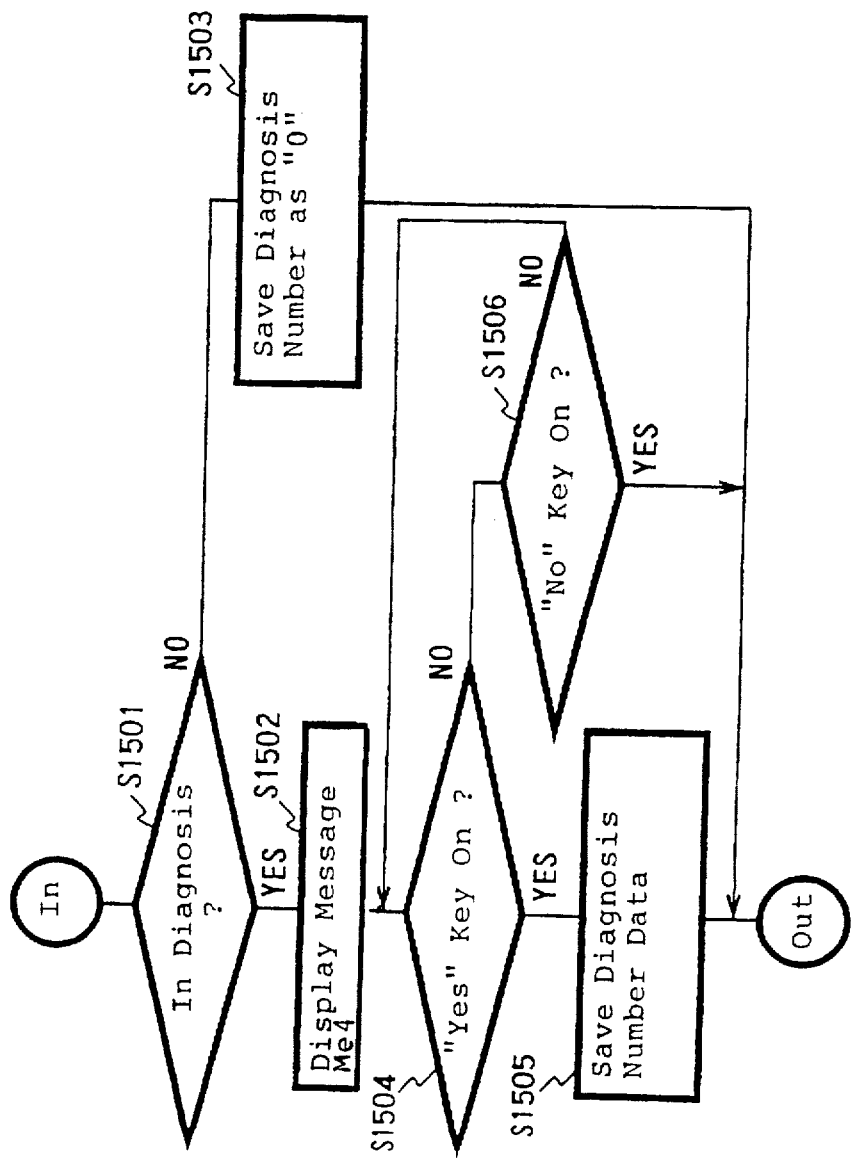
FIG. 58 is a flowchart of a subroutine (diagnosis number saving routine) illustrative of operation of the method of and the apparatus for diagnosing a device according to the present invention.

FIG. 58 is a flowchart illustrative of processing operation according to a diagnosis number saving routine of the step S1500 in the flowchart shown in FIG. 37.

In a step S1501, it is determined whether the apparatus is in diagnosis or not. If "YES", then control goes to a step S1502, and if "NO", then control goes to a step S1503.

In the step S1502, a message Me4 is displayed. The message Me4 has the following statement:

| Message Me4 | ... Do you wish to save the diagnosis so far ? |
|---|---|
| | YES ... YES key |
| | NO .... NO key |

In the step S1503, a diagnosis number is saved as "0". Then, control leaves this routine.

In a step S1504, it is determined whether the YES key 149Y is turned on or not. If "YES", then control goes to a step S1505, and if "NO", then control goes back to the step S1506.

In the step S1505, diagnosis number data are saved. Then, control leaves this routine. The diagnosis number data are written in the memory means 313 by the auxiliary control means 312 under the control of the main control unit 303 shown in FIG. 17.

In the step S1506, it is determined whether the NO key 149N is turned on or not. If "YES", then control leaves this routine, and if "NO", then control goes back to the step S1504.

According to this embodiment, as described above, the controller 1 controls and actuates the drum motor detector 7, the threading motor detector 8, the thread end detector 9, the unthread end detector 10, the reel position motor driver 11, the large position detector 12, the small position detector 13, the tape top detector 14, the tape end detector 15, the cassette compartment motor detector 16, the cassette compartment position detectors 17, 18, the tension detector 19, the S reel motor detector 20, the S reel hold/stop detector 21, the T reel motor detector 22, the T reel hold/stop detector 23, the capstan motor detector 25, the pinch hold/press detector 26, and the recording/reproducing unit 27, diagnoses the various parts based on the results of operation, diagnoses a combination of parts depending on the diagnosis to be achieved, displays the diagnostic result on the display/operation unit 24, and displays, for adjustments or the like, suitable indications depending on the purpose of adjustments for the serviceman or the like on the display screen of the display/operation unit 24. Therefore, failures and degradations of various parts of the device can be diagnosed and adjusted simply, reliably, and quickly. The serviceman can provide a high level of maintenance operation for the user without the need for carrying thick manuals and learning difficult adjusting techniques. The manufacturers of devices are relieved from a large risk of keeping or educating many servicemen of high technical level, but nevertheless can provide users with more reliable and accurate maintenance services. Because the time for the serviceman to carry out maintenance is reduced, the user can use the device at an early time. In addition, the user can receive a certain level of maintenance reliably no manner which serviceman may come. Even when devices are subject to a model change, only program data need to be modified, and the manufacturers are free from a large risk of revising thick manuals.

Since the user may possibly make simple diagnoses, large merits are given to the user, the serviceman, and the manufacturer. For example, if the user diagnoses a device and indicates the result to the serviceman, then the serviceman is able to know in advance what type of maintenance service should be performed. Accordingly, servicing operation on site may be carried out in a reduced period of time, allowing the serviceman to go to many users and give many users maintenance services.

According to the above embodiment, the program data stored in the nonvolatile memories 6a, 6b, the submicrocomputer 5, the main microcomputer 4, and the system microcomputer 2 jointly make up the key input receiving means 301, the main control means 303, the detected result receiving means 306, the failure diagnosing means 307, the failure analyzing means 308, the system control means 300, the auxiliary control means 312, and the repair spot identification indicating means 310, the main control means 303 controls the controlled means 304, the result thereof is detected by the detecting means 305, a failure is detected by the failure diagnosing means 307 based on the detected result, the failure is analyzed by the failure analyzing means 308 depending on its result, algorithm data for specifying faulty locations are generated, and the repair spot identification indicating means 310 instructs the operator to specify the faulty locations successively based on the above data, so that the faulty locations are finally specified. Therefore, diagnoses and adjustments can be made simply, reliably, and quickly without relying on the skill of the serviceman. Since it is possible to establish an algorithm corresponding to the parts of any device, all devices, regardless of whether they are for professional use or general use, can be diagnosed, adjusted, and serviced simply, reliably, and quickly.

In this embodiment, the main control means 303 stores past diagnostic results in the memory means 313, and obtains and uses parameters based on the past diagnostic results when a new diagnosis is made. Consequently, the main control means 303 can diagnose a device depending on the conditions thereof at all times.

According to the present embodiment, basic adjusted values and adjusted values produced by a diagnosis are compared with each other to determine whether there is a failure or degradation. Therefore, a device can be diagnosed in a manner most suitable for the present conditions of the device.

In the present embodiment, after the apparatus has entered the maintenance mode, it is determined whether there is a diagnosis that has been interrupted in the past. If there is such a diagnosis that has been interrupted in the past, then the display/operation unit 24 displays a prompt to decide whether the interrupted diagnosis is to be continued or not. If the operator instructed the apparatus to perform the interrupted diagnosis, then the interrupted diagnosis is performed. Therefore, even if a diagnosis has to be interrupted, it can easily be interrupted without having to record the interruption. When a new diagnosis is to be made, because the serviceman can know that there is an interrupted diagnosis, the serviceman does not need to perform the diagnosis from its beginning. Even if a serviceman who is different from the serviceman who has interrupted a diagnosis is to make a diagnosis, the new serviceman is notified of the interrupted diagnosis, and can continue the interrupted diagnosis. Therefore, the serviceman and the manufacturer are given a better maintenance environment for accurate maintenance services.

[Second Embodiment]

J. Description of operation for carrying out a diagnosis which has been interrupted when a power supply is turned on (see FIGS. 59~62).

Figure 59:
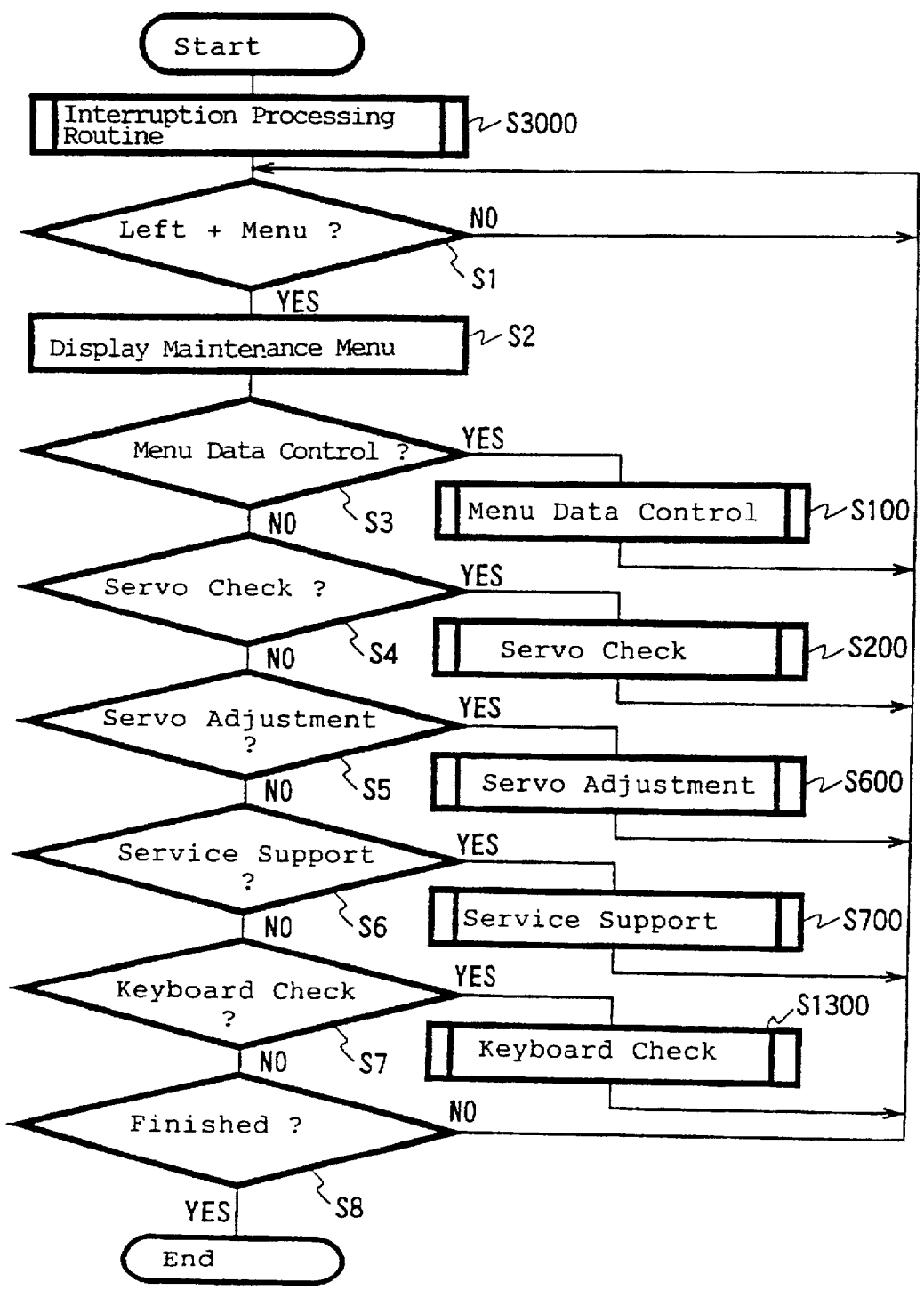
FIG. 59 is a flowchart of a main routine illustrative of operation of a second embodiment of a method of and an apparatus for diagnosing a device according to the present invention.
Figure 60:
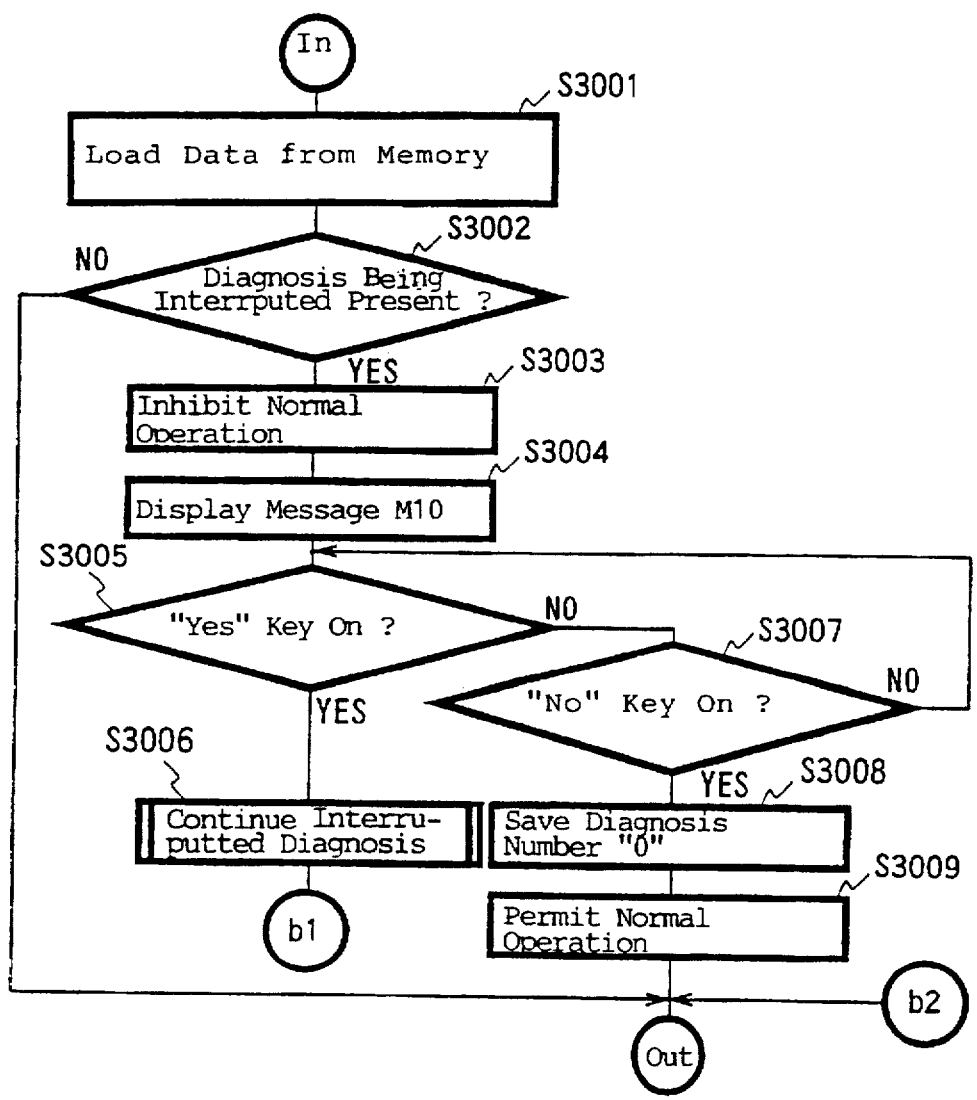
FIG. 60 is a flowchart of a subroutine (for a diagnosis interrupted when a power supply is turned on) illustrative of operation of the second embodiment of the method of and the apparatus for diagnosing a device according to the present invention.
Figure 61:
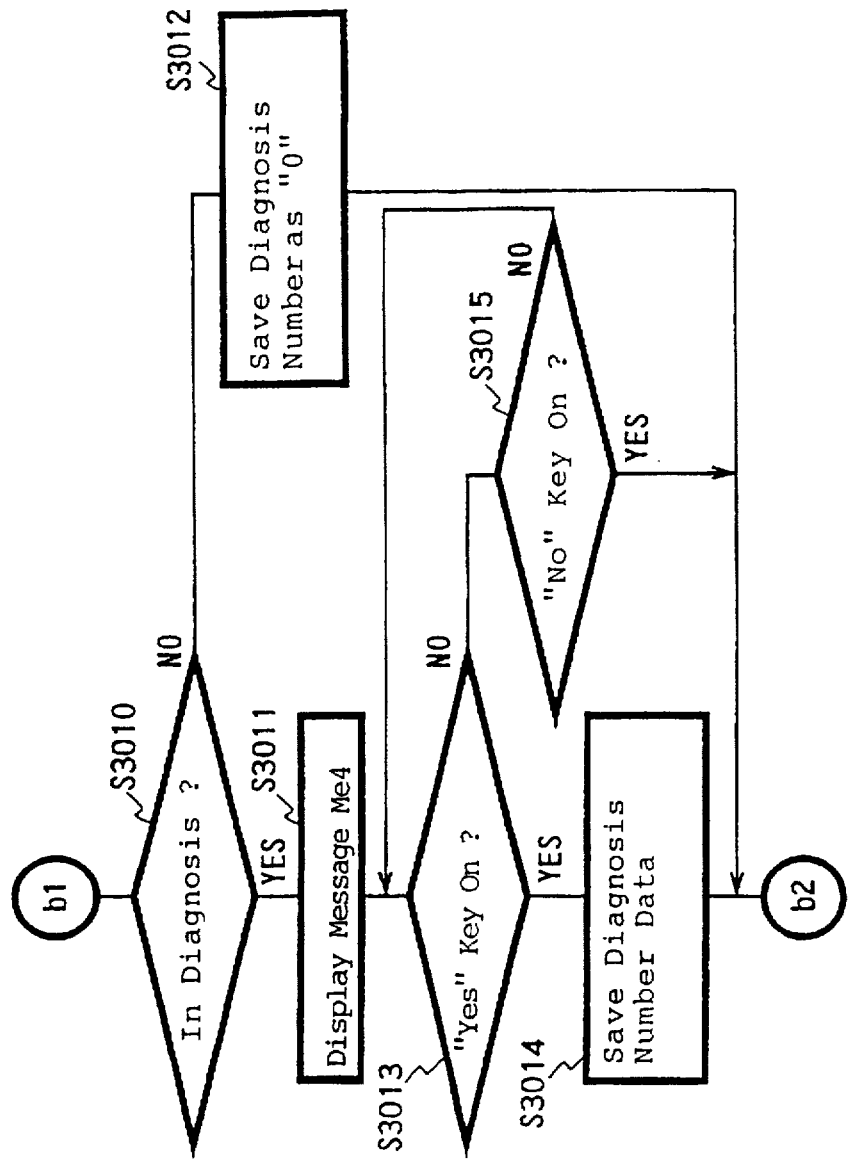
FIG. 61 is a flowchart of the subroutine (for a diagnosis interrupted when a power supply is turned on) illustrative of operation of the second embodiment of the method of and the apparatus for diagnosing a device according to the present invention.
Figure 62:
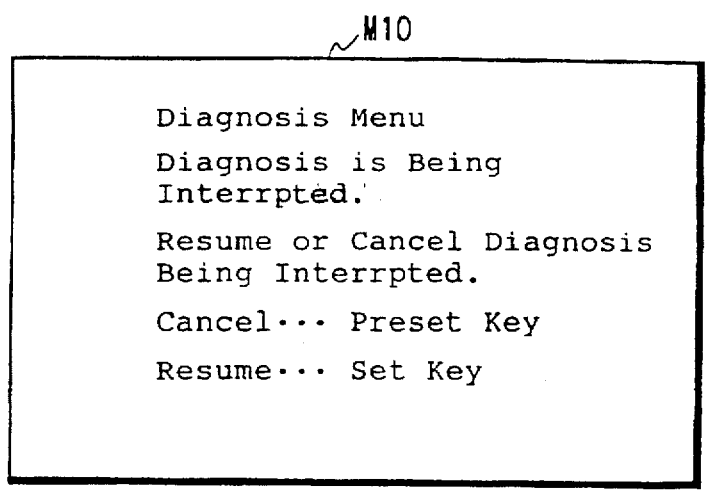
FIG. 62 is a view of a displayed screen image used in the subroutine (for a diagnosis interrupted when a power supply is turned on) illustrative of operation of the second embodiment of the method of and the apparatus for diagnosing a device according to the present invention.

FIGS. 59 through 61 are flowcharts illustrative of operation for determining whether there is a diagnosis interrupted when the power supply is turned on, and inhibiting normal operation if there is an interrupted diagnosis, for performing the interrupted diagnosis. FIG. 62 is a view of a displayed screen image on the display screen of the display/operation unit 24 shown in FIG. 1.

When electric energy is supplied to a device, an alternating-current electric energy from a general commercially available power supply is supplied from the plug 321 shown in FIG. 17 to the power supply circuit 323, which supplies an electric energy to various parts of the device.

FIG. 59 is a flowchart of the same main routine as that shown in FIG. 19. In the flowchart shown in FIG. 59, when the process is started, an interruption process according to an interruption processing routine in a step S3000 is carried out. The processing in the other steps is the same as the processing shown in FIG. 19, and will not be described below. The details of the step S3000 are shown in the flowcharts of FIGS. 60 and 61. The step S3000 will be described below with reference to FIGS. 60 and 61.

In a step S3001, the main control means 303 shown in FIG. 17 instructs the auxiliary control means 302 to read data indicative of whether there is an interrupted data or not from the memory means 313, and diagnosis number data from the memory means 313 are supplied through the auxiliary control means 312 to the main control means 303.

In a step S3002, the interruption determining means 324 determines whether there is an interrupted data or not based on the diagnosis number data read from the memory means 313. If "YES", then control goes to a step S3003, and if "NO", then control leaves this routine. In this embodiment, diagnosis number data indicating that there is no interrupted diagnosis are represented by "0".

If the interruption determining means 324 determines that there is an interrupted diagnosis, then the interruption determining means 324 indicates the interrupted diagnosis to the main control means 303, which inhibits the system control means 300 from performing normal operation even if it is instructed to start normal operation through the key input receiving means 301.

The inhibited normal operation includes normal operation such as playback or recording operation of the device which is instructed by the display/operation unit 24 shown in FIG. 1 which is operated by the user or the serviceman, and automatic mechanical initializing operation (e.g., initialization of a threading position) that is unconditionally carried out when the power supply is turned on. Entering the maintenance mode as described above with reference to the first embodiment is also included in the inhibited normal operation.

In a step S3004, image data of a message M10 shown in FIG. 62 is displayed on the display means 320, indicating that a diagnosis is being interrupted and prompting the user or the serviceman to handle the interrupted diagnosis. "PRESET KEY" and "SET KEY" shown in FIG. 62 are indicated respectively by "149N" and "149Y" on the operation panel shown in FIG. 13, and "PRESET KEY" being also used as a "NO" key and "SET KEY" as a "YES" key.

In a step S3005, it is determined whether the YES key is turned on or not. If "YES", then control goes to a step S3006, and if "NO", then control goes to a step S3007.

In the step S3006, the main control means 303 instructs the auxiliary control means 312 to read data indicative of which diagnosis has been interrupted from the memory means 313. When the data indicative of which diagnosis has been interrupted, read from the memory means 313, are supplied to the main control means 303 through the auxiliary control means 312, the main control means 303 loads program data stored in its internal ROM to obtain the failure diagnosing means 307, the failure analyzing means 308, and the repair spot identification indicating means 310, sets the above means to perform the interrupted diagnosis based on the data indicative of which diagnosis has been interrupted, thereafter controls the controlled means 304, and causes the detecting means 305 to detect the controlled means 304 for thereby starting the diagnosis. Then, control goes to a step S3010 shown in FIG. 61.

In the step S3007, it is determined whether the NO key is turned on or not. If "YES", then control goes to a step S3008, and if "NO", then control goes back to the step S3005.

In the step S3008, the main control means 303 stores diagnosis number data "0" through the auxiliary control means 312 into the memory means 313, and instructs the auxiliary control means 312 to erase the data indicative of the interrupted diagnosis from the memory means 313. The memory means 313 now stores the diagnosis number data "0" indicating that there is no interrupted diagnosis, and all data relative to the interrupted diagnosis are erased.

In a step S3009, the main control means 303 instructs the system control means 300 to start normal operation as instructed through the key input receiving means 301.

In the step S3010, it is determined whether the apparatus is in diagnosis or not. If "YES", then control goes to a step S3011, and if "NO", then control goes to a step S3012.

In the step S3011, a message Me4 is displayed. The message Me4 has the following statement:

| Message Me4 | ... Do you wish to save the diagnosis so far ? |
|---|---|
| | YES ... YES key |
| | NO .... NO key |

In the step S3012, a diagnosis number is saved as "0". Then, control leaves this routine.

In a step S3013, it is determined whether the YES key is turned on or not. If "YES", then control goes to a step S3014, and if "NO", then control goes back to the step S3015.

In the step S3014, diagnosis number data are saved. Then, control leaves this routine. The diagnosis number data are written in the memory means 313 by the auxiliary control means 312 under the control of the main control unit 303 shown in FIG. 17.

In the step S3015, it is determined whether the NO key is turned on or not. If "YES", then control leaves this routine, and if "NO", then control goes back to the step S3013.

In this embodiment, it is determined whether there is a diagnosis being interrupted when the power supply is turned on. If there is a diagnosis being interrupted, then the display/operation unit 24 displays a prompt as to whether the interrupted diagnosis is to be continued or not. If instructed to continue the interrupted diagnosis, then the interrupted diagnosis is performed. If instructed not to continue the interrupted diagnosis, then the interrupted number data are stored again as data (e.g., "0") indicating that there is no diagnosis being interrupted, and various data relative to the interrupted diagnosis are erased. Therefore, even if a diagnosis has to be interrupted for some reason, it can simply be interrupted without the need for recording the interruption. Because it is determined whether there is a diagnosis being interrupted when the power supply is turned on, if there is a diagnosis being interrupted, then it can be processed. When a new diagnosis is to be made, because the serviceman can know that there is an interrupted diagnosis, the serviceman does not need to perform the diagnosis from its beginning. Even if a serviceman who is different from the serviceman who has interrupted a diagnosis is to make a diagnosis, the new serviceman is notified of the interrupted diagnosis, and can continue the interrupted diagnosis. Therefore, the serviceman and the manufacturer are given a better maintenance environment for accurate maintenance services.

In this embodiment, if there is a diagnosis being interrupted when the power supply is turned on, normal operation is inhibited. Therefore, the risk of effecting normal operation when the power supply is turned on depending on an interrupted diagnosis can be eliminated.

For example, while a diagnosis is being performed with the threading ring moved to the position of the thread end, the diagnosis is interrupted, the power supply is turned off, and then turned on again. In such a case, if the power supply is turned on with the mechanism moved in the diagnosis as for automatically unthreading the tape, then since all mechanical parts are moved to initialized positions in the normal operation, it becomes impossible to perform the diagnosis from the interrupted condition.

Furthermore, if a board is removed and confirmed during a diagnosis, then the diagnosis is interrupted and the power supply is turned off, and thereafter the power supply is turned on again, then because the board has been removed, a new failure occurs when there is trouble in initializing all the mechanical parts in the normal operation.

According to this embodiment, since the normal operation is inhibited in the presence of an interrupted diagnosis, the above drawbacks will not take place.

The interruption determining means 324 shown in FIG. 17 may be dispensed with, and the main control means 303 may determine whether there is an interrupted diagnosis when the power supply is turned on.

In the above embodiments, diagnoses and adjustments are made to ascertain whether failures or degraded parts are present in a device. However, conditions of parts which do not directly affect operation in a normal mode, but may directly affect operation in the normal mode upon elapse of a certain period of time may be detected, and displayed on the display screen of the display/operation unit 24 shown in FIG. 1.

Such a modification allows the user to know beforehand the possibility of a failure or degradation that may occur next. For example, parts may be replaced before an error occurs thereto for thereby preventing an error from occurring in advance.

A basis for determining the possibility of a failure or degradation that may occur upon elapse of a certain period of time may be the difference between basic adjusted values and readjusted values, a current value, speed data, etc. If the certain period of time is specifically determined, when a certain current value, for example, is detected, it is easy to predict that the possibility of an error is high upon elapse of the certain period of time from the detection of the current value. For example, since the extent of wear of the capstan shaft is obtained from the capstan speed, once the certain period of time is specifically determined, the capstan speed which can be predicted to correspond to the certain period of time can be obtained relatively easily until the wear of the capstan shaft appears as an error. As a simplest example, a period of time in which a part is used is measured, and it is determined depending on the measured period of time whether the part has been used for a period of time in which an error begins to occur due to wear.

Industrial Applicability

The method of and the apparatus for diagnosing a device according to the present invention are suitable for self-diagnosing a VTR or the like. Particularly, if a diagnosis is interrupted, information of the interrupted diagnosis is stored, and when next maintenance service is performed, the serviceman can be informed of the interrupted diagnosis. If the interrupted diagnosis is to be carried out, it can be continued based on the stored information thereof.

We claim:

1. A method of self-diagnosing a device having a diagnostic item directing a procedure for diagnosing a component of said device, comprising the steps of:
   selecting a diagnostic item;
   determining whether the diagnostic item selected is interrupted;
   executing the diagnostic item selected if it is determined that there is no interruption; and
   storing in memory interruption data indicating that said diagnostic item is interrupted when it is determined that said diagnostic item is interrupted.

2. A method according to claim 1, further comprising the step of executing the diagnostic item previously interrupted.

3. A method according to claim 1, further comprising the step of executing either diagnostic item previously interrupted or another diagnostic item.

4. A method according to claim 1, wherein said step of determining being carried out based on the interruption data stored in said memory.

5. A method according to claim 2, wherein the procedure for diagnosing said component comprises diagnosing steps for diagnosing elements of said component, wherein the step of storing in memory interruption data stores the point where the procedure for diagnosing said component is interrupted.

6. A method according to claim 1, wherein said device is comprised of a plurality of device components, wherein said step of executing the diagnostic item selected includes the step of establishing one of said device components to be diagnosed and a corresponding diagnostic item.

7. A method according to claim 1, wherein said device is comprised of a plurality of device components, further comprising the step of displaying said plurality of device components, from which the diagnostic item is selected.

8. A method according to claim 1, further comprising the step of displaying an error which has occurred in previous diagnostics.

9. A method according to claim 1, further comprising the step of displaying a plurality of errors which can exist in said device.

10. An apparatus with a self-diagnosing function, comprising:
    means for effecting a self diagnosis according to a respective diagnostic item selected from among a plurality of diagnostic items, each diagnostic item directing a procedure for diagnosing a component of said apparatus;
    interrupted diagnosis detecting means for detecting when power is supplied whether the respective diagnostic item selected was interrupted previous to the supply of said power; and
    means for inhibiting operation of said apparatus when it is determined by said interrupted diagnosis detecting means that said respective diagnostic item was previously interrupted.

11. An apparatus with a self-diagnosing function according to claim 10, further comprising means for storing data in memory indicative of said respective diagnostic item interrupted previously.

12. An apparatus with a self-diagnosing function according to claim 10, further comprising display means for displaying said respective diagnostic item interrupted previously.

13. A method according to claim 1, wherein said step of determining determines when power is supplied whether said diagnostic item selected was previously interrupted.

14. A method according to claim 1, wherein said device is an audio/video device; said step of selecting a diagnostic item selects a diagnostic item directing a procedure for diagnosing an audio/video component of said audio/video device.

15. A method according to claim 1, wherein said device is a VTR; said step of selecting a diagnostic item selects a diagnostic item directing a procedure for diagnosing a VTR component of said VTR.

16. An apparatus with a self-diagnosing function according to claim 10, wherein said apparatus is an audio/video device; further comprising means for selecting a diagnostic item directing a procedure for diagnosing an audio/video component of said audio/video device.

17. A method according to claim 1, wherein said apparatus is a VTR; further comprising means for selecting a diagnostic item directing a procedure for diagnosing a VTR component of said VTR.

* * * * *